United States Patent
David et al.

(12) 
(10) Patent No.: US 6,338,529 B1
(45) Date of Patent: Jan. 15, 2002

(54) CHILD RESTRAINT SYSTEM

(75) Inventors: Bapst M. David, South Wales; Ronald Asbach, Grand Island, both of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/366,554

(22) Filed: Aug. 4, 1999

(51) Int. Cl.⁷ .............................................. A47D 1/10
(52) U.S. Cl. .................................................. 297/250.1
(58) Field of Search ....................... 297/250.1, 452.18

(56) References Cited

U.S. PATENT DOCUMENTS

| | | | |
|---|---|---|---|
| 3,220,769 A | 11/1965 | Regan | 297/384 |
| 3,709,558 A | 1/1973 | Jakob | 297/250 |
| 3,910,634 A | 10/1975 | Morris | 297/384 |
| 3,992,056 A | * 11/1976 | Koziatek et al. | |
| 4,033,622 A | 7/1977 | Boudreau | 297/250 |
| 4,040,664 A | 8/1977 | Tanaka et al. | 297/389 |
| 4,183,580 A | * 1/1980 | Johansson | |
| 4,342,483 A | 8/1982 | Takada | |
| 4,345,791 A | 8/1982 | Byrans et al. | 297/250 |
| 4,613,188 A | 9/1986 | Tsuge et al. | 297/250 |
| 4,685,741 A | 8/1987 | Tsuge et al. | 297/467 |
| 4,826,246 A | 5/1989 | Meeker | 257/250 |
| 4,834,420 A | 5/1989 | Sankrithi et al. | 280/728 |
| 4,913,490 A | 4/1990 | Takahashi et al. | 297/250 |
| 4,936,628 A | 6/1990 | Delaney et al. | 297/250 |
| 5,052,750 A | 10/1991 | Takahashi et al. | 297/250 |
| 5,082,325 A | 1/1992 | Sedlack | 297/250 |
| 5,228,746 A | 7/1993 | Burleigh | 297/250 |
| 5,265,931 A | 11/1993 | Ryan | |
| 5,286,086 A | 2/1994 | Gunji | 297/250.1 |
| 5,458,398 A | 10/1995 | Meeker et al. | 297/250.1 |
| 5,487,588 A | 1/1996 | Burleigh et al. | 297/253 |
| 5,611,596 A | 3/1997 | Barley et al. | 297/256.13 |
| 5,775,772 A | 7/1998 | LeFranc | 297/250.1 |
| 5,836,649 A | 11/1998 | Bonetti | 297/256.1 |
| 5,842,740 A | 12/1998 | LeFranc | 297/250.1 |

FOREIGN PATENT DOCUMENTS

| | | | |
|---|---|---|---|
| DE | 197 41 602 | 3/1999 | |
| FR | 2 347 010 | 4/1976 | 297/250.1 |
| GB | 658000 | 10/1951 | |
| GB | 2165443 | 4/1986 | |
| WO | 98/18649 | 5/1998 | |

OTHER PUBLICATIONS

Evenflo sales brochure "New 2000 on the go time", copyright Evenflo Company, Inc., 1999.

Konig sales brochure "Komfort—u. Rennsitze", date unknown.

Sparco sales brochure, title unknown, date unknown, p. 20, 21 and 25.

MOMO racing seats magazine advertisement (magazine unknown), date unknown, single page attached description and Figs. 1–12 of Century, Evenflo, Gerry, Brevarra, Columbia, and Brittax car seats.

* cited by examiner

Primary Examiner—Milton Nelson, Jr.
(74) Attorney, Agent, or Firm—Morgan, Lewis & Bockius LLP

(57) ABSTRACT

A forward facing child restraint system with attached harness providing superior safety performance for a child during a vehicle forward impact event. The restraint system includes a seating portion and child harness secured to the frame with a seatbelt pathway threaded through the frame for fully securing the frame in the vehicle seat using a vehicle lap belt. The child restraint system may be implemented in one of two physical embodiments: a tubular truss frame with attached seating panel or as a car seat shell having an integral frame and seating section.

35 Claims, 29 Drawing Sheets

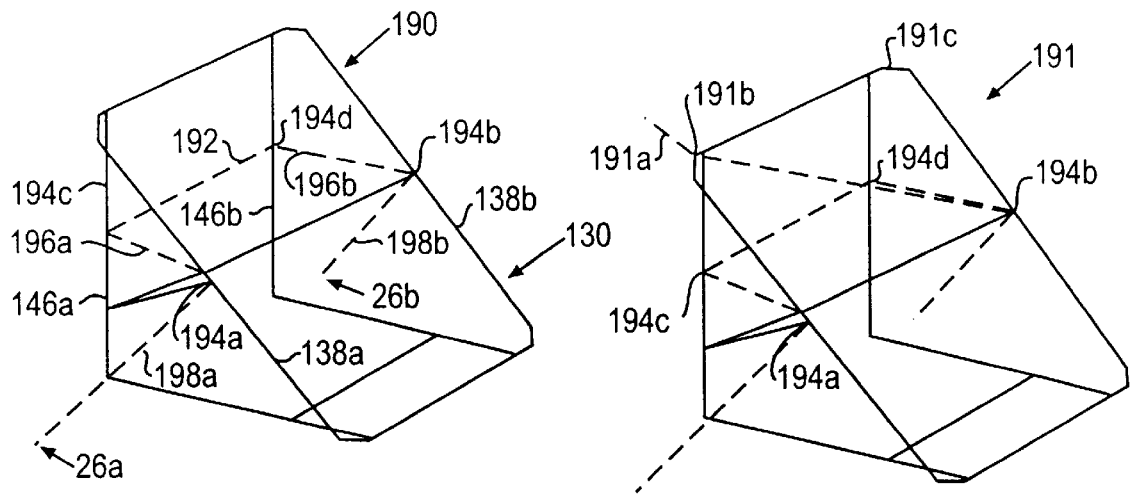
FIG. 6
FIG. 6A
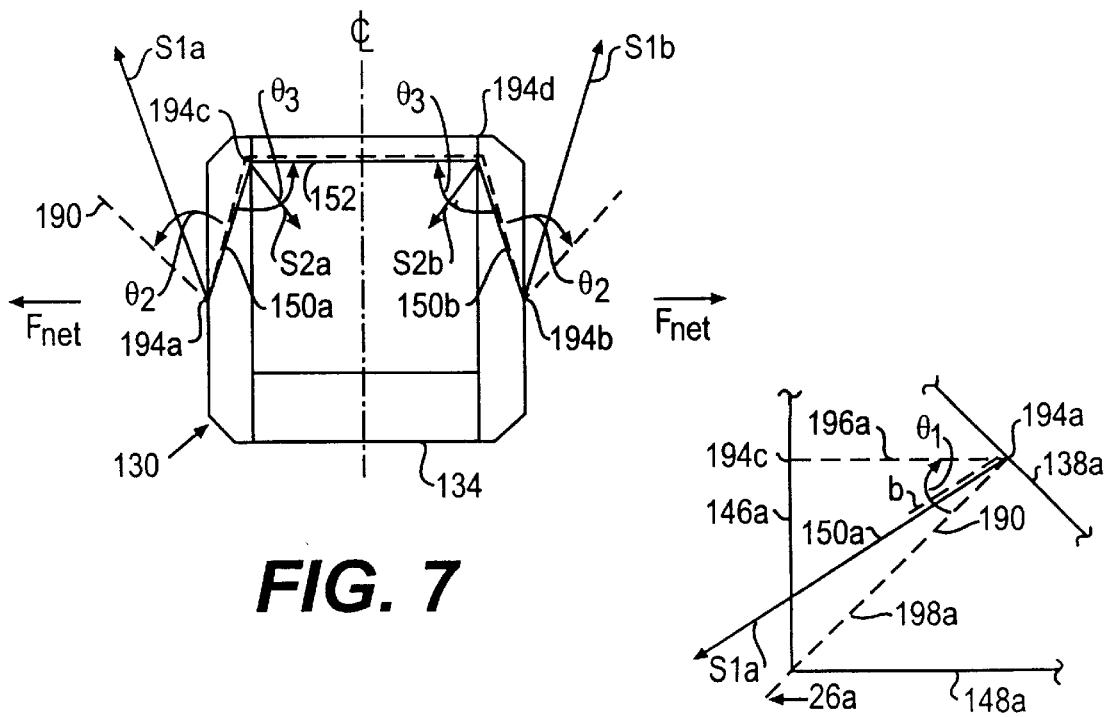
FIG. 7
FIG. 8

CHILD RESTRAINT SYSTEM

FIELD OF INVENTION

The present invention relates to an add-on child restraint system for the protection of a child occupant placed in a motor vehicle and more particularly to a forward facing child car seat providing superior safety performance.

BACKGROUND OF INVENTION

Passenger restraint systems of motor vehicles provide adequate protection for adult passengers, but are inappropriately sized for small children. As a result, regulations have issued requiring the use of child restraint systems in motor vehicles. The regulations impose size, shape and mechanical performance requirements on child restraint system manufacturers to ensure that the restraint system is capable of safely securing the child in a variety of vehicle passenger seats during operation of the motor vehicle and, in particular, during periods of worst-case rapid vehicle deceleration events (e.g., hard braking or forward impact events). In recent years, more stringent requirements have been adopted for child restraint systems in response to continued incidents of injuries sustained by children due to faulty or inappropriately designed restraint systems. In particular, regulatory requirements in Canada, the United States, and the European Union governing the use of add-on child restraint systems (i.e., portable child car seats) in motor vehicles require that the restraint system must be capable of limiting passenger excursions during a simulated vehicle frontal impact event, as defined under the restraint system dynamic tests of the United States Federal Motor Vehicle Safety Standard No. 213 (FMVSS 213), the Canadian Motor Vehicle Safety Standard No. 213 (CMVSS 213) and the Uniform Provisions Concerning the Approval of Restraining Devices for Child Occupants of Power-Driven Vehicles (ECE R44.03, §8.1.3).

The impact test setup, procedure and test article performance requirements under FMVSS 213 and CMVSS 213 are defined in terms of the restraint system's intended use (i.e., forward or rearward facing restraint or a built-in restraint system) and the recommended passenger weight ranges (which is related to passenger size) since the adequacy of the restraint system during a forward impact varies depending on the passenger weight, size and position in the vehicle seat.

Forward Facing Add-on Restraint Systems

In the case of a forward facing add-on restraint system, test procedures distinguish between two categories of restraint systems: forward facing child restraints with harness and belt positioning booster seats. In the case of forward facing child restraints with harness, the car seat body includes a child restraint harness and a vehicle seat belt retention device (or seat belt pathway) for restraining the seat in the vehicle seat. In the case of belt positioning booster seats, the vehicle manufacturer supplied seat belt assembly is used to restrain the child and booster seat in the vehicle seat.

FMVSS 213 and CMVSS 213 require that the restraint system with harness must be capable of being fully restrained (as verified by the forward impact test) in the vehicle seat by a Type I seat belt assembly (lap belt only), or by the combination of a Type I seat belt assembly and a top tether secured to a vehicle supplied anchorage which is often located in the vehicle seat assembly rear filler panel. The Type I seat belt assembly restraint requirement for forward facing child restraints with harness is intended to ensure that the restraint system will perform adequately whether the vehicle seat comes equipped with either a Type I or Type II (lap and shoulder belt) seat belt assembly.

Impact Test Setup, Procedure and Performance Requirements

Under FMVSS 213 and CMVSS 213, the testing platform comprises a vehicle seat assembly mounted on an impact trolley subjected to a change in velocity by impact with a frontal barrier or an equivalent rearward acceleration of the trolley simulating the acceleration experienced during a forward impact. The standard seat assembly for the impact test is reproduced as FIG. 1A. The impact test setup, procedure and data gathering for forward facing add-on child restraints will now be briefly described. The restraint system with an anthropomorphic test dummy is secured in the vehicle seat using the seat belt assembly mandated for the test (i.e., Type I seat belt assembly) and subjected to the forward impact loads. In addition to verifying the strength of the restraint system, the impact test is used to gather data on the acceleration and displacement of the test dummy during the impact test. This procedure is repeated for a variety of test dummy weights and sizes, depending on the recommended weights for the child restraint. For example, conventional forward facing child restraints with harness are usually recommended for use with children weighing between 22 and 40 lb. For this type of restraint, an impact test is required for both a test dummy simulating 9 month old, 20 lb. child and 3 year old, 33 lb. child. For seats recommended for children weighing between 40 and 50 lb., the impact test is required for a test dummy simulating a 6 year old, 48 lb. child. Neither FMVSS 213 nor CMVSS 213 regulate child restraints for passenger weights over 50 lb.

The limits set forth in the regulations are defined in terms of a maximum allowable forward dynamic displacements and accelerations of the test dummy, as measured during the impact test. Maximum allowable accelerations of the test dummy are defined in terms of maximum measured accelerations of the head and upper thorax. Maximum allowable forward displacements (or excursions) of the test dummy are measured at the head and either knee joint portions of the test dummy and are measured with respect to a seatback pivot axis (15) of the standard seat assembly (17), as illustrated in FIG. 1A. FMVSS 213 require that neither the head nor the knee joint of the test dummy can exhibit a forward excursion during test exceeding a maximum excursion distance (L), which represents the distance between seatback pivot axis (15) and an imaginary plane (10) disposed in front of standard seatback assemble (10). Currently, FMVSS 213 imposes a forward excursion limit (L) of the test dummy head and either knee joint to 813 mm and 915 mm, respectively. Under CMVSS 213, the forward excursion limit (10) for the head is 720 mm (excursions of the kneejoint are not regulated in Canada).

The forward facing child restraint excursion limits and seat belt assembly restraint requirements under FMVSS 213 and CMVSS 213 require child car seat manufacturers to design restraint systems that must be capable not only of sustaining forward impact loads imposed during the impact test, but must also be capable of preventing the passenger and seat from exceeding the maximum allowable forward excursion (L). At present, there are no known forward facing add-on child restraints with harness that meet the forward excursion limit requirements of FMVSS 213 or CMVSS 213 for passenger weights above 40 lb. Moreover, there are no known child restraints with harness available that meet the requirements under FMVSS 213 or CMVSS 213 for weights ranging between 22 and 40 lb. without the use of an additional restraining top tether.

The Loading Environment During a Forward Impact

The ability of a particular child restraint system to meet the excursion limits requirements depends not only on the strength and/or stiffness properties of the restraint system, but also on the nature of the load environment during a forward impact event. During a forward impact, the conventional forward facing child restraint with harness is subjected to both an applied lateral load through the vehicle seat belt assembly and a forward tipping moment. The forward tipping moment is influenced primarily by the vehicle seat belt/child seat shoulder harness force couple carried by the car seat body. Since the lap belt restraint force applied to the car seat is not co-linear with the inertia load applied to the shoulder harness restraint, there is a resulting forward tipping moment applied to the child car seat proportional to the distance between the line of actions of the vehicle seatbelt and child seat shoulder harness applied loads. If a top tether in combination with a Type I set belt assembly is used, this tipping moment is minimal since the top tether line of action is approximately co-linear or above the shoulder restraint (thereby minimizing the total moment arm). However, if a top tether is not used or the vehicle is not equipped with an anchorage for the top tether, this tipping moment can be quite severe.

Drawbacks and Limitations of Known Child Restraint Systems

While it is usually the case that a child restraint system is capable of sustaining lateral loads during a forward impact, it has been found that the most serious of injuries sustained by children secured in forward facing child restraints usually result from a head contact resulting from a failure to adequately limit the forward motion (excursion) of the head. While it is known that tipping moments need to be taken into account in child car seat designs, many of the present day child car seats are not designed with a view towards optimally minimizing the effects of a forward tipping.

One cause of child restraints allowing excessive forward head excursions occurs when the vehicle seatbelt restraint system has a seatbelt anchor positioned forward of the seatbelt entry point for a child car seat placed in the vehicle seat. When the seatbelt anchor is positioned forward of the seatbelt entry, it is difficult to tension the seatbelt against the child car seat in order to ensure that the car seat fits snugly against the vehicle seat (as discussed in detail in the background section of U.S. application Ser. No.: 08/738,052, the disclosure of which is expressly incorporated herein by reference). In an effort to promote compatibility between a child restraint system and vehicle seat belts, the SAE (Society of Automotive Engineers) publishes voluntary design guidelines defining recommended seat belt entry positions for car seats. In particular, SAE Standard J1819 sets a maximum forward buckle stalk length of 200 mm from the seat bight (the intersection of the vehicle seat back and the seat bottom or pan) and recommends that the child restraint system adopt a seat belt entry position outside this 200 mm radius. By placing the seat belt entry position outside of this 200 mm radius, the seat belt can be effectively tensioned against the child car seat to ensure a snug fit in the vehicle seat and thereby minimize the instances of car seats becoming dislodged from the vehicle seat belt when subjected to the forward tipping moment. SAE Standard J1819 also establishes a standard vehicle seatbelt length (approximately 41 in) to insure that the vehicle seatbelt has a sufficient length to be passed through the belt pathway of child restraint when buckled. It is therefore preferable to provide a seat belt entry position outside this 200 mm radius for child car seats to ensue that the child car seat can be fit snugly in the vehicle seat and a seatbelt pathway that can receive a vehicle seatbelt having a maximum seatbelt length of 41 inches.

In addition to the need for complying with the standards under SAE J1819, there is the additional need to provide a child car seat design which is effective in limiting the forward excursions of the child car seat and in maximizing the distance between the passenger and the forward excursion limit under CMVSS 213 and/or FMVSS 213. The known child restraint designs do not provide optimal performance. Often, child restraints represent compromises in which non-safety related features (such as providing an elevated seating position) reduce performance. An elevated seating position increases the moment inducing forces tending to rotate or tip the child car seat forwardly during a forward impact event.

Typical child restraint designs have a child seating surface that is positioned substantially forward of the vehicle seat back (thereby reducing the amount of allowable forward excursion before a head strike would occur). One of the primary causes for positioning the child seating surface substantially forward of the vehicle seatback is to give ample clearance for the child harness behind the child car seat. Typical child restraint designs will also have a seat belt entry point that is not positioned forward of the vehicle seat belt anchor position (thereby making it difficult to properly restrain the child car seat in the vehicle seat using a vehicle seatbelt) or is positioned in such a manner as to induce a severe tipping moment. For example, U.S. Pat. No. 4,033, 622 to Boudreau describes a child restraint including a seat body shell supported by tubular steel frame having a seat belt entry positioned adjacent to the vehicle lower seat. The performance of Boudreau's car seat is sub-optimal for several reasons. First, the seat belt entry position is positioned well below the child shoulder harness restraint, thereby subjecting the car seat to a large tipping moment during a forward impact. As mentioned above, when the vertical distance between the child shoulder restraint and the seat belt pathway is substantial, the magnitude of the applied moment is correspondingly increased. Second, the position of the seat belt entry point does not meet the standards set forth in SAE J1819 (i.e., the entry point is not outside the 200 mm radius from the seat bight).

Some child restraints are designed to be effective in reacting the tipping moment, but rely on a vehicle shoulder harness for minimizing forward excursions. As such, these restraints provide a sub-optimal child restraint when used in vehicles which provide only a lap belt restraint (a Type I seatbelt). For example, U.S. Pat No. 4,826,246 to Meeker describes a child car seat with harness that is designed with a view towards reducing the tipping moment when the car seat is secured in a vehicle seat using a three-point vehicle seat belt assembly (a Type II seatbelt). An additional drawback of Meeker is that the child seating surface is offset from the vehicle seat back to accommodate the tubular frame for receiving the seat belt and supporting the seat (as with Boudreau).

Some child restraints provide for a child seat that is positioned flush against the vehicle seat back (thereby minimizing the forward offset from the vehicle seat), but require additional restraint devices for securing the child seat in the vehicle seat. One example of such a restraint device is disclosed in U.S. Pat. No. 3,910,634 to Morris, which relies a top tether system, thereby requiring the vehicle to provide anchorage points for both the seat back and seat bottom anchorage straps to provide an adequate restraint for the seat. Although car seats with harness that use a top tether restraint (as in Morris) are effective in reducing the effects of a tipping moment, this approach is disfavored for two reasons. First, users will often disregard attaching the top tether and simply secure the child seat using only the vehicle seatbelt. Second, in the U.S., very few vehicles are equipped with a top tether anchor, thereby requiring the user to install an anchor in the vehicle in order to properly restrain the child seat in the vehicle seat. Another example of an additional restraint device is illustrated in U.S. Pat. No. 3,709,558 to Jakob. This child restraint provides a seat body adapted to be placed flush against the vehicle seat. However, the seat belt restraint used in Jakob is limited to use in vehicles that have seat belt anchors that do not extend beyond the seat bight. Jakob's seat belt restraint is therefore disfavored since the restraint does not comply with the compatibility standards under SAE J1819.

Some child restraint designs are equipped with seatbelt entry points that are positioned away from the vehicle seat bight (thereby being more readily adapted for compliance with the recommended seatbelt anchor position under SAE J1819), but will contain inherent shortcomings in the seatbelt routing path affecting the strength performance of the child car seat during a forward impact event. For example, U.S. Pat. No. 4,345,791 to Bryans discloses a child restraint that positions the vehicle seatbelt over the front side wall surfaces of the seat and across the seating surface. Bryans's child restraint is disfavored since by extending the vehicle seatbelt across the seating area, the seatbelt will apply an inwardly directed resultant force at the side wall restraint points tending to buckle the seat during a forward impact event. It is preferable to rout the vehicle seatbelt in such a way as to eliminate any net inwardly directed forces applied to the child seat. Another example of a child restraint having a vehicle seatbelt pathway extending across the seating area is found in U.S. Pat. No. 4,040,664 to Tanaka.

In light of the drawbacks and limitations described and shown in existing forward facing add-on child restraint systems, there is a need for a child restraint that provides superior safety performance during a vehicle forward impact event. In particular, the known child restraints suffer from one or more of the following drawbacks: the vertical seat back of the child car seat is offset from the vehicle seat back, thereby reducing the distance between the child occupant and a forward interior obstacle of the vehicle; the seating surface for the child is elevated and/or the position the seat belt pathway is positioned too low in the seat, either of which can make the child car seat susceptible to excessive tipping during the forward impact event; the child car seat relies on a tubular frame or other similar type of strengthening structure disposed between the child seating surface and the vehicle seat to react applied loads, thereby preventing the child seating surface from being positionable in close proximity to the vehicle seating surface so as to increase the distance between the child occupant and a forward interior surface of the vehicle; or the child car seat requires the use of a top tether anchorage or vehicle shoulder belt to effectively restrain the child car seat in the vehicle seat.

SUMMARY OF INVENTION

The invention satisfies these needs while avoiding the problems and disadvantages of the existing art by providing a forward facing child restraint with harness that exhibits a high degree of flexural rigidity during a forward impact event, positions the seating surfaces for the child occupant in close proximity to the vehicle seating surfaces, and is fully restrainable in a vehicle seat using only a vehicle lap belt (i.e., a Type I seatbelt restraint). In particular, the child restraint system of the invention is readily adapted for meeting the safety requirements of CMVSS 213 and FMVSS 213 for passenger weights ranging from 20 to 60 lb. for a Type I seatbelt restraint without a top tether anchorage, and also meets seatbelt compatibility standards under SAE J 1819.

In one aspect of the invention, the child restraint includes a seating portion formed integrally with a vehicle seatbelt pathway for fully restraining the child car seat using only a vehicle lap belt. The seatbelt pathway includes left and right seatbelt restraints disposed on left and right triangularly shaped supports formed with the seat portion, and a central pathway extending across the rear surface of the upper seatback of the seating portion. Each of the vehicle seatbelt restraints are formed on a diagonal member of the triangularly shaped support extending between an upper and lower end of the car seat.

Preferably, the diagonal member includes a bend formed adjacent to the seatbelt restraint surface for locating and visual identification of the seatbelt restraint surface on the diagonal member. The bend also serves as a preferred approach for reducing the seatbelt pathway length to accommodate seatbelt lengths adopting the standards set forth under SAE J1819. Each of the triangularly shaped supports may also include a support member orientated to extend along the line of action of the forces applied at the seatbelt restraint surfaces by the vehicle lap belt, and a lower transverse member extending between the left and right support members of the respective left and right triangular supports. The support members and lower transverse member are operative for providing additional strength and/or stiffness to the child car seat when seatbelt loads are applied at the seatbelt restraint surfaces.

In a further aspect of the invention, the child restraint includes a support frame having left and right supports coupled to the left and right sides of an L-shaped seat portion. Child harness and vehicle seatbelt restraint loads are transmitted directly to the support frame by restraining the vehicle seatbelt against restraint surfaces formed on the left and right supports and anchoring the child harness to the support frame. The left and right supports function as the primary load paths for loads induced during the forward impact event. The left and right supports include a primary strut extending downward from a top end proximal to the upper end of the seat portion and terminating at a front end proximal to the forward end of the seating portion, a central portion disposed between the top and forward ends, and an axial strut coupled to the central portion and to the seat portion adjacent to the seat portion apex, defined as the location where the horizontal and upstanding seatback of the seat portion meet. In this embodiment of the child restraint, the support frame and seat portion may be implemented as a network of tubular bars coupled to a seat panel, or the support frame and seat portion may be constructed as a one-piece car seat shell.

In the tubular bar implementation of the child restraint, the axial strut corresponds to an axial bar and the primary strut corresponds to a diagonal bar interconnected by, for example, a weld joint. The left and right supports may also include an L-shaped bar section connecting the seat panel to the axial bar and diagonal bar. In this configuration, the bar frame defined by the L-shaped bar and diagonal bar describes a triangularly shaped support structure providing a high degree of flexural rigidity to the child car seat when the child car seat is subjected to a forward impact event.

In the shell implementation of the child restraint, the left and right supports correspond to walls of a load-bearing shell structure wherein the axial strut corresponds to stiffeners formed integrally with an outer wall section and the primary strut corresponds to a diagonally extending wall section. The left and right supports may also include an L-shaped section connecting the seat portion to the integrally formed stiffeners and the diagonally extending wall section. In this configuration, the shell defined by the L-shaped section and diagonally extending wall section describe a triangularly shaped shell structure providing a high degree of flexural rigidity to the child car seat when the child car seat is subjected to a forward impact event, as was found in the case of the tubular truss implementation. Thus, the child restraint system of the invention may be practiced by a network of bars with attached seat panel or by a car seat shell structure.

In still another aspect of the invention, there is provided a shell structure of a child car seat characterized as a semi-monocoque shell. The semi-monocoque shell is a closed walled, load bearing shell having a top end defining shoulder strap restraint points of an attached child harness, a forward end, a seat portion formed between the top and forward ends of the seat portion, and left and right frame portions defining left and right vehicle seatbelt restraint surfaces extending forwardly from the seat portion. The left and right frame portions are adapted for reacting a substantial portion of the forward inertia loads applied at the child harness restraint points and rearward restraint loads applied by the vehicle lap belt during the forward impact event. Thus, the left and right frame portions are adapted for providing a majority of the bending stiffness to the child restraint for limiting forward excursions during the forward impact event.

The seat portion of the semi-monocoque shell includes a vertically disposed pair of front and rear panels of a vertical seat portion defining a front seating surface and rear surface positionable against the vehicle back support surface, respectively, and a horizontally disposed pair of front and rear panels of a horizontal seat portion defining a front seating surface and rear surface positionable against the vehicle seat bench, respectively. The front and rear panels of the vertical seat portion are positioned in such a manner as to provide an upper seating surface disposed in close proximity to the vehicle back support surface at the vertical seat portion's upper end. The front and rear panels of the horizontal seat portion are positioned in such a manner as to provide a lower seating surface disposed in close proximity to the vehicle seat bench at the horizontal seat portion's rearward end. Preferably, the front and rear planar panel portions of the horizontal seat portion include an integrally formed stiffener for strengthening the seat. The stiffener may be formed by an inwardly protruding series of tac-offs formed on the front panel and extending through and structurally coupled to the rear panel, or by inwardly protruding rib stiffeners formed on the rear panel. In either case, the thickness of the horizontal seat section is determined by the desired size of the tac-offs, rib stiffeners, or a combination thereof.

BRIEF DESCRIPTION OF THE DRAWINGS

FIG. 6 is an isometric view of a seatbelt pathway of the car seat of FIG. 1 for receiving a vehicle lap belt.

FIG. 6a is an isometric view of a seatbelt pathway of the car seat of FIG. 1 for receiving a combination vehicle lap belt and shoulder belt.

FIGS. 7 and 8 are top and partial side views, respectively, of the frame of FIG. 2 illustrating the forces of a vehicle seatbelt during a forward impact event.

DETAILED DESCRIPTION OF THE PREFERRED EMBODIMENTS

Reference will now be made in detail to three embodiments of the invention. The first embodiment is a schematic embodiment, represented in terms of the functional attributes of a preferred physical implementation of the invention. The second and third embodiments of the invention are exemplary physical implementations of car seats incorporating the principles of the first embodiment. The second and third embodiments refer, respectively, to a first physical implementation a car seat readily adaptable for use as a child restraint system, and a second, preferred physical implementation of a car seat embodiment representing a child restraint system of the invention.

First Embodiment—Seat 100

Figure 1:
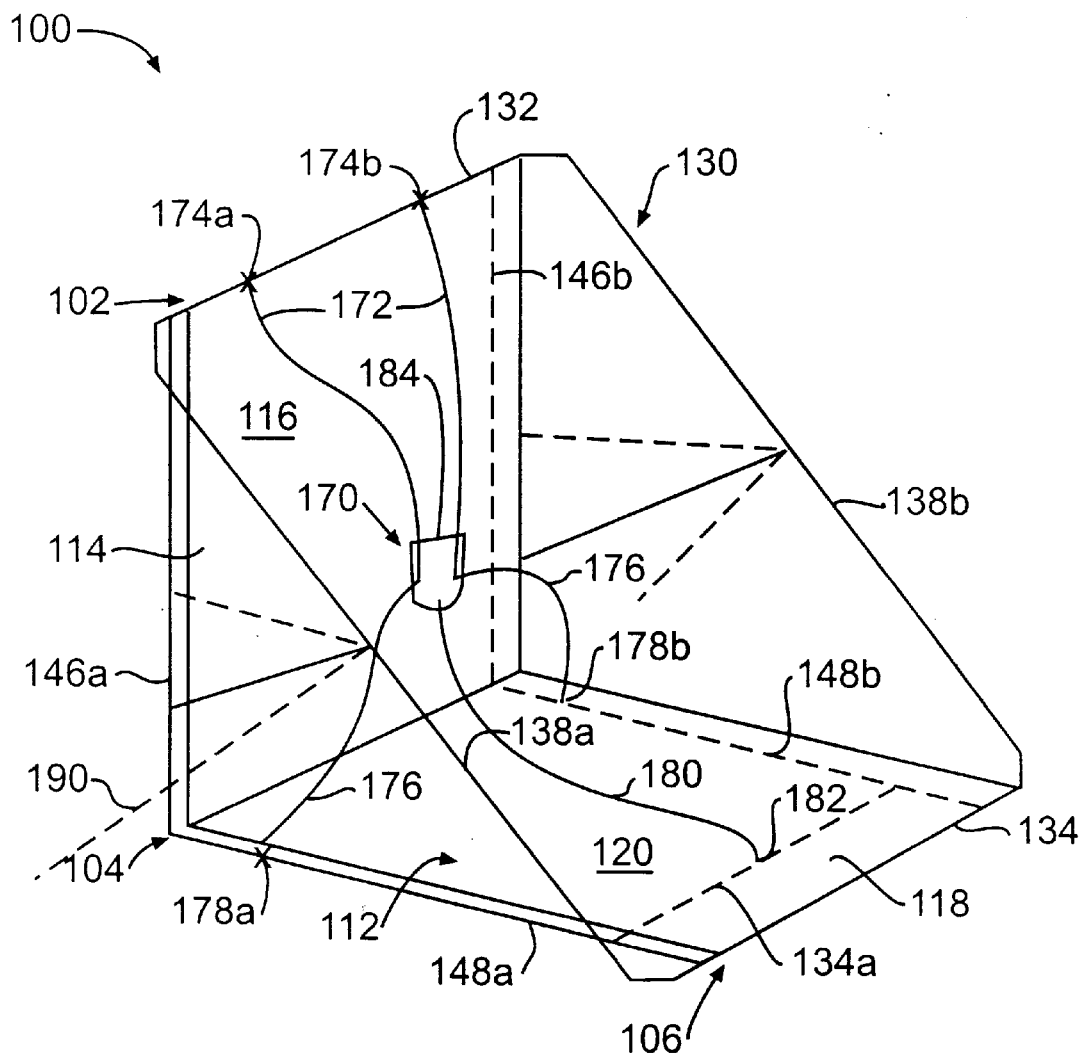
FIG. 1 is an isometric view of a schematic car seat illustrating the functional characteristics of a car seat.
Figure 1A:
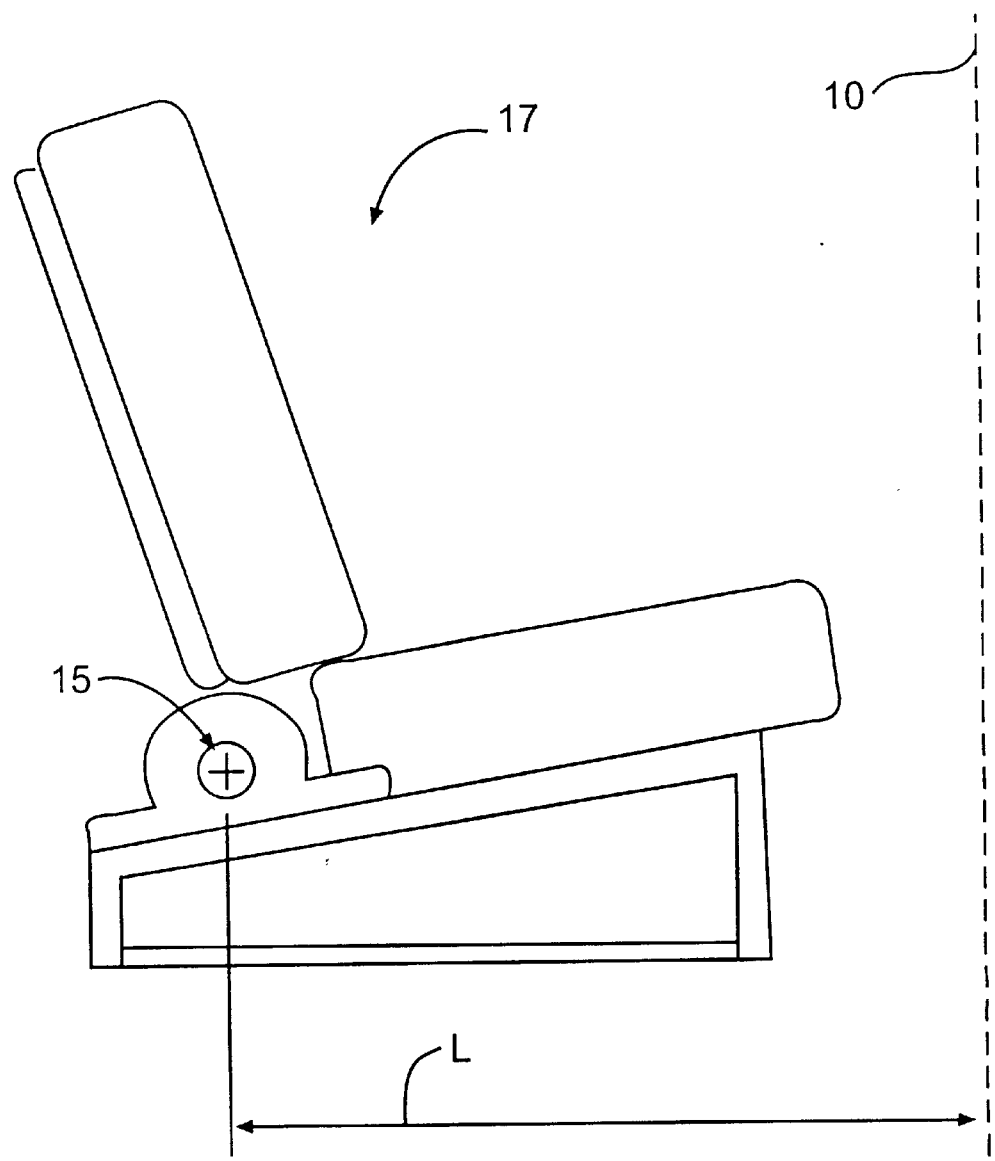
FIG. 1a is a side view of a vehicle seat assembly.
Figure 2:
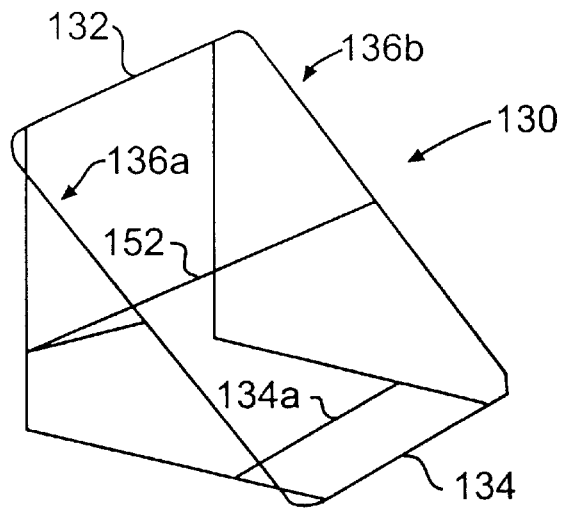
FIG. 2 is an isometric view of a frame of the car seat of FIG. 1.
Figure 3:
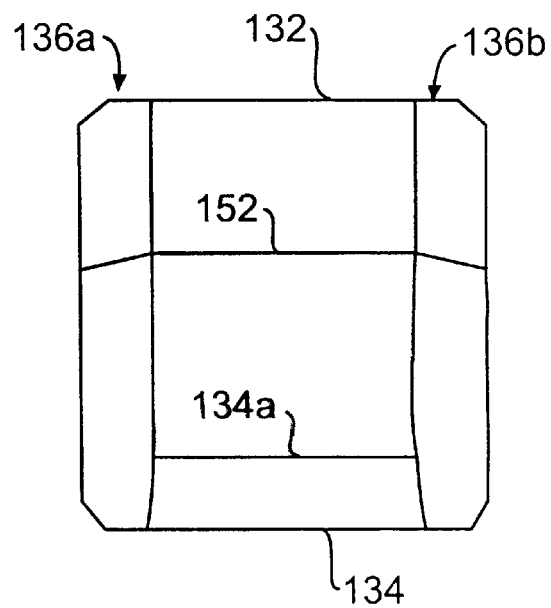
FIG. 3 is a front view of the frame of FIG. 2.

Reference will now be made in detail to a schematic car seat embodiment of a child restraint system. Referring to FIG. 1, schematic car seat 100 includes a seating portion 112, child harness 170, and seatbelt pathway 190 for restraining seat 100 in a vehicle passenger seat using a vehicle seatbelt assembly. The load bearing structure for seat 100 is represented by frame 130, which illustrates the characteristics of a structure reacting the forces induced by the vehicle seatbelt assembly routed through seatbelt pathway 190 and passenger inertia loads applied through child harness 170 in terms of the load paths of internal reaction forces within the structure, external force application points on the structure, and the stiffness properties exhibited by the structure in reacting the applied loads. Thus, frame 130 does not represent any particular physical embodiment, rather, frame 130 represents any of several contemplated physical implementations, examples of which are provided herein and in greater detail by reference to the second and third embodiments of the invention that follow. Referring to FIGS. 2 and 3, the structure described by frame 130 includes opposed left and right triangular structures, 136a and 136b with transverse structures 132, 134, 134a and 152 extending therebetween.

Figure 4:
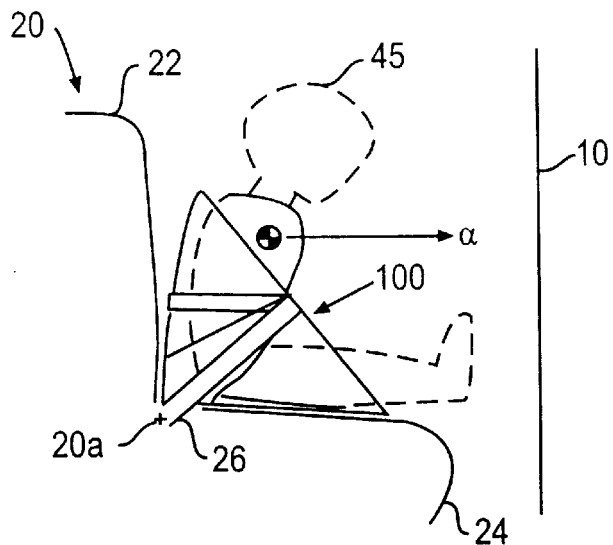
FIG. 4 is a side view of the seat of FIG. 1 with a child occupant restrained in a vehicle seat during a forward impact event.

With regard to the external forces applied to seat 100, reference will be made to the loading environment during a forward impact event. By discussing the functional aspects of seat 100 in view of the forces applied to seat 100 during a forward impact event, the internal load paths and stiffness (or strength) properties of frame 130 will be more readily understood and appreciated by the artisan. Referring to FIG. 4, during a forward impact event child 45 is subjected to a forward acceleration α which tends to throw child 45 and seat 100 forwardly towards a plane 10 defining the closest point of a vehicle forward interior surface to vehicle upper seatback 22 of vehicle seat 20. Seat 100 is secured in vehicle seat 20 by a vehicle seat belt 26 routed through seatbelt pathway 190 and secured to the vehicle manufacturer-provided seat belt anchorage extending from the bight 20a of vehicle seat 20. External forces applied during the forward impact event consist mainly of forces applied by harness 170, seatbelt 26 and vehicle seat bench 24.

In the following description of seat 100, reference will be made to a first child harness 170, seating portion 112 and seatbelt pathway 190 of seat 100, followed by a detailed description of the load paths and structural properties of the structure represented by frame 130, accompanied with examples of representative physical implementations.

First Child Harness 170

Referring to FIG. 1, child harness 170 includes a pair of shoulder restraints 172, lap restraints 176 and a crotch restraint 180 connected through a harness latching device 184 at their proximal ends and securable at frame attachment points at their distal ends. Thus, harness 170 is a five-point harness restraint. Restraints 172, 176 and 180 are used to restrain child 45 and will therefore apply the reaction forces to seat 100 necessary to react a child occupant's forward inertia loads (neglecting the frictional forces between the child and the seating surfaces 114, 118 of seating portion 112). Harness 170 is securable to seat 100 as follows: shoulder restraints 172 are securable at left shoulder restraint attachment 174a and right shoulder restraint attachment 174b, which are disposed adjacent to the load path in frame 130 provided by upper transverse structure 132. Left and right lap restraints 176a, 176b are securable at lap restraint attachments 178a and 178b, which are disposed at the left and right sides of seating portion 112 and adjacent to the respective left and right horizontal load paths defined by horizontal structures 148a and 148b. Crotch restraint 180 is securable at a crotch attachment point 182 located along the centerline of seating portion 112 and inwardly of a forward end 106 of seat 100 so as to accommodate the seating size of the child occupant of seat 100. Crotch restraint attachment 182 is disposed adjacent to a crotch attachment load path of frame 130 provided by crotch attachment structure 134a.

Figure 5:
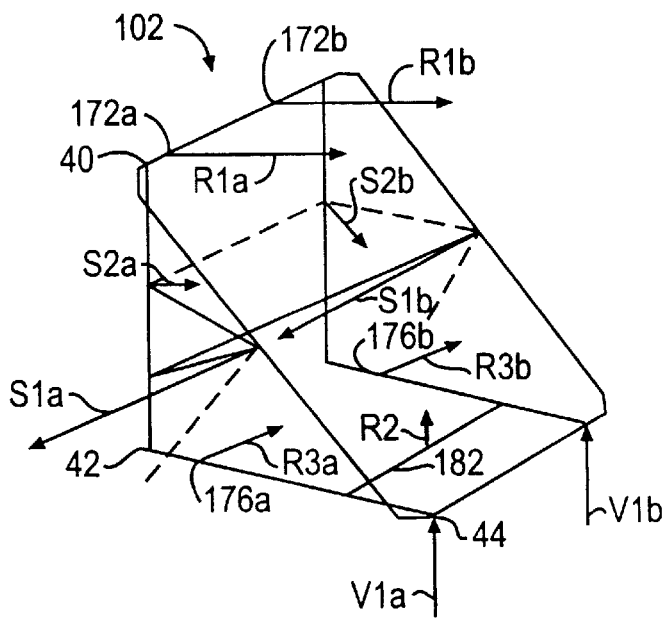
FIG. 5 is an isometric view of the frame of FIG. 2 illustrating the forces of a child harness and vehicle seatbelt during a forward impact event.

Forces applied by harness 170 to the structure represented by frame 130 are illustrated in the free body diagram of FIG. 5. Shoulder restraint forces R1a and R1b, applied at the respective shoulder restraint attachments 174a and 174b, are reacted by internal loads extending along the load path defined by upper transverse structure 132. Lap restraint forces R3a and R3b, applied at the respective lap restraints 178a and 178b, are reacted by internal loads extending along the respective load paths defined by horizontal structures 148a and 148b. Crotch restraint force R2, applied to at crotch restraint attachment 182, is reacted by internal loads extending along the load path defined by crotch attachment structure 134a.

Harness 170 may be replaced by a three-point harness having shoulder restraints and crotch restraint joined at their proximal ends to a latching device (for example, in the form of a T-shaped body shield) and attached at shoulder and crotch restraint attachments at their distal ends, as described above. In this embodiment, the portion of the child occupant's forward inertia loads applied at lap restraint attachments 178a, 178b of the five-point harness are now reacted entirely by internal loads extending along crotch restraint attachment structure 134a and upper transverse structure 132. Harness 170 may also be replaced by other types of child harness types. For example, a four-point child harness having a pair of shoulder straps releasably securable to a pair of left and right seat straps anchored to frame 130 at the respective left and right horizontal structures 148a and 148b.

Seating Portion 112

Reference will now be made in detail to the positioning of the seating surfaces for a child occupant of seat 100 relative to vehicle seat 20 and frame 130.

Referring to FIG. 1, seating portion 112 includes an upper seat back 114 and lower seat 118 defining upper and lower seating surfaces 116 and 120, respectively, for seat 100. Seating portion 112 is securable along its perimeter by the portions of the structure represented by frame 130 in structures 132, 134, 146a, 146b, 148a and 148b. Seating portion 112 may also be formed integrally with frame 130. Since the forces applied to seat 100 through harness attachments 174a, 174b, 178a, 178b and 182 are carried by the structure represented by frame 130, the majority of the forces carried by seating portion 112 during the forward impact event will originate from the child inertia forces directed towards seat bench 24 (i.e., forces tending to deflect seating portion 112 into vehicle seat bench 24). Thus, lower seat 118 is required to have adequate stiffness/strength properties to support child inertia forces distributed over lower seating surface 120, but need not necessarily have the bending strength/stiffness properties necessary for reacting the forces induced by the forward inertia loads of the child occupant during the forward impact event.

Figure 9:
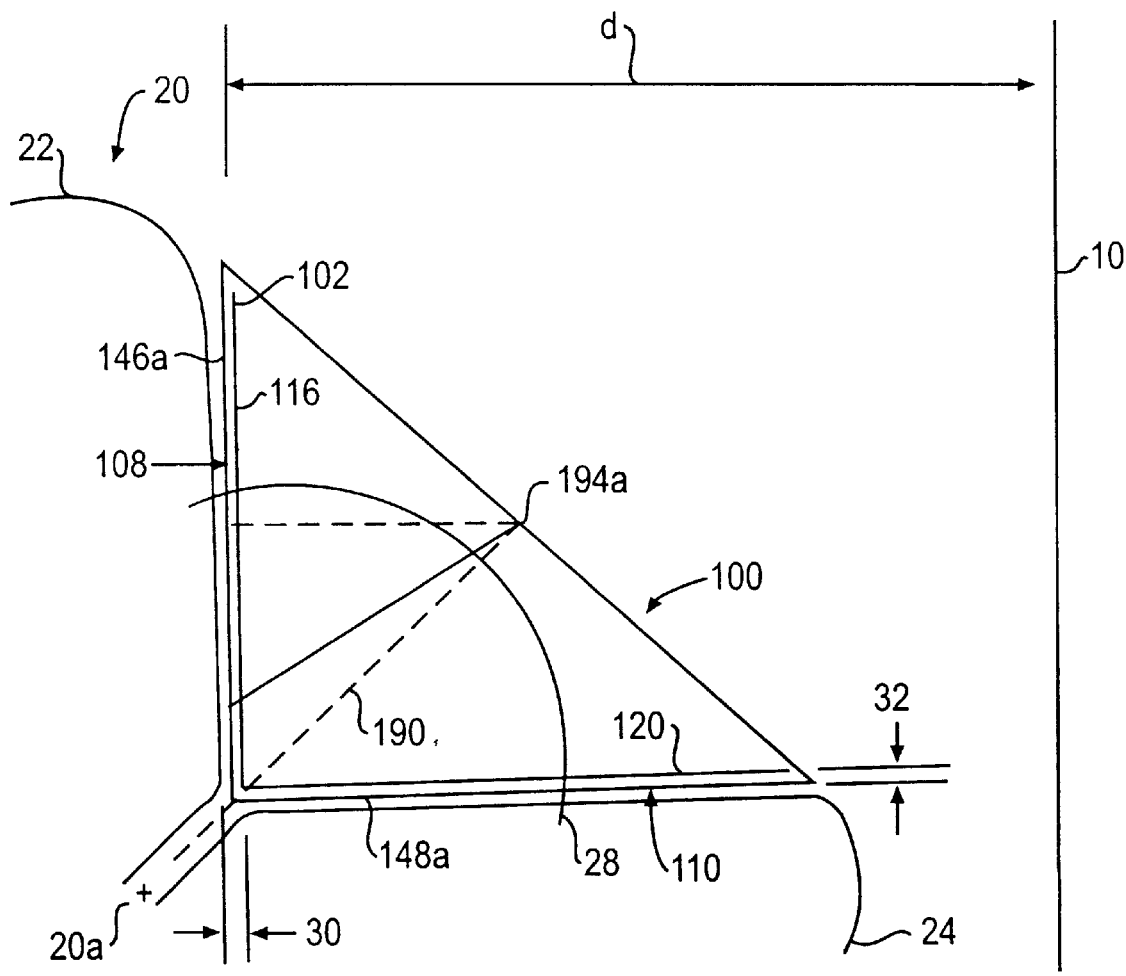
FIG. 9 is a side view of the seat of FIG. 1 placed in a vehicle seat.

Referring to FIG. 9, showing seat 100 in vehicle seat 20, seat 100 is placed in vehicle seat 20 by positioning vehicle upper seat back 22 against an upper rear surface 108 of seat 100 by the rearward surfaces of vertical structures 146a and 146b and positioning vehicle lower seat 24 against a lower rear surface 110 of seat 100 defined by the lower surfaces of horizontal structures 148a and 148b. Seating area 112 is positioned relative to upper rear surface 108 and lower rear surface 110 of seat 100 as follows. Upper seating surface 116 is positioned in frame 130 so as to lie adjacent to upper rear surface 108 of seat 100. Similarly, lower seating surface 120 is positioned in frame 130 so as to lie adjacent to lower rear surface 110 of seat 100. When upper seating surface 116 and lower seating surface 120 are positioned adjacent to the respective upper rear surface 108 and lower rear surface 110 of seat 100, the respective forward offset 30 and vertical offsets 32 from vehicle seat 20 are minimized. In particular, it is desirable to minimize forward offset 30 of upper seating surface 116 in the vicinity of shoulder restraint attachments 174a, 174b and vertical offset 32 at a rearward portion of lower seating surface 120 corresponding to the seat location where the child's buttocks are placed in seat 112. By minimizing forward offset 30 of upper seating surface in the vicinity of shoulder restraint attachments 174a, 174b, the distance d from upper seating surface 116 to forward plane 10 is increased, thereby reducing the likelihood that the child's head will be injured by coming into contact with a forward interior surface located near plane 10 during the forward impact event. By minimizing vertical offset 32, the child is moved closer to the vehicle lower seat, thereby allowing shoulder restraint 172, shoulder attachments 174 to be moved down in vehicle seat 20 relative to the seat belt pathway 190. As can be appreciated by recognizing that the vertical offset of the child from vehicle seat bench 24 is a major factor affecting the forward tipping of seat 100 during the forward impact event it is desirable to reduce offset 32 as much as possible to minimize the leveraging or moment inducing forces tending to rotate and deflect seat 100 forwardly during the forward impact event.

Upper seating surface 116 and lower seating surface 120 may be positioned to extend in an approximately adjacent parallel relation to the respective upper rear surface 108 and lower rear surface 110 to achieve the desired minimal forward and vertical offsets from the vehicle seat. However, this is not a requirement since an inclined upper and lower seating surface may also provide the desired minimal forward offset 30 of upper seating surface 116 in the vicinity of shoulder restraints 174 and minimal vertical offset 32 at the buttock area of lower seating surface 120. For example, upper seating surface 116 may be reclined to provide a minimal forward offset 30 in the vicinity of shoulder restraints 174a, 147b with the lower portions of upper seating surface 116 having an greater offset from upper rear surface 108. Similarly, lower seating surface 120 may be inclined to provide a minimal offset at the buttock area with the forward end supporting the child's upper leg being elevated relative to the buttock area.

Seatbelt Pathway 190

Reference will now be made in detail to seat belt pathway 190 and frame 130 supporting structure for seatbelt pathway 190.

Referring to FIG. 1, seat 100 with child 45 is capable of being fully restrained in the vehicle seat 20 by routing a Type I seat belt assembly, i.e., vehicle seatbelt 26, through seatbelt pathway 190a. Thus, a top tether anchorage is not needed in addition to seat belt 26 to properly restrain seat 100 in vehicle seat 20 and provide exceptional performance during the forward impact event. Seat 100 may also by fully secured in vehicle seat 20 by routing a Type II seat belt assembly (lap belt and shoulder belt) through seatbelt pathway 190.

Seat belt pathway 190 defines the routing path and restraint points for restraining the structure represented frame 130 and thus seat 100 in vehicle seat 20 by vehicle seatbelt 26. Referring to FIG. 6, seat belt pathway 190 includes opposed left and right forward seatbelt restraints 194a and 194b disposed on left and right diagonal structures 138a and 138b of frame 130, and left and right rearward seatbelt restraints 194c and 194d disposed on left and right vertical structures 146a and 146b. Left and right entry paths 198a, 198b, left and right horizontal paths 196a, 196b, and a central path 192 of seatbelt pathway 190 extending between the respective restraint points 194c, 194d as follows. Seatbelt entry paths 198a, 198b extend upwardly and forwardly from seatbelt anchorage points 26a, 26b to the respective forward seat belt restraints 194a, 194b. Horizontal seatbelt paths 196a, 196b extend between the respective left restraints 194a, 194c and right restraints 194b, 194d. Central path 192 extends across the upper rear surface of frame 130 (coincident with upper rear surface 108 of seat 100) and between left and right rearward restraints 194a, 194b.

FIGS. 5, 7 and 8 illustrate the resultant forces applied to seat 100 by a seatbelt 26 routed through seatbelt pathway 190. The seatbelt forces include forward seatbelt forces S1a, S1$b$ applied at the respective left and right forward restraints 194$a$, 194$b$ and rearward seatbelt forces S2$a$, S2$b$ applied at the respective left and right rearward restraints 194$c$, 198$d$. As can be seen by reference to FIG. 7, seatbelt belt forces are symmetric about the centerline of frame 130. Vehicle seatbelt is a tension member and therefore restrains seat 100 in vehicle seat 20 by tensile loads carried in the seatbelt webbing. The direction and magnitude of forces S1$a$, S1$b$, S2$a$, S2$b$ applied at the restraints 194$a$, 194$b$, 194$c$ and 194$d$ depend on the tension in, and orientation of, the two adjoining segments of seatbelt 26 in the vicinity of the respective restraint point. For example, the magnitude and direction of force S1$a$ applied at restraint 194$a$ is a function of the tension in and orientation of the segments of seatbelt 26 extending along entry path 198$a$ and horizontal path 196$a$ of seatbelt pathway 190 in the vicinity of restraint 194$a$.

In general, the tension in seatbelt 26 is not everywhere equal, since frictional forces act between the seatbelt 26 and restraints 194. Referring to FIG. 8, if friction is neglected, the direction of S1$a$ will be such as to extend along the bisection b of an angle $\theta_1$ extending between horizontal path 196$a$ and entry path 198$a$. When frictional forces are taken into account (e.g., surface friction or friction applied by a seatbelt lock-off clamp disposed at restraint 194$a$), the tension in the segment of seatbelt 26 extending along horizontal path 196$a$ is reduced, thereby orientating S1$a$ more along the direction defined by entry path 198$a$. The effect of friction forces at restraint 194$a$ influence the magnitude of the seatbelt forces as follows. Since the frictional forces acting at restraints 194$a$ and 194$b$ reduce the tension in the segments of seatbelt 26 extending along horizontal paths 196$a$, 196$b$ and central path 192, forces S1$a$ and S2$a$ are correspondingly of greater magnitude than forces S2$a$ and S2$b$.

Referring to FIG. 7, showing a top view of frame 130, seat belt pathway 190 extends over the structure represented frame 130 so as to minimize the net transverse force Fnet applied to seat 100, as will be readily understood by reference to the seatbelt path angle $\theta_2$ extending between central path 192 and horizontal paths 196, and the seatbelt path angle $\theta_3$ extending between horizontal paths 196 and the respective entry paths 198. Seatbelt forces S1$a$ and S1$b$ are directed outwardly (i.e., the forces have transverse components in the directions of $F_{net}$), whereas seatbelt forces S2$a$ and S2$b$ are directed inwardly towards the centerline of frame 130, as illustrated in FIG. 7. Since forces S1$a$ and S2$a$ have transverse force components in opposite directions to forces S2$a$ and S2$b$, the overall net transverse force $F_{net}$ on seat 100 is reduced. Net transverse force $F_{net}$ is further reduced by extending restraints 194$a$ and 194$b$ outwardly from restraints 194$c$ and 194$d$, thereby reducing seatbelt path angle $\theta_2$ between horizontal paths 196$a$, 196$b$ and the respective entry paths 198$a$, 198$b$. Forces S1$a$ and S1$b$ are orientated more along the rearward direction of frame 130 (i.e., front to back) when seatbelt path angle $\theta_2$ is reduced.

As mentioned earlier, seat 100 may also be restrained using a Type II vehicle seat belt assembly (shoulder belt and lap belt). FIG. 6$a$ illustrates a seatbelt pathway 191 of frame 130 for a Type II seatbelt assembly. When threaded through seatbelt pathway 191, the vehicle shoulder belt 191$a$ is positioned against an upper portion of frame 130 at shoulder belt restraint 191$b$ when the vehicle seatbelt is inserted from the left side of frame 130 (i.e., when the seatbelt entry point corresponds to left restraint 194$a$). When the vehicle seatbelt is inserted from the right side of frame 130, vehicle shoulder belt 191$a$ is positioned against a corresponding right shoulder belt restraint 191$c$. By positioning shoulder belt 191$b$ against either of shoulder belt restraints 191$b$ and 191$c$, shoulder belt 191$a$ provides an additional restraining force against frame 130 effective for counteracting the tipping moment and thereby further reducing forward excursions of the child occupant during the forward impact event.

Referring to FIG. 9, showing a side view of seat 100 in vehicle seat 20, forward seatbelt restraint 194$a$ is positioned forward of, and above the respective seating surfaces 116 and 120 of seating area 102 so as to allow seat 100 to be effectively securable in vehicles with seatbelts having seatbelt anchors extending outwardly and forwardly from the vehicle seat bight 20$a$ (the intersection of the upper seat 22 and lower seat bench 24). Right forward seatbelt restraint 194$b$ (hidden from view in FIG. 9) is located at the same position relative to upper seating surface 116 and lower seating surface 120 as left forward seatbelt restraint 194$a$. The maximum seatbelt anchor position corresponds to a radius 28 that extends out from vehicle seat bight 20$a$ (e.g., the current vehicle manufacturer recommended maximum seatbelt anchor position is defined by a radius of 8 inches or 20.32 cm from vehicle seat bight 20$a$). By positioning seatbelt restraint 194$a$ outside of radius 28, seatbelt 26 can be effectively tensioned against restraint 194$a$, thereby precluding unwanted movement of seat 100 relative to vehicle seat 20.

Frame 130

Reference will now be made in detail to the load paths and structural properties of frame 130. Referring again to the free body diagram of FIG. 5, the external forces applied to frame 130 include: forces R1$a$, R1$b$, R2, R3$a$ and R3$b$ representing the forces of harness 170; forces S1$a$, S1$b$, S2$a$ and S2$b$ representing the forces of seatbelt 26 (as discussed earlier); and net vehicle seat bench forces V1$a$ and V1$b$ of vehicle seat bench 24 applied at forward end 106. Since frame 130 and the applied forces are left-to-right symmetric about the center of frame 130, the detailed description of frame 130 will refer primarily to left frame portion 130$a$ of frame 130, as illustrated in FIG. 10, with the understanding that the same description applies to right frame portion 130$b$.

Figure 10:
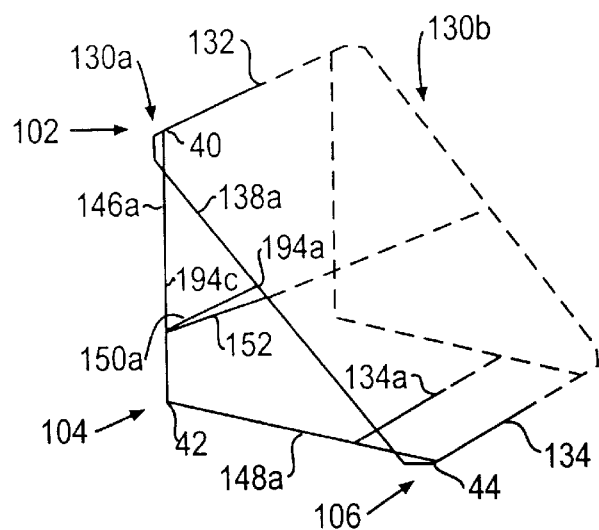
FIG. 10 is an isometric view of a portion of the frame of FIG. 2.

Referring to left frame portion 130$a$ illustrated in FIG. 10, left triangular structure 136$a$ includes load paths defined by vertical structure 146$a$, horizontal structure 148$a$, support structure 150$a$ and diagonal structure 138$a$. The internal loads extending along the load paths of frame 130 are coupled as follows. The load paths defined by vertical structure 146$a$ and upper extension 139$a$ of diagonal structure 138$a$ are coupled at upper end 102 at a first connection node 40 to upper transverse structure 132. The load paths defined by vertical structure 146$a$ and horizontal structure 148$a$ are coupled at lower end 104 at a second connection node 42. The load paths defined by horizontal structure 148$a$ and forward extension 139$b$ of diagonal structure 138$a$ are coupled at forward end 106 to forward transverse structure 134 at a third connection node 44. The load path defined by support structure 150$a$, coupled to vertical structure 146$a$ and diagonal structure 138$a$, extends from a position approximately midway between second connection node 42 and rearward seatbelt restraint 194$c$ to a position proximate to forward seat belt restraint 194$a$. The load path defined by lower transverse structure 152 is coupled to vertical structure 146$a$ at a location coincident with the coupling point of support structures 150$a$ to vertical structure 146$a$. The load path defined by crotch attachment structure 134$a$ is coupled to horizontal structure 148$a$ at a forward location corresponding to the forward position of crotch restraint attachment 182.

Figure 11:
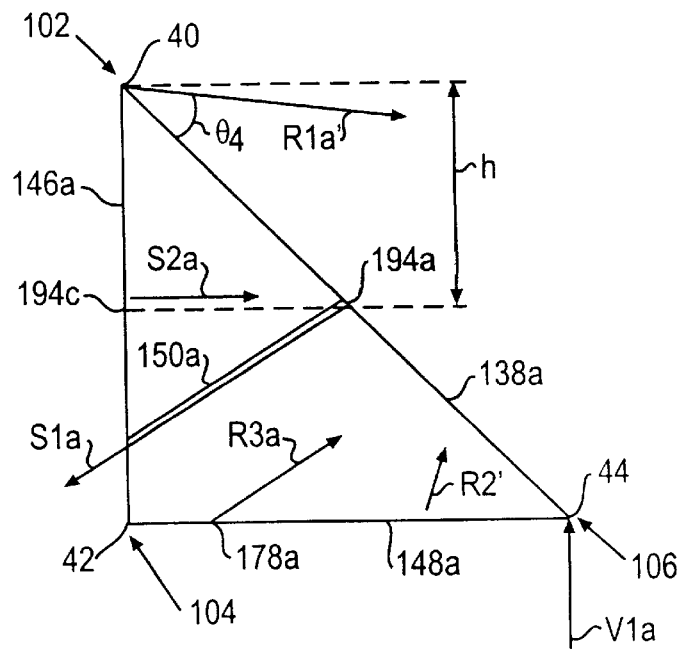
FIG. 11 is a side view of a portion of the frame of FIG. 2 with forces of a child harness and vehicle seatbelt during a forward impact event.

The following description will make reference to the free body diagrams of frame 130 and triangular structure 136$a$ in FIGS. 5 and 11.

Upper transverse structure 132 carries the majority of harness 170 loads applied through shoulder restraint attachments 174a during the forward impact event (as can be appreciated by realizing that the center of mass of child 45 is positioned closest to shoulder restraint attachment 174a, as illustrated in FIG. 4). Upper transverse structure 132 is representative of a structural member exhibiting stiffness sufficient for limiting the amount of forward deflection induced by force R1a in the vicinity of shoulder restraint attachment 174a. The internal shear force of upper transverse structure 132 transmitted to triangular structure 136a is represented in the free body diagram of FIG. 11 by force R1a' applied at first connection node 40. A physical embodiment of upper transverse structure 132 may correspond to a stiff bar (e.g., a steel bar or tube) received in a channel formed on upper rear surface 108 and extending between first connection node 40 of triangular structure 136a and the corresponding first connection node of right triangular portion 136a. Upper transverse structure 132 may also correspond to a stiff, tube-like member extending between and integrally connected to left and right triangular structures 136a and 136b at their respective first connection nodes. In either case, left and right shoulder restraints 172 can be readily fastened to the bar or tube member at the respective shoulder restraint attachments 174a, 174b, by a means well known in the art.

Crotch attachment structure 134a performs a function similar to upper transverse structure 132. Crotch attachment structure 134a is representative of a structural member exhibiting the stiffness necessary for limiting the amount of upwards deflection induced by force R2 in the vicinity of crotch restraint attachment 182. The internal shear force carried by crotch attachment structure 134a out to horizontal structure 148a is illustrated in the free body diagram of FIG. 11 by force R2'. A physical embodiment of crotch attachment structure 134a may correspond to a bar extending between the structure represented by horizontal structures 148a and 148b with crotch restraint 180 fastened to the bar at crotch restraint attachment 182 (as in the case of upper transverse structure 132). Crotch attachment structure 134a may also correspond to the planar member of lower seat 118, built-up in the vicinity of crotch attachment 182 (e.g., by a stiffener distributing forces across the lower surface of lower seat 118) with crotch restraint 180 secured by a means well known in the art. In the later case, internal shear load R2' is distributed over the structure represented by horizontal structure 148a since the load path from crotch restraint attachment 182 out to the structure represented by horizontal structure 148a is defined, in part, by loads in the planar structure defining lower seat 118.

Forward transverse structure 134 provides transverse stiffness to seat 100 for sustaining net transverse loads on seat 100 (i.e., the loads induced by seatbelt forces S1a, S2a, S1a and S2b as discussed earlier). A physical embodiment of forward transverse structure 134 may correspond to a tube extending between and integrally connected to triangular structures 136a, 136b at their respective forward ends.

FIG. 11 illustrates a side-view free body diagram of the structure whose load paths are defined by triangular structure 136a, with the coupling loads originating from upper transverse structure 132 and crotch attachment structure 134a represented by their respective internal shear loads R1a' and R2'. Referring to FIGS. 4 and 11, the triangular shape of structure 136a is representative of a structure providing a high degree of flexural rigidity to seat 100 when a forward tipping moment is applied to seat 100 during the forward impact event (as will be explained in more detail below). The magnitude of the forward tipping moment and the resultant internal loads carried in structure 136a is influenced primarily by the horizontal component (i.e., front to rear) of force R1a' vertically offset from the seatbelt restraint 194a by a distance h.

Diagonal structure 138a, horizontal structure 148a, vertical structure 146a and support structure 150a of triangular structure 136a represent load paths of internal forces reacting forces S1a, R1a' and V1a orientated in such a way as to define an efficient load bearing structure for stiffening frame 130 and therefore seat 100. As such, triangular structure 136a is representative of a triangularly shaped structure that exhibits favorable stiffness properties in the directions of the load paths described by structures 138a, 146a, 148a and 150a when reacting forces S1a, R1a' and V1a. These stiffness properties correspond to physical embodiments of triangular structure 136a which provide either the axial stiffness characteristics of a bar-like structure or the in-plane stiffness characteristics of a shell-like structure extending along the load paths defined by structures 138a, 146a, 148a and 150a. In the case of an axial bar stiffness, the favorable stiffness properties associated with an axially loaded bar are exploited by extending the longitudinal axis of the bar along a load path, thereby directing internal loads in the direction of the axial stiffness of the bar. In the case of a shell, the favorable stiffness properties associated with in-plane plate loads are utilized by extending the outer walls of the shell along a load path, thereby directing internal loads in the direction of the in-plane stiffness of the plate.

Referring again to FIG. 11, structures 138a, 146a and 148a are oriented so as to align axial or in-plane stiffness properties in the directions effective for reacting forces inducing the tipping moment. Diagonal structure 138a defines a diagonal load path orientated so as to react a significant portion of force R1a' through internal axial or in-plane loads. Accordingly, the axial or in-plane stiffness of a structure extends between first connection node 40 and third connection node 44 so as to resist the forward deflection of upper end 102 induced by force R1a'. The amount of axial or in-plane stiffness aligned with force R1a' depends on the angle between diagonal structure 138a and the line of action of R1a'. For example, when angle $\theta_4$ between diagonal structure 138a and R1a' is 45°, approximately ½ of the corresponding axial or in-plane stiffness of the structure represented by diagonal structure 138a is aligned with load R1a'. If the angle is increased to 60°, only ¼ of the axial or in-plane stiffness is aligned with R1a'. The resulting internal/external horizontal and vertical reaction loads induced at first connection node 40 and third connection node 44 (which are a function of the load path defined by diagonal structure 138a and the directions of the externally applied forces) are distributed through axial or in-plane load paths defined by vertical structure 146a and horizontal structure 148a, respectively. Accordingly, the load path defined by vertical structure 146a corresponds to the axial or in-plane stiffness directions of a structure extending between second connection node 42 and first connection node 40, and the horizontal load path represented by horizontal structure 148a corresponds to the axial or in-plane stiffness direction of a structure extending between second connection node 42 and third connection node 44. Thus, the forces present during a forward tipping moment are carried by structural members whose preferred axial stiffness properties (in the case of a bar-like structure) or in-plane stiffness properties (in the case of a shell like structure) extend along the respective axial or in-plane load paths defined by diagonal structure 138a, vertical structure 146a and horizontal structure 148a.

The load path defined by support structure 150*a* represents the internal loads induced by seatbelt force S1*a* applied at seatbelt restraint 194*a*. As illustrated in FIG. 11, support structure 150*a* extends from restraint 194*a* to a lower end of vertical structure 146*a* so as to align the axial or in-plane stiffness directions of support structure 150*a* along the line of action of force S1*a*. By aligning the axial or in-plane stiffness of support structure 150*a* along the line of action of force S1*a*, triangular structure 136*a* is effective in supporting forces applied by seatbelt 26 at restraint 194*a* and avoids having force S1*a* resolved through undesirable internal bending or shear loads in diagonal structure 138*a* The vertical and rearward components of load carried in support structure 150*a* are distributed along the vertical and horizontal in-plane or axial load paths defined by the respective vertical and horizontal structures 146*a*, 148*a*.

In view of the above, triangular structure 136*a* may be implemented in a physical embodiment by either a network of interconnected bars forming a truss structure with the bars extending along the axial load paths defined by structures 138*a*, 146*a*, 148*a* and 150*a*, or a shell structure having outer walls extending along the in-plane load paths defined by structures 138*a*, 146*a* and 148*a*, with support structure 150*a* corresponding to a wall section whose in-plane load path is defined by support structure 150*a*.

Referring to FIG. 7, the transverse components (i.e., left and right) of the loads carried in support structure 150*a* are reacted by lower transverse structure 152. A physical embodiment of lower transverse structure 152 may be implemented as: a) a bar extending between the locations where loads extending along left support structure 150*a* and corresponding right support structure 150*b* are coupled to the loads extending along vertical structures 146*a* and 146*b*; or b) lower structure 152 may correspond to a stiffened section of panel extending between the structure represented by left and right triangular portions (e.g., a rear surface of the seating portion 112 stiffened by rib stiffeners).

The internal forces in triangular structure 136*a* reacting forces S2*a* (seatbelt force) and R3*a* (harness 170 lap restraint force) are reacted, in part, by shear and bending forces in vertical structure 146*a* and horizontal structure 148*a*, respectively. With regard to force R3*a*, triangular structure 136*a* can be easily strengthened in the area corresponding to lap restraint attachment 178*a* (if necessary) by any of several means well known in the art without affecting the ability of triangular structure 136*a* to carry the dominant forces R1*a*', S1*a* and V1*a*.

The forward component of force S2*a* is reacted by internal shear loads in vertical structure 146*a* and axial or in-plane loads extending along support structure 150*a*. Thus, a significant portion of the stiffness aligned with forward component of force S2*a* corresponds to the axial or in-plane stiffness of support structure 150*a*. Referring again to FIG. 7, the transverse (left to right) component of force S2*a* is reacted by internal shear loads in vertical structure 146*a* and axial or in-plane loads extending along lower transverse structure 152. Thus, a significant portion of the stiffness aligned with the transverse component of force S2*a* corresponds to the axial or in-plane stiffness of lower transverse structure 152.

In addition to the favorable stiffness properties exhibited by a structure whose load paths correspond to the axial or in-plane stiffness directions of structures 138*a*, 146*a*, 148*a* and 150*a*, triangular structure 136*a* provides other advantages to seat 100 by virtue of its triangular shape. By directing the loads incident to a tipping moment out to and along a left and right triangularly shaped network of axial or in-plane load paths, seating surfaces 116 and 120 can be positioned in close proximity to the respective rear surfaces 108 and 110 since the portion of seat 100 extending between left and right triangular structures 136*a* and 136*b* is not needed for bending stiffness. Hence, triangular structures 136*a* and 136*b* allows seating surfaces 116 and 120 to be positionable adjacent to vehicle upper seatback 22 and lower seat bench 24 without the use of a top tether anchorage to limit the amount of forward excursions of upper end 102 during the forward impact event.

Second Embodiment—Truss Seat 200

Figure 12:
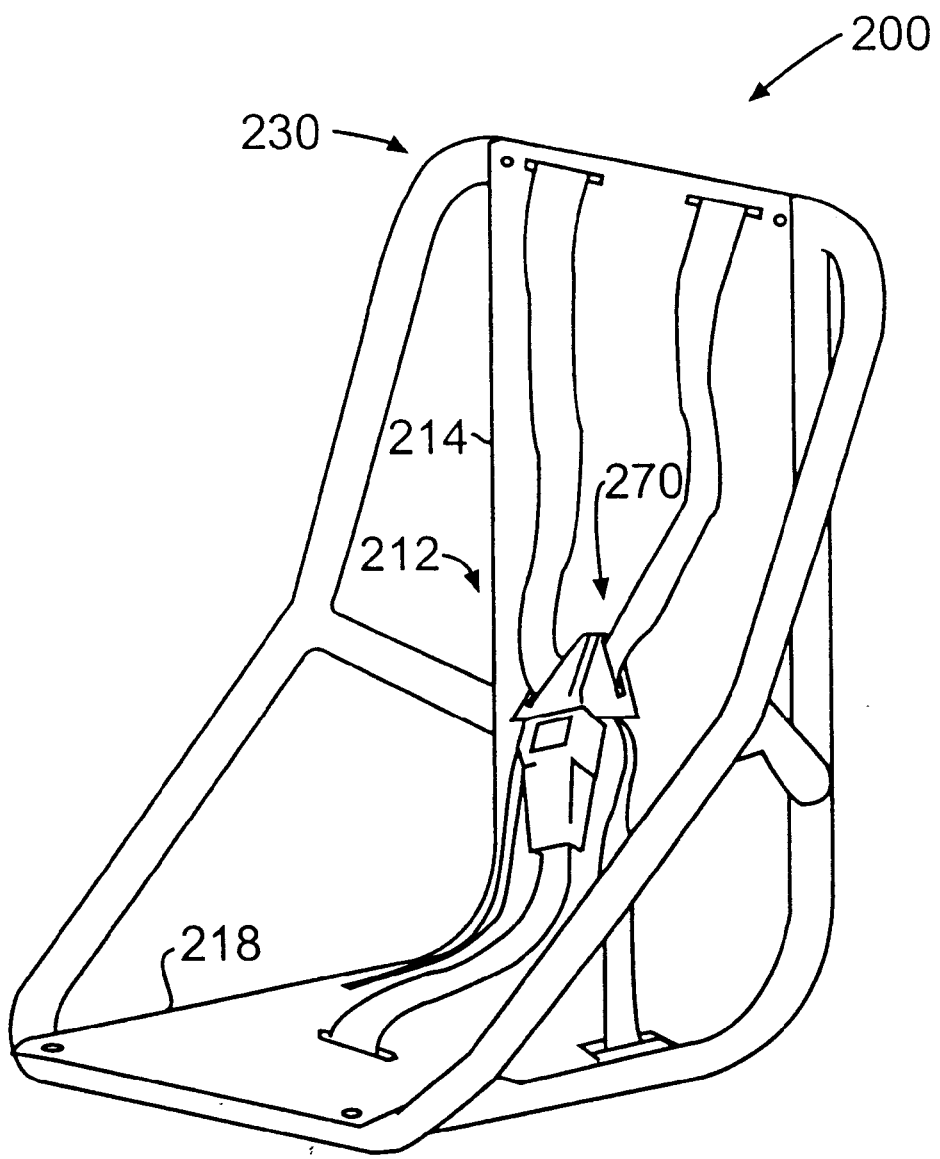
FIG. 12 is a front isometric view of a first physical embodiment of a car seat.

Reference will now be made in detail to a second embodiment of invention, a physical embodiment of seat 100 implemented as a truss seat 200, examples of which are illustrated in FIGS. 12–23. Referring to FIG. 12, truss seat 200 includes a seating panel 212 and child harness 270 attached to a truss frame 230, and a seatbelt pathway 270 routed through truss frame 230 for restraining truss seat 200 in a vehicle seat using a vehicle seatbelt assembly. Truss frame 230 is a physical embodiment of the structure represented by frame 130 of seat 100, implemented as a network of interconnected tubular bar members.

Child Harness 270

Figure 13:
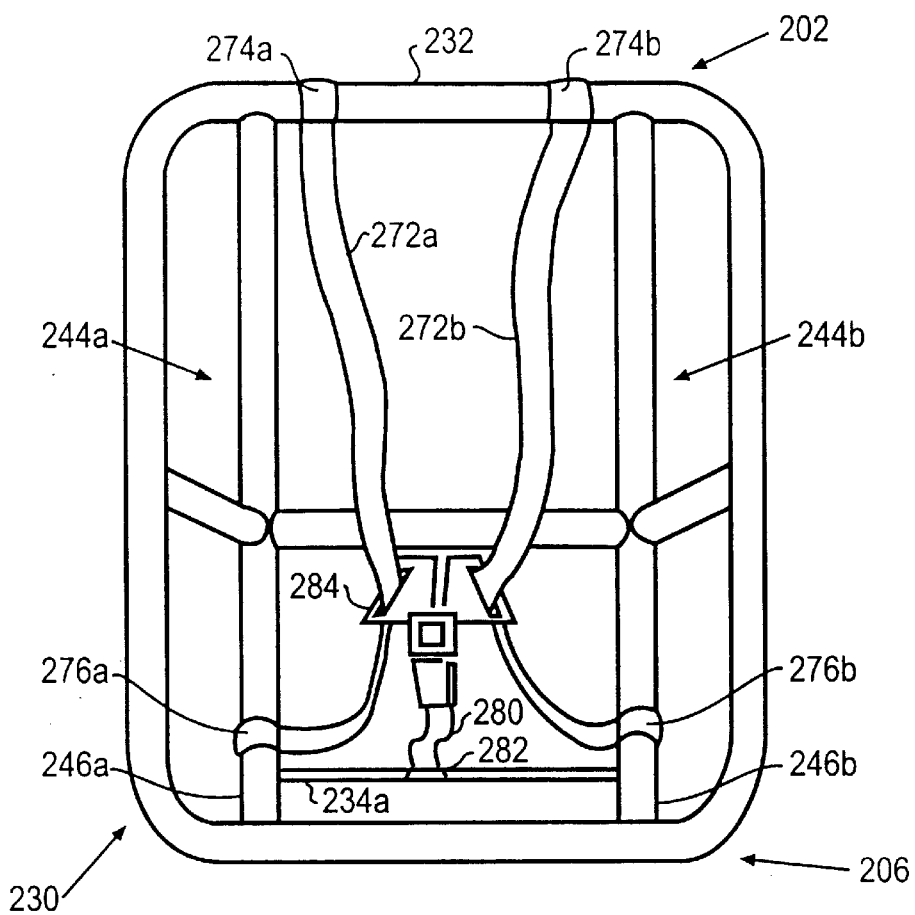
FIG. 13 is a front view of the car seat of FIG. 12 with a seating panel removed.

FIG. 13 illustrates a front view of truss seat 200 with seating portion 212 removed to show the attachment locations for child harness 270 to truss frame 200. This embodiment of truss seat 200 incorporates a five point child harness. Child harness 270 includes left and right shoulder straps 272*a* and 272*b*, left and right lap straps 276*a* and 276*b*, and crotch strap 280 formed from a suitable webbing material. Shoulder straps 272, lap straps 276 and crotch strap 280 are secured at their proximal ends to a releasable harness latch 284 and attached directly to truss frame 230 at their distal ends as follows. Shoulder straps 272*a* and 272*b* are attached to an upper transverse member 232 of truss frame 230 extending across an upper end 202 of truss seat 200 at respective left and right shoulder strap attachments 274*a*, 274*b*. Lap straps 274*a* and 274*a* are attached to respective left and right horizontal portions 248*a* and 248*b* of respective L-shaped members 244*a*, 244*b* of truss frame 230 at respective lap strap attachment 278*a*, 278*b*. Crotch strap 280 is attached to a crotch attachment member 234*a* (disposed rearwardly of forward end 206 of frame 230) at a crotch strap attachment 282.

Shoulder, lap and crotch straps 272, 276 and 282 are securable to the respective tubular truss members of truss frame 200 by any suitable means well known in the art, e.g., by wrapping the ends of the webbing around the respective tubular truss member and securing the webbing end to an inner web portion by stitching, or by engaging a lockable hook secured to the end of the webbing (e.g., by stitching) with a slotted hole extending from the tubular truss member.

Figure 14:
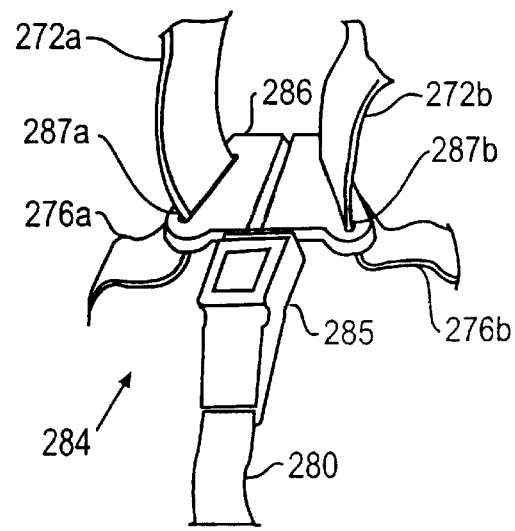
FIG. 14 is a close up view of a harness buckle portion of the child harness portion of the car seat of FIG. 12.

Referring to FIG. 14, showing a close-up view of the preferred embodiment of harness latch 284 which includes a female buckle portion 285 fixed to the end of crotch strap 280 and releasably engageable with a male buckle portion 286 slidably engaged with shoulder straps 272 and lap straps 276. Each of the left and right pairs of shoulder and lap straps of harness 270 are formed from a continuous piece of webbing fed through left and right guide slots 287*a* and 287*b* in male buckle portion 286. Any other suitable five-point harness latch known in the art can be used in place of harness latch 284, as is readily understood by the artisan.

In another embodiment of truss seat 200, child harness 270 is replaced by a three-point child harness (i.e., shoulder strap and crotch strap). In the three-point harness embodiment of truss seat 200, the child inertia loads are carried through shoulder straps 272 and crotch strap 280. Other child harness types may be used with truss frame 230. For example, the four point harness type (as mentioned earlier in the discussion for schematic car seat 100). Thus, truss seat 200 may be used with either a three-point, four-point or five-point harness without requiring modification to truss frame 230 or the harness strap attachments to truss frame 230.

Seating Panel 212

Figure 15:
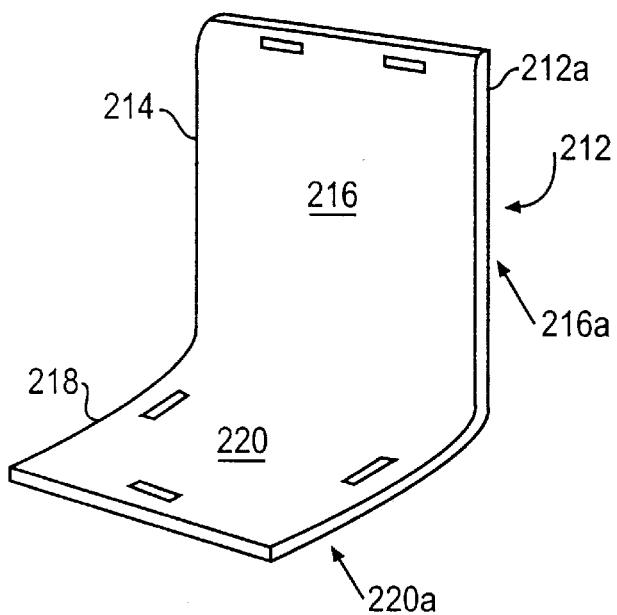
FIG. 15 is a front isometric view of the seating panel of the car seat of FIG. 12.
Figure 16:
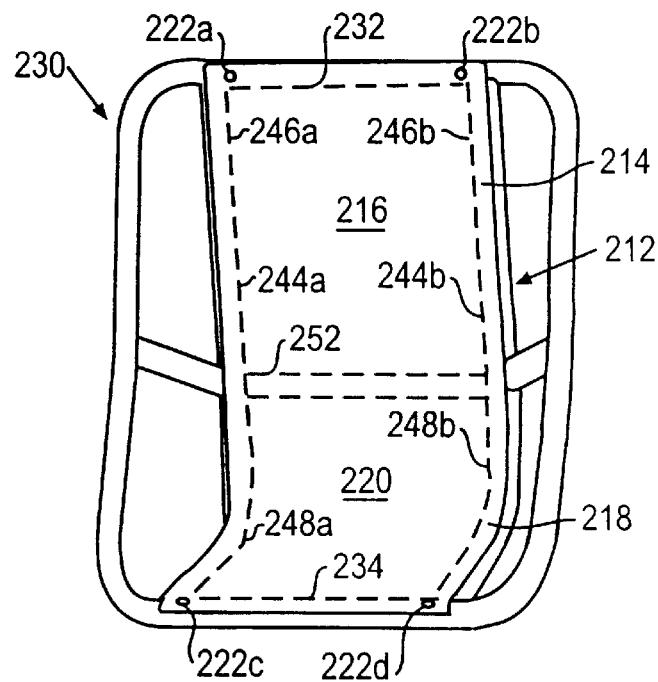
FIG. 16 is a front view of the car seat of FIG. 12 with a child harness removed.

Referring to FIG. 15, seating panel 212 is constructed from a panel member 212a shaped to form an upper seatback 214 and lower seat 218 defining respectively, upper and lower seating surfaces 216, 220 of a seat. FIG. 16 illustrates the members of truss frame 200 used to support seating panel 212 in truss seat 200. Seating panel 212 is supported along its perimeter by upper transverse member 232, left and right L-shaped members 244a, 244b, and forward transverse member 234 by placement of upper rear surface 216a (opposite to upper seating surface 216) and lower rear surface 220a (opposite to lower seating surface 220) against the respective forward surfaces of upper transverse member 232, L-shaped truss members 244a, 244b, and forward transverse member 234. Seating portion 212 is secured to upper transverse member 232 by fasteners 222a, 222b and forward transverse member 234 by fasteners 222c, 222d. Fasteners 222 are preferably in the form of rivets or screws.

In operation, seating panel 212 is functionally identical to seating portion 112 of schematic seat 100 in terms of the strength and stiffness requirements for reacting inertia loads of the seat occupant imparted to seating portion 112. That is, the internal loads induced in truss seat 200 by child harness 270 and the vehicle seatbelt during a forward impact event are carried primarily by frame 230, thereby eliminating the need for seating panel 212 to provide bending stiffness for reducing forwardly directed deformations of truss seat 200. The strength requirements for seating panel 212 are driven by the rearwardly and downwardly directed inertia forces of the seat occupant distributed over the lower seating surface 220 during a forward impact event. These forces are applied to seating panel 212 as the vehicle seat bench applies an upward reaction force in response to the tipping moment induced in truss seat 200. Since seating panel 212 is supported along its perimeter, the center portions are susceptible to failing during the forward impact event unless a panel of sufficient strength is used to sustain the forces applied over the seating surface 220. It has been found that a 0.03–0.04 inch thick steel panel provides more than adequate strength to prevent failure of seating panel 212 during a forward impact event. A stiffened plastic seating panel may be used in place of steel (e.g., a 0.08 inch thick plastic panel having integrally formed rib stiffeners).

Figure 17:
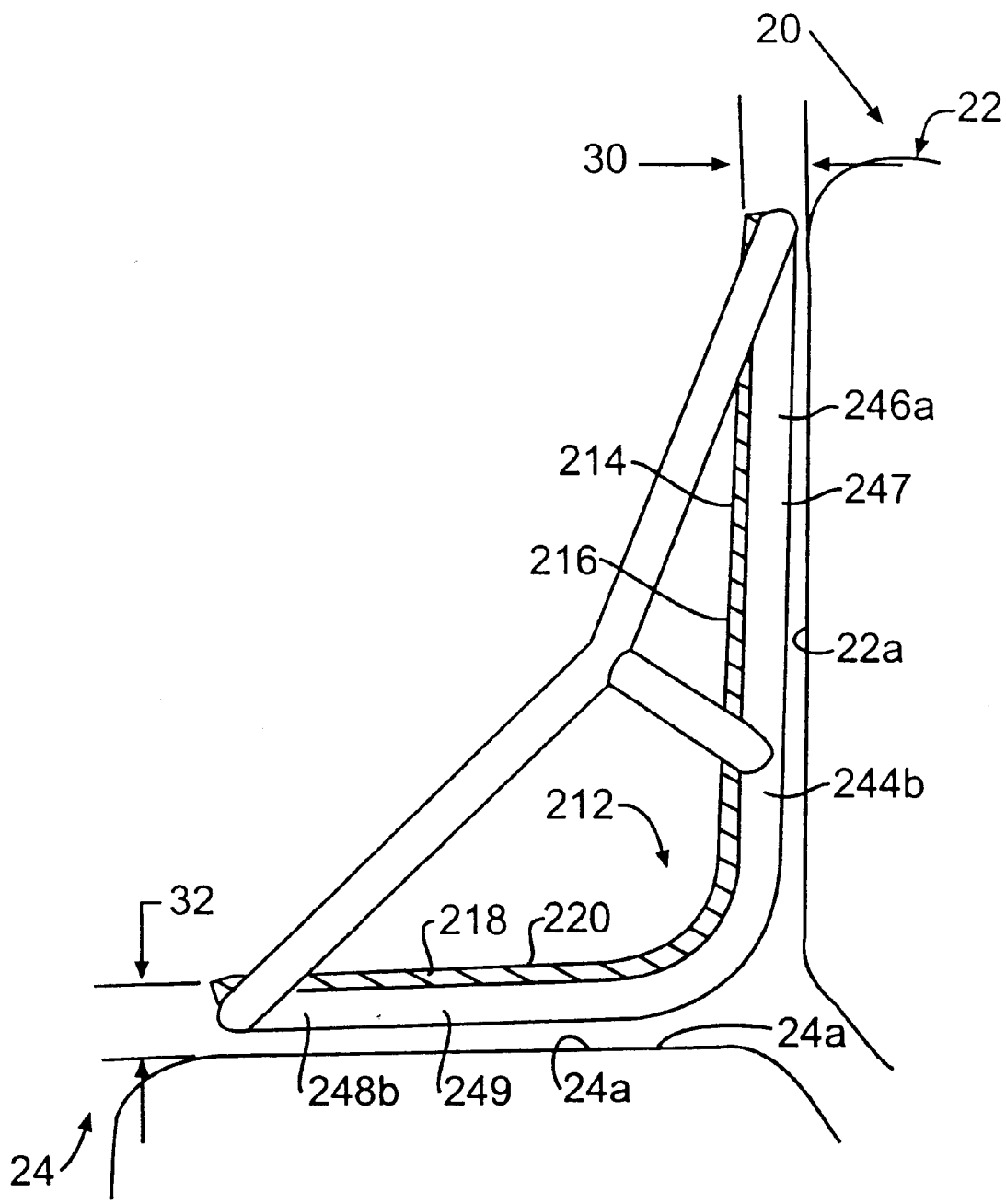
FIG. 17 is a side of the car seat of FIG. 12 positioned in a vehicle seat.

FIG. 17 shows a right side view of truss seat 200 (with child harness 270 removed) positioned against vehicle upper seatback 22 and seat bench 24 of vehicle seat 20. Truss seat 200 is positioned in vehicle seat 20 by placing the upper rear surface 247 and lower rear surface 249 of truss seat 200, defined by the respective rearward surfaces of the vertically and horizontally extending portions of left L-shaped member 244a and right L-shaped member 244b, against the respective upper seating surface 22a and lower seating surface 24a of vehicle seat 20. Thus, upper seating surface 216 and lower seating surface 220 are positioned adjacent to vehicle upper seatback 22 and vehicle seat bench 24, respectively. As discussed earlier in schematic car seat 100, the close proximity of upper seating surface 216 to vehicle upper seating surface 22a in the vicinity of shoulder restraints 274 is desirable since this increases the distance between the child occupant of truss seat 200 and a forward interior vehicle surface. Similarly, the close proximity of lower seating surface 220 to vehicle lower seating surface 24a in the vicinity of the buttock area of lower seating surface 220 is desirable for positioning the child low in the seat since this will reduce the effects of a forward tipping moment during the forward impact event. Although FIG. 9 shows an upper and lower seating surface that form a right angled seat, upper seating surface 216 and/or lower seating surface 220 may alternatively be orientated at a desired reclined angle relative to L-shaped members 244a, 244b to provide a reclined seating surface for the child while maintaining a minimal forward offset at upper seating surface 216 in the vicinity of shoulder restraints 274 and a minimal vertical offset at the buttock area of lower seating surface 220.

Seatbelt Pathway 290

Figure 18:
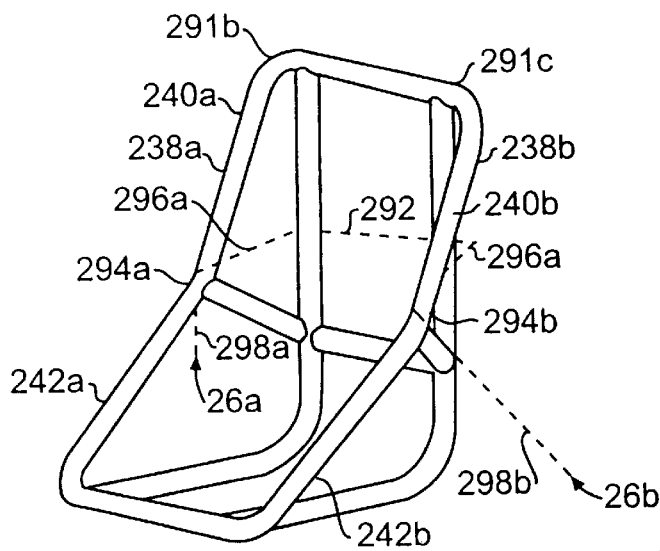
FIG. 18 is a front isometric view of the frame of the car seat of FIG. 12 with vehicle seatbelt pathway shown.
Figure 19:
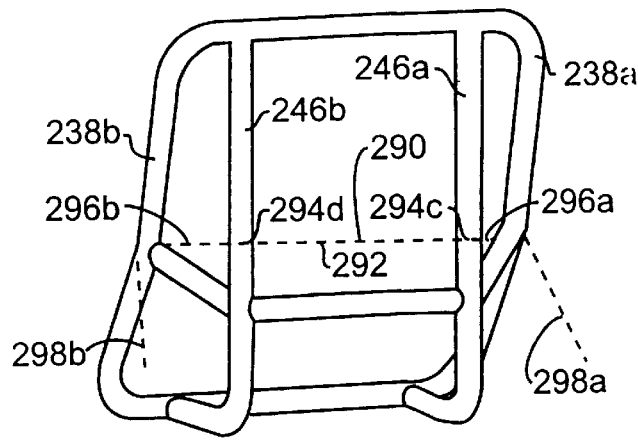
FIG. 19 is a rear isometric view of the frame of FIG. 18.

The routing paths for a vehicle seatbelt restraining truss frame 230 and thus seat 200 in vehicle seat 20 are defined by seatbelt pathway 290. Truss seat 200 is capable of being fully secured in vehicle seat 20 by a vehicle lap belt. Thus, no top tether anchorage is required for achieving exceptional performance with truss seat 200 during a forward impact event. Referring to FIGS. 18 and 19, the seatbelt paths and restraint points defined by seatbelt pathway 290 are functionally equivalent to the paths and restraint points defined by seatbelt pathway 190. The restraint points defined by seatbelt pathway 290 correspond to the outer surfaces of the respective tubular members of truss frame 230. Thus, seatbelt pathway 290 includes opposed left and right forward seatbelt restraint surfaces 294a and 294b corresponding to the forward surfaces of diagonal member 238a and 238b, and left and right rearward seatbelt restraint surfaces 294c and 294d corresponding to the rearward surfaces of left and right vertical portions 246a and 246b of L-shaped members 244a, 244b, respectively. The seatbelt paths defined by seatbelt pathway 290 include seatbelt entry paths 298a, 298b extending upwardly and forwardly from seatbelt anchorage points 26a, 26b to the respective forward seat belt restraint surfaces 294a, 294b, horizontal seatbelt paths 296a, 296b extending between the respective left restraint surfaces 294a, 294c and right restraint surfaces 294b, 294d, and central path 292 extending left to right across upper rear surface 247 of truss seat 200.

Figure 21:
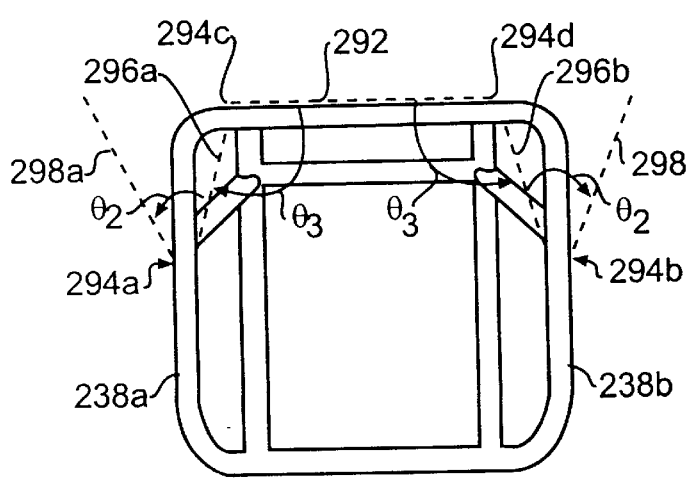
FIG. 21 is a top view of the frame of FIG. 18.

Referring to FIG. 21, seatbelt path angles $\theta_2$ and $\theta_3$ for seatbelt pathway 290 define resultant seat belt forces applied to frame 230 which are orientated so as to create a reduced net transverse load on truss seat 200. Thus, by positioning forward restraint surfaces 294a, 294b outward from rearward restraint surfaces 294c, 294d, the resultant seatbelt forces applied to forward restraint surfaces 294a, 294b are directed more front to rear than left to right, and by routing seatbelt pathway over forward restraint surfaces 294a, 294b and then back and over rearward restraint surfaces 294c, 294d, the resultant inwardly directed transverse force components applied at each of the rearward restraint surfaces 294c, 294d tend to cancel out the corresponding outwardly directed transverse force components applied at forward restraint surfaces 294a, 294b (as was discussed earlier in seat 100).

Truss seat 200 may also be restrained using a Type II vehicle seat belt assembly (shoulder belt and lap belt). FIG. 18 illustrates the upper portions of truss frame 230 where respective left and right shoulder belt restraints 291b and 291c for the shoulder belt of a Type II vehicle seatbelt are located when a vehicle seatbelt is routed from left-to-right or right-to-left through truss frame 230, respectively. Shoulder belt restraints 291b and 291c are identical in function to the vehicle shoulder belt pathway function for schematic car seat 100 described earlier. Thus, when a vehicle shoulder belt and lap belt are used to restrain truss seat 200, the restraining force applied at shoulder restraints 291b or 291c is effective in providing increased performance for truss seat 200 during the forward impact event.

Figure 20:
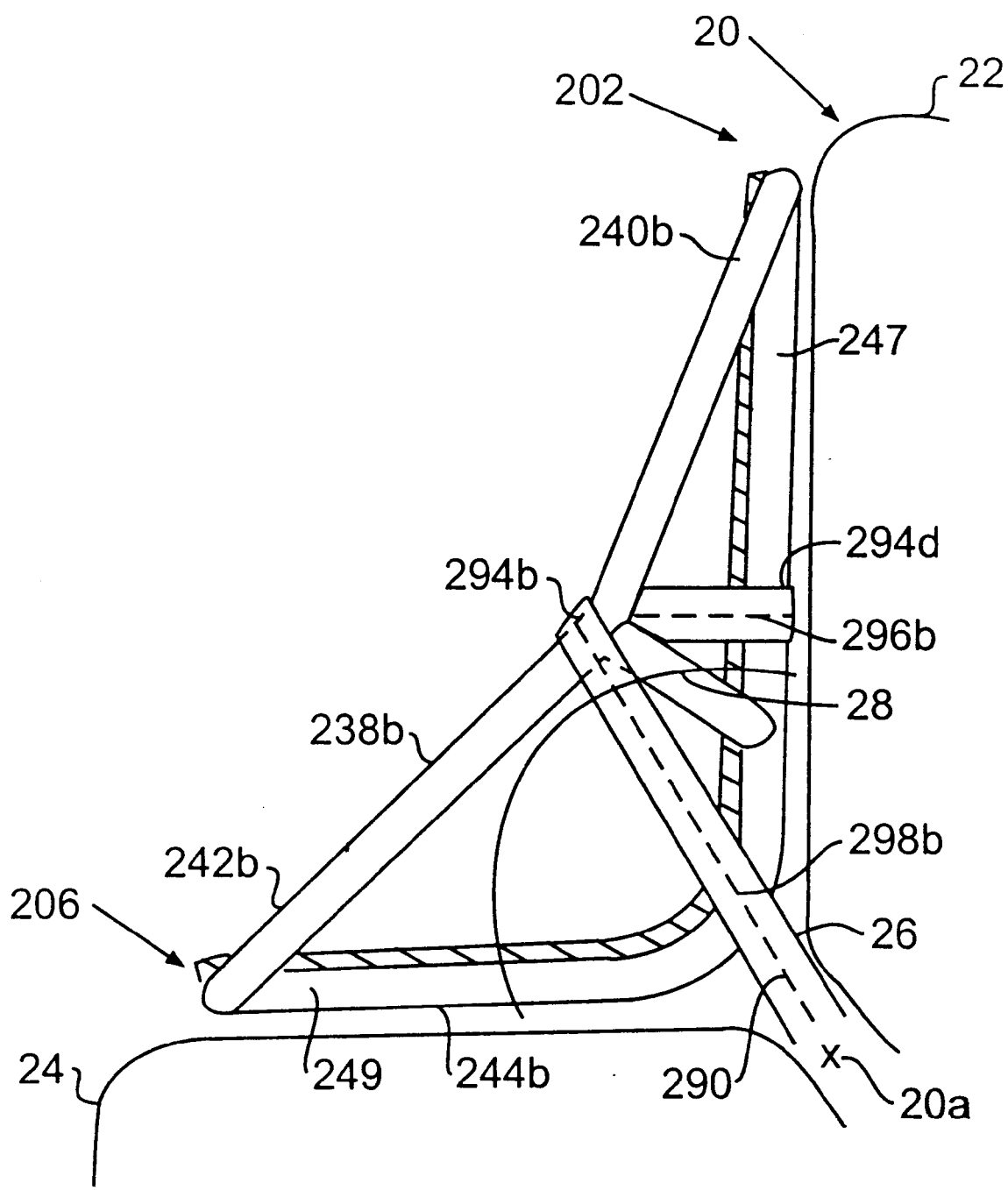
FIG. 20 is a side view of the car seat of FIG. 12 restrained in a vehicle seat by a vehicle seatbelt.

FIG. 20 shows a right side view of truss seat 200 (without child harness 270) restrained in vehicle seat 20 with vehicle seatbelt 26 routed through seatbelt pathway 290. As discussed above, it is desirable to position the forward restraint (i.e., restraint 194a of seat 100) of the car seat outside of seatbelt radius 28, defining the maximum seatbelt buckle stalk length, so as to ensure that the car seat can be effectively secured in the vehicle seat for various vehicle anchor positions and buckle stalks. In the truss seat 200 embodiment of seat 100, forward restraint 294b (as well as forward restraint 294a) is positioned outside of this radius 28 to achieve the same result but is preferably set back slightly so as to reduce the required travel length of seatbelt 26 for routing through seatbelt pathway 290. SAE J1819 defines the maximum travel length as 41 inches. Restraint surface 294b is set back by forming a bend on diagonal member 238b defined by the junction of an upper diagonal portion 240b, extending forwardly and downwardly from upper end 202, and a lower diagonal 242b extending upwardly and rearwardly from forward end 206. The bend of diagonal member 238b is located at approximately the same location as forward restraint surface 294b (as is also the case for left diagonal member 238a). The bend formed in right triangular member 236b is preferable both as a means for reducing the required travel length for seatbelt 26 and as a means for locating restraint surface 294a on diagonal member 236b. It is preferable, but not necessary for diagonal 238b to include this bend since a constant-slope diagonal member 238b which extends from upper end 202 to a location inboard from forward end 206 will provide a forward restraint surface that is positioned at the same forward location as forward restraint surface 294b.

Truss frame 230 may also be used to receive the vehicle seatbelt rearward of forward restraints 294a and 294b without significant modification to truss frame 230. Referring again to FIGS. 18 and 19, the vehicle seatbelt 26 may be inserted in the right side opening defined by support member 250b, vertical portion 246b and diagonal member 238b, passed over the upper seating surface 216 of seat panel 212, and then passed through the corresponding left side opening defined by support member 250a, vertical portion 246a and diagonal member 238a. In this embodiment, seatbelt 26 is restrainable against truss frame 230 at the right and left bar surface defined generally by the intersections of support member 250b and vertical portion 246b and support member 250a and vertical portion 246a, respectively. Thus, truss frame 230 is adapted for providing a vehicle seatbelt restraint surface that is either forward of front seating surface 216 or adjacent to upper rear surface 208.

Truss Frame 230

Figure 22:
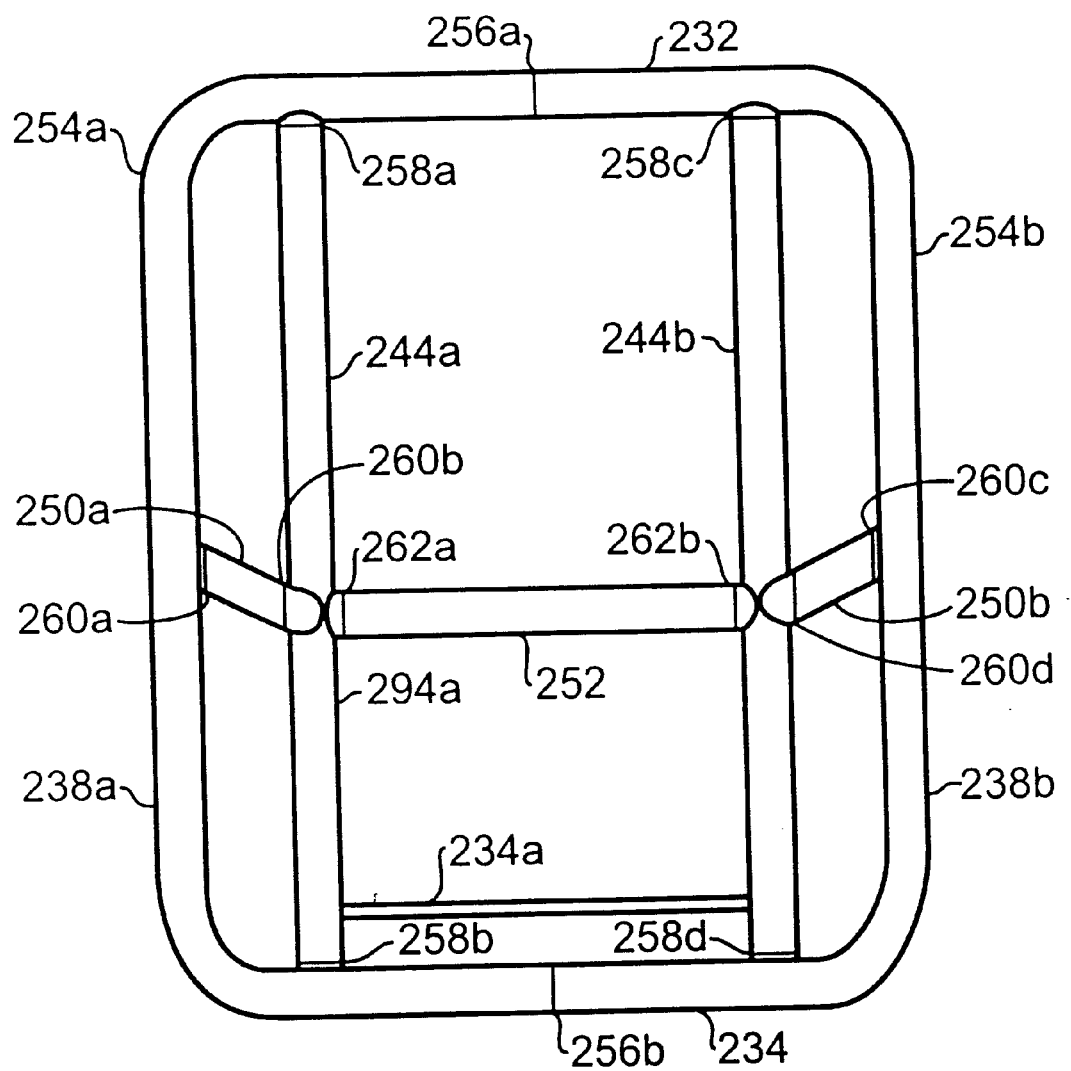
FIG. 22 is a front view of the frame of the car seat of FIG. 12.
Figure 23:
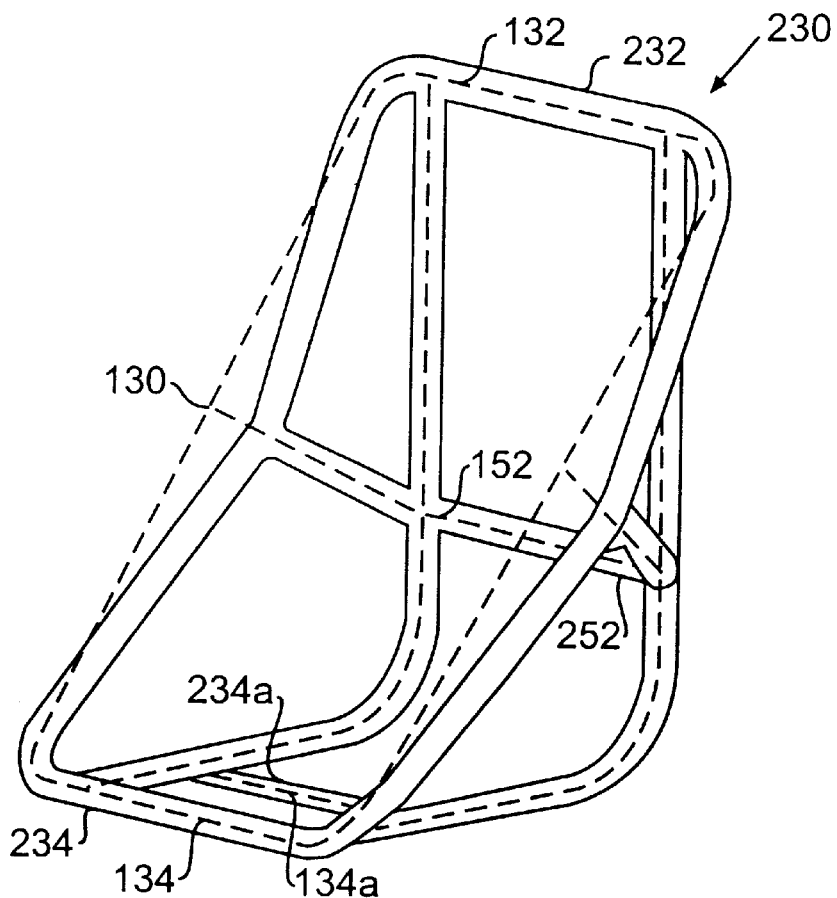
FIG. 23 is an isometric view of the frame of FIG. 22 with the frame of FIG. 2 superimposed in phantom.
Figure 24:
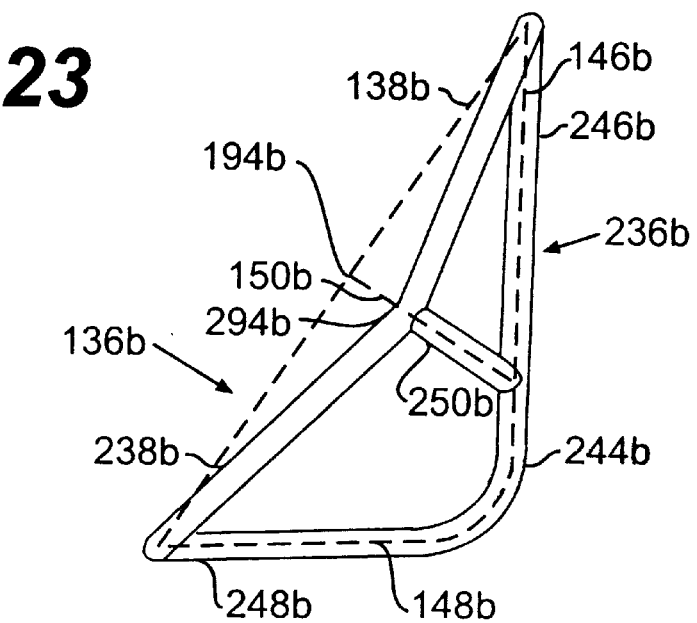
FIG. 24 is a side view of the frame of FIG. 23.

FIGS. 22, 23 and 24 show front, isometric and side views of truss frame 230. As mentioned above, truss frame 200 is a physical embodiment of the structure represented by frame 130 of seat 100, implemented as a network of interconnected tubular bar members.

FIG. 22 shows the structural connections between the various bar members forming truss frame 230. Truss frame 230 is preferably constructed from hollow tubular bars made from a metal material interconnected by means of weld joints as follows. The portion of frame 230 defined by upper transverse member 232, forward transverse member 234, and right and left diagonals 238a and 238b is constructed by welding opposed right C-shaped bar 254a and left C-shaped bar 254b at upper weld joint 256a and forward weld joint 256b. L-shaped members 244a and 244b are welded to the upper ends and forward ends of the respective left and right C-shaped bars 254a, 254b at weld joints 258a and 258b (left L-shaped member 244a) and weld joints 258c and 258d (right L-shaped member 244b). Left and right support members 250a and 250b are welded to the respective left diagonal member 238a and vertical portion 246a of left L-shaped member 244a at weld points 258a and 258b and right diagonal member 238b and vertical portion 246b of right L-shaped member 244b at weld points 258c and 258d, respectively. Lower transverse member 252 is welded to left and right vertical portions 246a, 246b of L-shaped members 244a and 244b at weld points 260a, 260b. Crotch attachment member 234a is welded to horizontal portions 248a, 248b of L-shaped members 244a and 244b at weld points 235a and 235b.

Bars made form 1015 or 1010 steel with an outer diameter of 1 inch with 18 gauge wall thickness were found to provide adequate stiffness for truss frame 230. Other sized bars of different material may be used in place of steel bars, depending on the loading requirements of truss seat 200, e.g., 20–40 lb. recommended passenger weights would require less stiff bars than a car seat recommended for passenger weights above 40 lb. Individual bars may also be sized according to particular loading requirements. For example, bars 250, 252 may be made less stiff than the other bars of truss frame 230 since bars 250 and 252 are mainly compression members (as discussed in greater detail, below). A ¾ in. diameter or a 1 in. diameter 20 gauge steel tube may provide adequate stiffness for bars 250 and 252. Similarly, crotch attachment member 234a may be made from a smaller sized bar since the loading requirements on this frame member are less demanding than other members of truss frame 230.

The tubular bars of truss frame 230 form a pair of opposed left and right triangular truss supports 236a and 236b, respectively, structural coupled by upper transverse member 232, forward transverse member 234 and lower transverse member 252. FIGS. 23 and 24 show isometric and side views, respectively, of truss frame 230 with frame 130 of schematic car seat 100 superimposed thereon.

Referring to FIGS. 13 and 23, the loads applied to frame 230 by shoulder straps 272 at shoulder strap attachments 274a and 274b are carried in transverse member 232 and distributed out to left triangular support 236a and right triangular support 236b. The off-axis stiffness of member 232 (i.e., the stiffness related to loads applied in a direction perpendicular to the longitudinal axis of member 232) is effective for limiting the amount of forward deflection in the vicinity of shoulder attachments 274a, 274b during the forward impact event. Thus, upper transverse member 232 is a tubular bar implementation of upper transverse structure 132 of schematic car seat 100.

Forward transverse member 234 provides stiffness at the forward end 206 of truss seat 206 for supporting the net transverse load applied to left and right triangular supports 236a, 236b by vehicle seatbelt 26 (as discussed earlier). Thus, forward transverse member 234 is a tubular bar embodiment of transverse structure 134 of seat 100.

Referring to FIG. 23, left and right triangular truss supports 236a and 236b include identical left and right diagonal members 238a and 238b, L-shaped members 244a and 244b, and support members 250a and 250b. FIG. 24 shows right triangular support 236b with left triangular portion 136b of frame structure 130 superimposed thereon. As illustrated in FIG. 24, the load paths defined by diagonal structure 138b, vertical structure 146a, horizontal structure 148a and support structure 150b of triangular structure 136b correspond to the respective axial loading directions of diagonal member 238b, vertical portion 246a, horizontal portion 248b and support member 250b of triangular support 236b. Thus, the axial bar stiffness of diagonal member 238b provides a stiff load path for reacting shoulder strap 272 loads, with the resulting vertical and horizontal loads induced by internal loads in diagonal member 238b and the applied forces being carried along the stiff load paths provided by the axial bar stiffness in vertical portion 246a and horizontal portion 248b of L-shaped member 244b. Similarly, support member 250b provides a stiff load path for supporting triangular support 236b when seatbelt loads are applied to restraint surface 294b.

Referring again to FIG. 23, lower transverse structure 152 of frame 130 corresponds to lower transverse member 252 in truss frame 230. The axial stiffness of lower transverse member 252 provides a stiff load path for reacting transverse loads originating from the applied seatbelt loads at left and right forward restraint surfaces 294a and 294b distributed through internal loads in the respective left and right support members 250a and 250b. With regard to the seatbelt forces applied to L-shaped members 244a and 244b at restraint surfaces 294c and 294d, it is apparent from the above description that support members 250a and 250b and lower transverse member 252 provide axial stiffness in the vicinity where vehicle seatbelt applies forces are applied at rear restraints 294c and 294d.

Truss Forward Impact Test

Truss seat 200 has been assembled according to the above description and subjected to loads representative of a forward impact event. The forward impact loads applied to truss seat 200 were simulated as per the forward impact test procedure set forth in FMVSS 213 (hereinafter referred to as Test 213). Each of these tests are well known procedures for testing automobile restraint systems. Therefore, only a brief description is needed. The test article for Test 213 includes truss seat 200 restrained in a vehicle seat assembly using a vehicle lap belt. The forward impact event may be simulated either by impact with a forward barrier by the test article traveling at an initial velocity of approximately 30 mph, or by subjecting the test article to a rearward acceleration impulse equivalent to the accelerations experienced in the frontal barrier impact test. The later test was run for truss seat 200.

Forward head excursions of an anthropomorphic test dummy were measured to determine the flexural rigidity of truss seat 200 for a 33 lb. three year old and 48 lb. six year old test dummy (as defined in Test 213), as well as an overloaded condition where the 48 lb. six year old test dummy is weighted to 60 lb. Forward excursions were measured for both the three-point and five-point harness embodiments of truss seat 200. The approximate measured excursions are provided in Table 1, below.

TABLE 1

Approximate Forward Excursions Measured in Test 213 for the Three Point and Five Point Harness Embodiments of Truss Seat 200 (in/mm)

| | Three-Point Harness | | Five-Point Harness | |
|---|---|---|---|---|
| 3 year old/33 lb. (as per Test 213) | 25.1 in. | 638 mm | 23.4 in. | 622 mm |
| 6 year old/48 lb. (per Test 213) | 26.9 in. | 711 mm | 26.5 in. | 673 mm |
| 6 year old/60 lb. (overloaded condition) | 29.0 in. | 737 mm | 26.6 in. | 711 mm |

Third Embodiment—Shell Seat 300 with Five-point Harness

Figure 25:
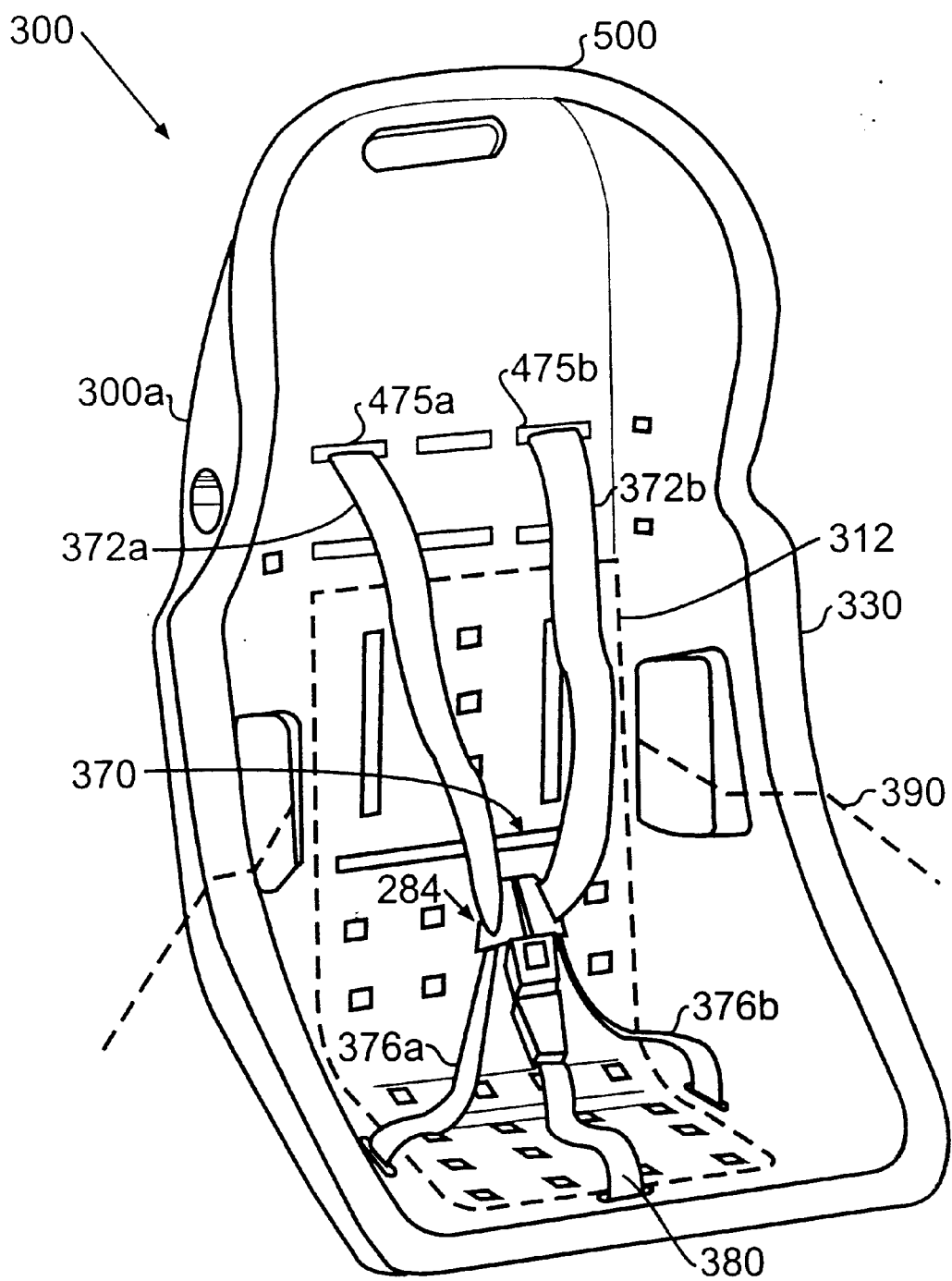
FIG. 25 is an isometric view of a second and preferred physical embodiment of a car seat.

Reference will now be made in detail to a third embodiment of the invention, a preferred physical embodiment of seat 100 implemented as a shell seat 300, examples of which are illustrated in FIGS. 25–48. Referring to FIG. 25, shell seat 300 includes a molded shell body 300a forming a seating section 312 and ahead support 500 integral with a shell frame 330, a child harness 370 secured to shell frame 330, and a seatbelt pathway 390 extending over shell frame 330 for receiving a vehicle seatbelt for restraining shell seat 300 in a vehicle seat.

The shell body 300a, defining seating section 312, head support 500 and shell frame 330, is a closed-walled shell preferable formed by an injection, blow or roto molding process using a high stiffness polymer. In the preferred embodiment, the average wall thickness for the walls forming seating section 312, head support 500 and shell frame 330 is approximately 3/16 to 1/4 inch and the preferred polymer material is high density polyethylene. Other types of polymers may be used in place of high density polyethylene, e.g., nylon or other engineering polymers. The wall thickness may differ from the preferred wall thickness to suit the specific needs of the manufacturer. For example, a thicker wall thickness may substitute for the preferred wall thickness in order to provide a shell body which exhibits the equivalent strength and/or stiffness properties of the preferred embodiment of shell body 300a when a polymer having inferior strength and/or stiffness properties to high density polyethylene is used.

As will be discussed in greater detail below, shell body 300a is adapted for reacting the externally applied loads induced by the forward impact event by internal loads carried along the in-plane load paths of the wall sections with internal compressive and/or bending load component reactions being primarily carried along load paths where wall sections include integrally formed wall stiffeners. Thus, shell body 300a represents a semi-monocoque shell—i.e., a load-bearing structure whereby externally applied loads are reacted by in-plane loads distributed along the shell walls with regions where the externally applied force components tending to induce buckling of shell walls are supported by integrally formed stiffeners disposed along load paths where shell walls are subjected to buckling-type loads. Shell body 300a is preferably formed as a closed-walled semi-monocoque shell since a closed-walled shell exhibits increased strength and/or stiffness properties over a corresponding open-walled shell structure.

Figure 26:
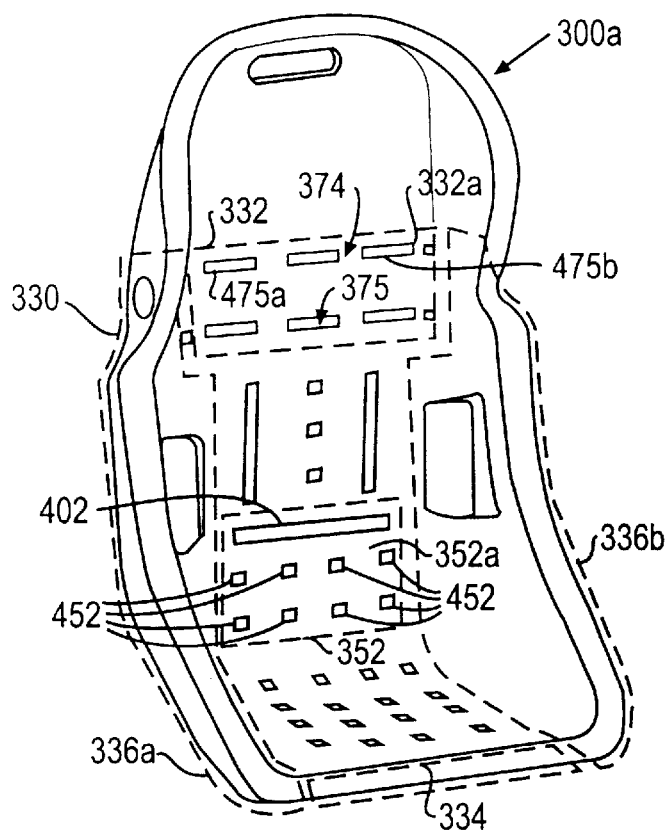
FIG. 26 is a front isometric view of the shell body of the car seat of FIG. 25.
Figure 27:
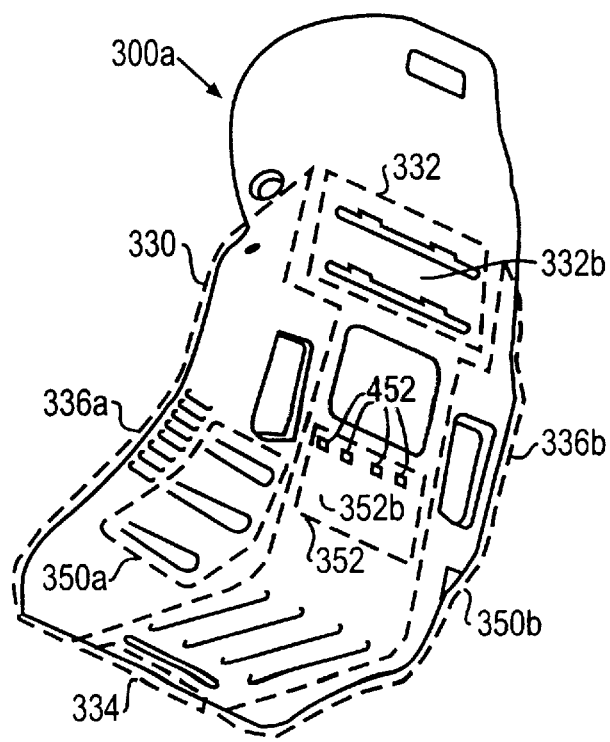
FIG. 27 is a rear isometric view of the shell body of the car seat of FIG. 25.

FIGS. 26 and 27 illustrate the portions of shell body 300a corresponding to shell frame 330. Shell frame 330 includes opposed left and right triangular sections 336a and 336b, respectively, with an upper transverse section 332, a forward transverse section 334 and a lower transverse section 352 extending between triangular sections 336a and 336b.

Child Harness 370

Figure 28:
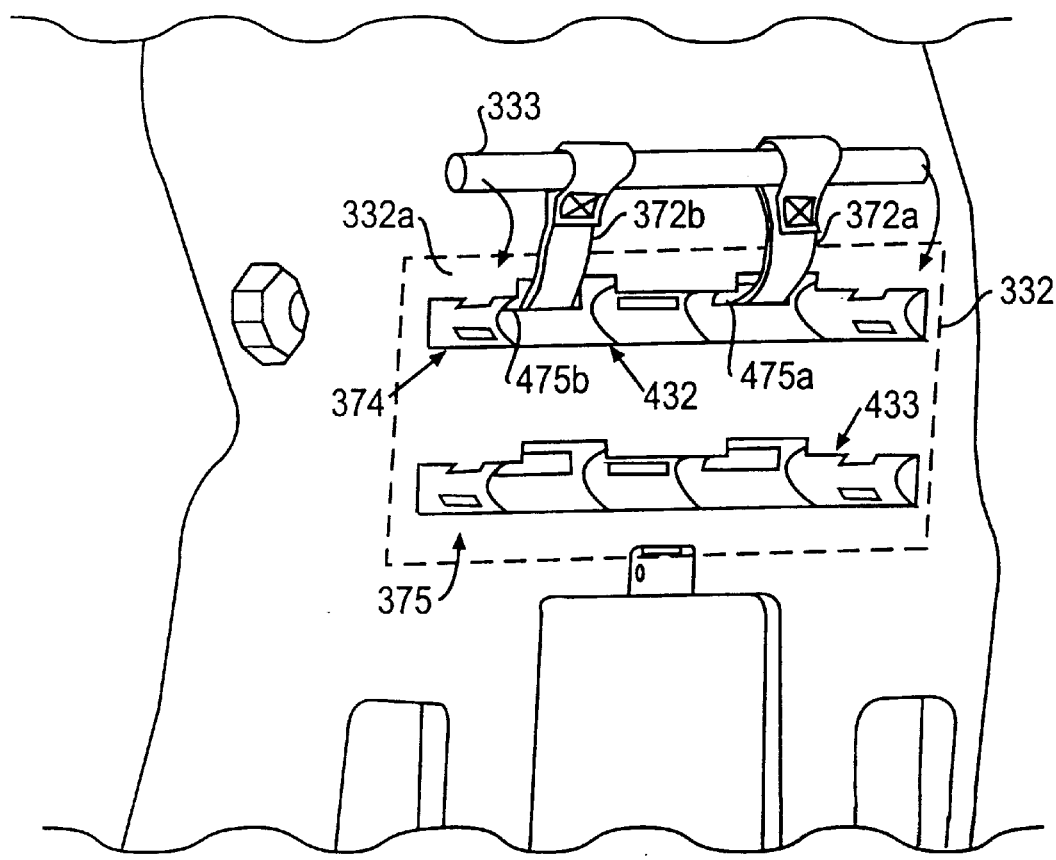
FIG. 28 is a rear isometric view of a portion of the car seat of FIG. 25 illustrating a child harness attachment to the shell body.

Referring to again to FIG. 25, child harness 370 of shell seat 300 is the same child harness as child harness 270 of truss seat 200 described earlier. Thus, shoulder straps 372, lap straps 376, and a crotch strap 380 are joined at their proximal ends by releasable harness latch 284. Shoulder straps 372, lap straps 376 and crotch strap 380 of child harness 370 are secured to shell frame 330 at their distal ends as follows. Referring to FIGS. 25, 26 and 28, a first shoulder strap attachment 374 and second shoulder strap attachment 375 is disposed on upper transverse section 332 for allowing shoulder straps 372 to be selectively attached to upper transverse section 332 at first and second seating heights, respectively, of a child occupant of shell seat 300. FIG. 25 illustrates shoulder straps 372 secured at first shoulder strap attachment 374. Reference will be made primarily to first shoulder strap attachment 374 with the understanding that the same description applies to second shoulder strap attachment 375. Shoulder straps 372 are secured to first shoulder strap attachment 374 by passing the webbing material through left and right slots 475a and 475b and securing the webbing ends to a bar 333 seated in a bar housing 432 formed on the rear wall portion 332b of upper transverse member 332 opposite slots 475a and 475b. The webbing is secured to bar 333 by forming a loop in the webbing ends by stitching and passing the ends of bar 333 through the loop.

Figure 29:
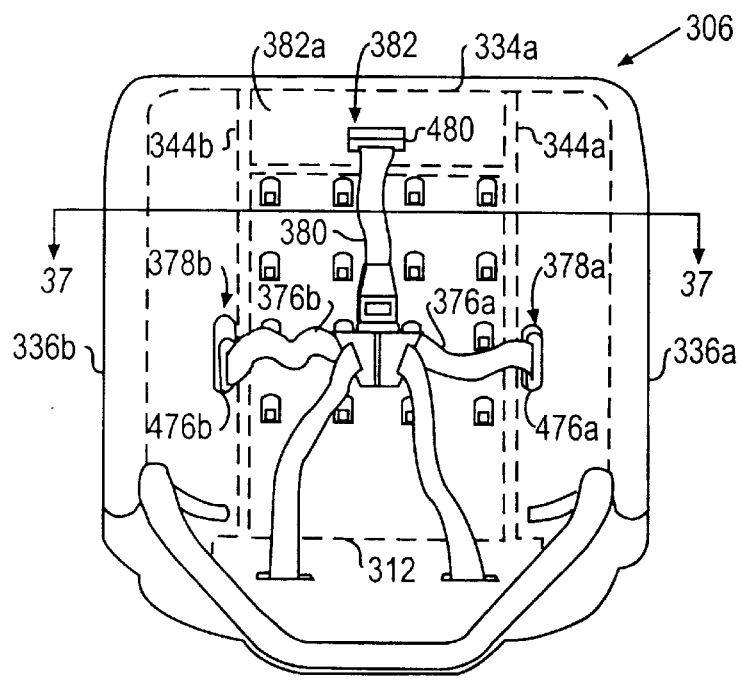
FIG. 29 is a top view of the car seat of FIG. 25 illustrating child harness attachments to the shell body.
Figure 30:
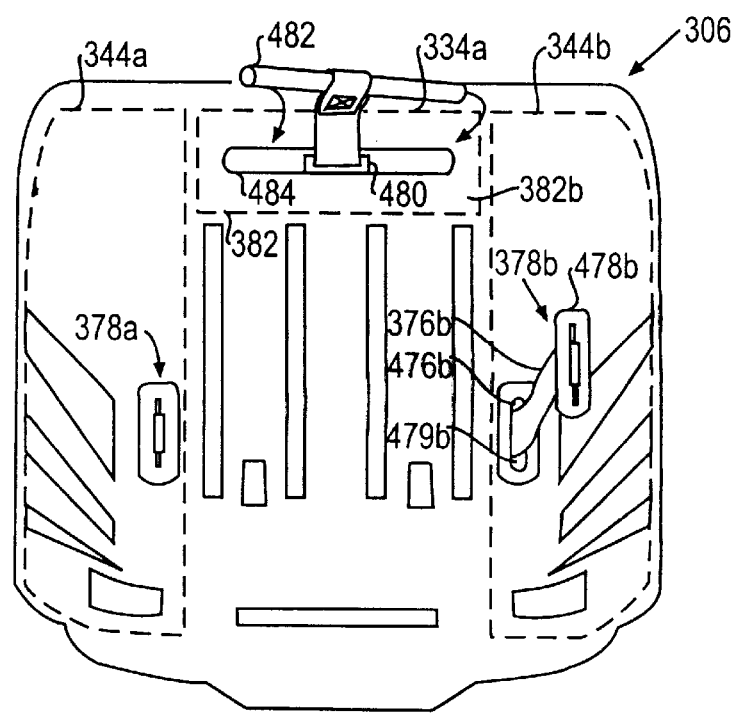
FIG. 30 is a bottom view of the car seat of FIG. 25 showing child harness attachments to the shell body.

Referring to top and bottom views of shell seat 300 illustrated in FIGS. 29 and 30, respectively, lap straps 376 are secured to shell frame 330 at respective left and right lap strap attachments 378a and 378b. Left lap strap attachment 378a is disposed on a left L-shaped section 344a of left triangular section 233a extending from the left side of lower seat 318 of seating section 312. Similarly, right lap strap attachment 378b is disposed on a right L-shaped section 344b of right triangular section 336a extending from the right side of lower seat 318. Lap straps 376a and 376b are secured at their respective left and right lap strap attachments 378a and 378b in the same manner. Referring to right lap strap attachment 378b, the webbing material is passed through a slot 476b and secured to a rectangular piece 478b seated in a rectangular housing 479b formed on the rear wall portion of right L-shaped section 344b. Lap straps 376a and 376b may also be secured to L-shaped sections 244a and 244b by a continuous piece of webbing extending across rear panel 318b and between slots 476a and 476b.

Crotch strap attachment 382 is disposed at a forward end 306 of shell frame 330. Crotch strap 380 is secured at crotch strap attachment 382 by passing the webbing material through a slot 480 and securing the ends of the webbing to a rod 482 seated in housing 484 formed on the rear wall portion of crotch strap attachment 382. The webbing is secured to bar 482 by forming a loop in the webbing by stitching and passing the loop over the ends of rod 482.

Three and Five Point Harness Embodiments

Figures 31, 32:
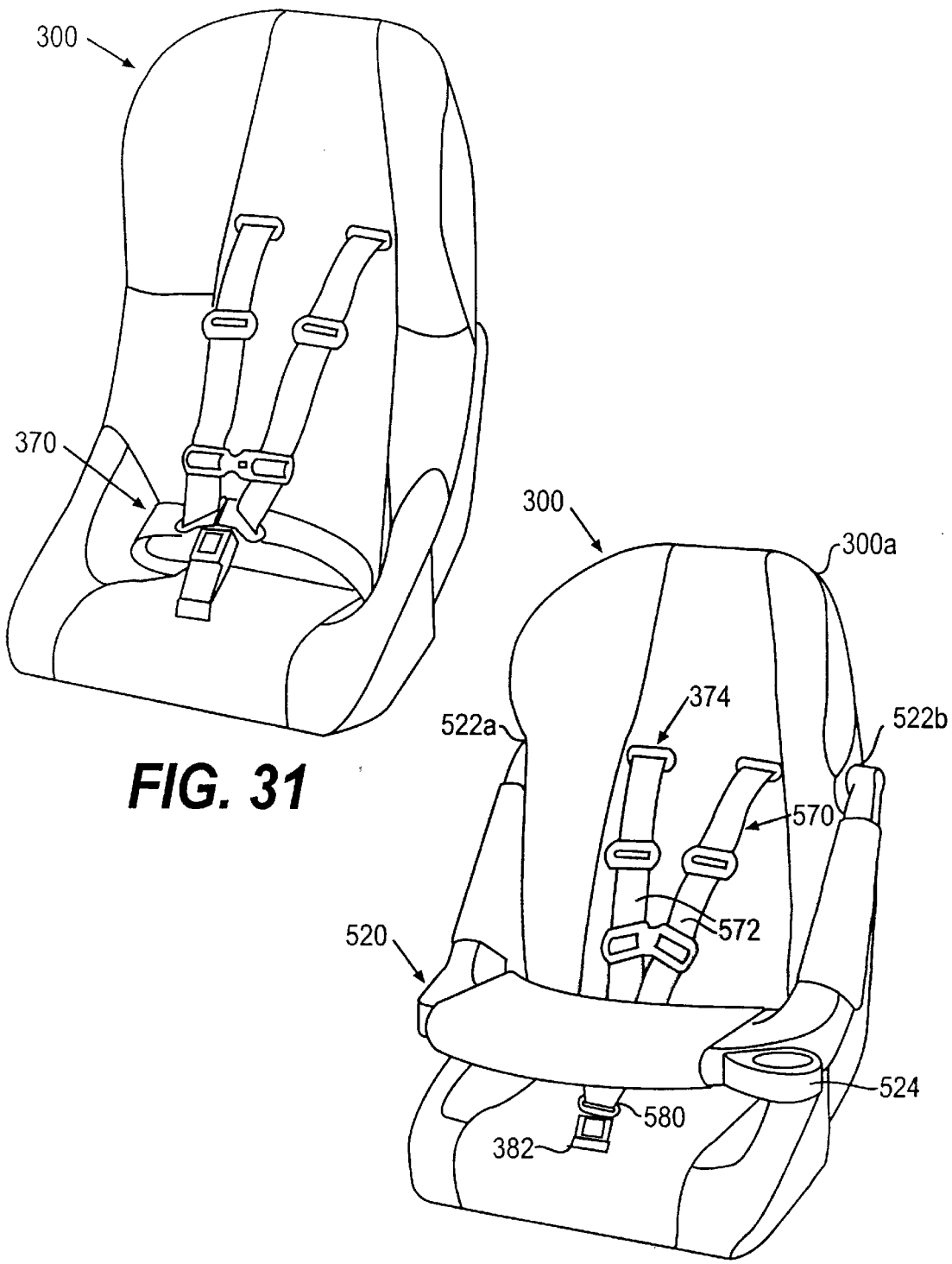
FIG. 31 is a front isometric view of the car seat of FIG. 30 with attached soft goods, illustrating a preferred five point harness embodiment of the invention.
FIG. 32 is a front isometric view of a preferred three point harness embodiment of the invention.

FIGS. 31 and 32 show shell seat 300 with attached soft goods for two contemplated harness embodiments for shell seat 300: the aforementioned five point harness (child harness 370) and a three point child harness 570 with bolster 520. Both the five point and three point harness embodiments of shell seat 300 are considered preferred embodiments of the invention. Shell frame 330 is adapted for mounting either the five point child harness (i.e., child harness 370) or the three point child harness 570 without modification to strap attachments 374, 375 and 382. Thus, for the three point harness embodiment illustrated in FIG. 37, shoulder straps 572 and crotch strap 580 are securable at the respective strap attachments 374, 375 and 382 in the same manner as described above for child harness 370.

Figure 33:
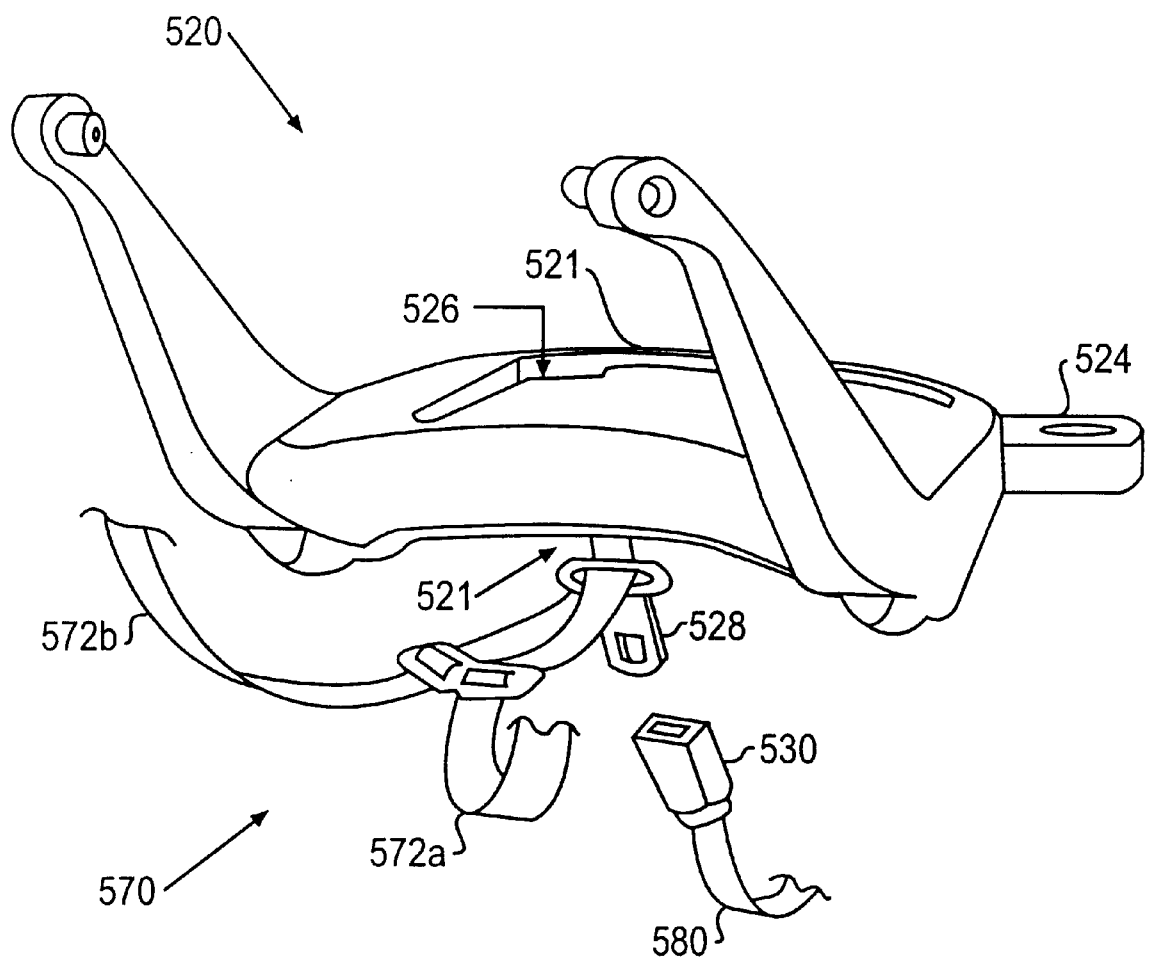
FIG. 33 is an isometric view of the bolster and child harness of the car seat of FIG. 32.

Referring to FIG. 32, bolster 520 is pivotally secured at its terminal ends to shell body 300a at left and right bolster mounts 522a and 522b. Referring to FIG. 33, Bolster 520 provides a support surface for the child occupant of shell seat 300 and preferably includes an attached cup holder 524 and tray receptacle 526 formed in center section 521. A fabric cover is releasably securable over the center section of bolster 520 to provide added comfort for the child. Shoulder straps 572 of child harness 570 are secured at their proximal ends to center section 521 at a lower surface thereof. A male buckle portion 528 is secured to the proximal ends of shoulder straps 572 for latching with a female buckle portion 530 secured at the proximal end of crotch strap 580.

Other child harness types may be used with shell frame 330. For example, a four point harness type (as discussed earlier) may be mounted to shell body 300a without requiring significant modification to shell frame 330.

Since shell frame 330 is adapted for use with either the five point, four point or three point harness embodiment, reference will hereafter be made to the five point harness embodiment of shell seat 300, with the understanding that the same description applies equally to the three point or four point harness embodiment.

Seating Section 312

Figure 34:
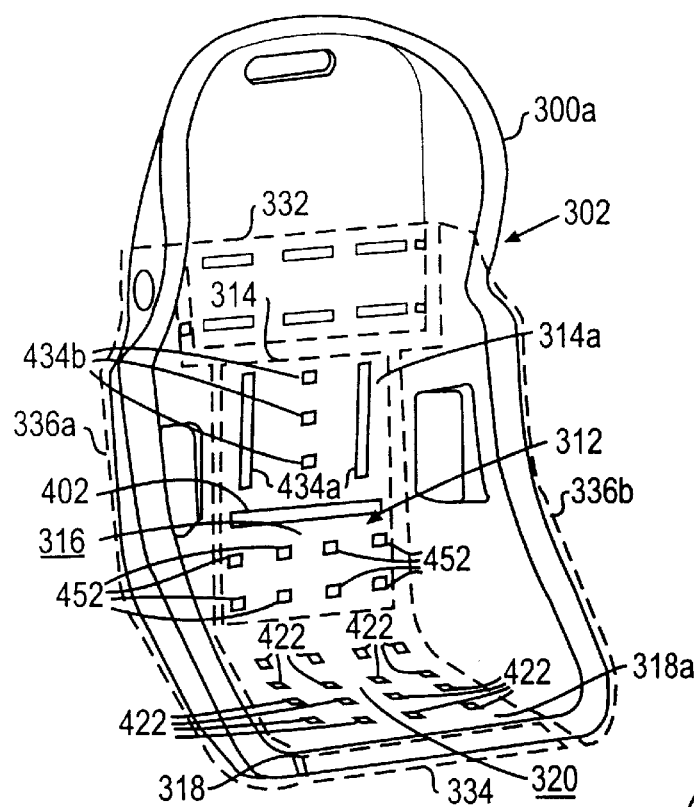
FIG. 34 is a front isometric view of the seating section of the car seat of FIG. 25.
Figure 35:
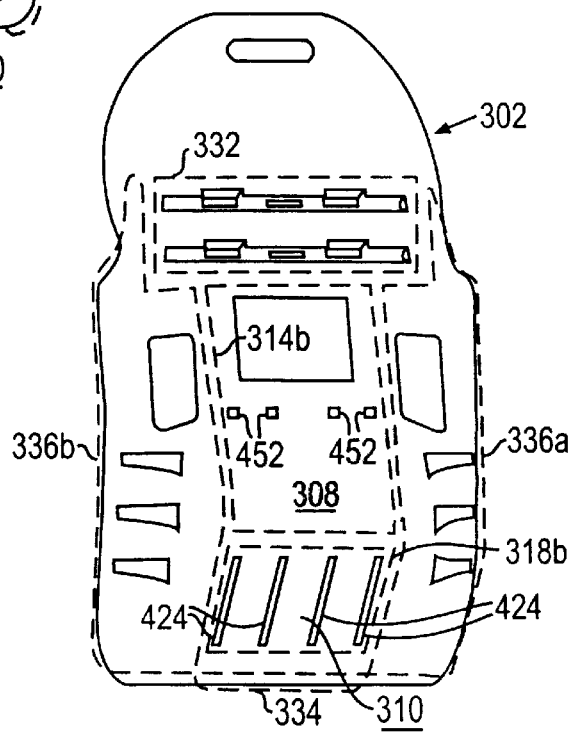
FIG. 35 is a rear isometric view of the seating section of the car seat of FIG. 25.

FIGS. 34 and 35 illustrate the wall sections of shell body 300a corresponding to an upper seatback 314 and lower seat 318 portion of seating section 312. Upper seatback 314 includes a front wall 314a defining an upper seating surface 316 and a rear wall 314b defining a rear upper surface 308 of shell seat 300 positioned adjacent to upper seating surface 316. Lower seatback 318 includes a front wall 318a defining a lower seating surface 320 and a rear wall 318b defining a rear lower surface 310 of shell seat 300 positioned adjacent to lower seating surface 320. Front and rear walls 314a, 314b and 318a, 318b of upper seatback 314 and lower seat 318, respectively, are supported along their perimeters by the respective front and rear walls forming right and left triangular sections 336a and 336b, upper transverse section 332 and forward transverse section 334.

Figure 36:
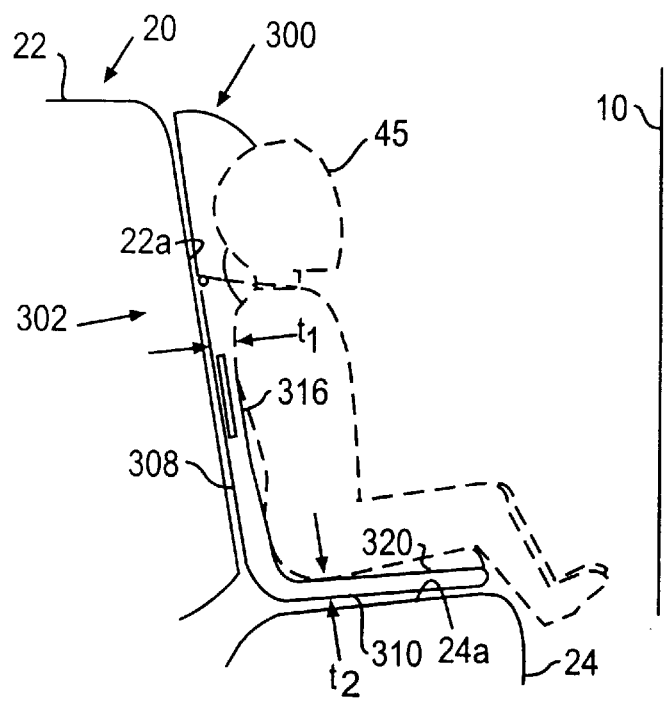
FIG. 36 is a side cross-sectional view of the car seat of FIG. 25 with child occupant placed in a vehicle seat.

Seating section 312 functions in the same manner as seating portion 112 of schematic car seat 100 in terms of the strength requirements for supporting child inertia loads applied to lower seat 318. That is, the internal loads induced in shell seat 300 by child harness 370 and the vehicle seatbelt during the forward impact event are carried primarily by shell frame 330, thereby eliminating the need for bending stiffness in seating section 312 for resisting forward excursions of upper end 302 of shell seat 300 during the forward impact event. Since seating section 312 is not called upon to provide flexural rigidity to shell seat 300, it is possible to reduce the cross sectional thickness of seating section 312 to a minimum by positioning the opposed walls 318a, 318b of lower seat 318 and opposed walls 314a, 314b of upper seatback 314 adjacent to each other without making shell seat 300 unacceptably flexible in bending. FIG. 36 shows a cross sectional view of shell seat 300 with child 45 in vehicle seat 20. As illustrated in FIG. 36, upper seating surface 316 and lower seating surface 220 are positioned in close proximity to the corresponding seating surfaces 22a, 24a of vehicle upper seatback 22 and vehicle seat bench 24. In particular, upper seating surface 316 and lower seating surface 320 are positioned within close proximity of the vehicle seating surfaces at the upper end of seating surface 316 where the child's shoulders are received and the buttock area of lower seating surface 320. As discussed earlier, such positioning of seating surfaces 316 and 320 is desirable as this increases the distance between the head of child 45 and forward interior surface 10 of the vehicle and positions the child lower in the vehicle seat so as to reduce the effects of loads applied to shell seat 300 during the forward impact event.

Referring to FIG. 36, the upper and lower cross sectional thickness, t1 and t2, of seating section 312 refers to the distance between rear surfaces 308 and 310 of shell seat 300 and front seating surfaces 316 and 320, respectively, of seating section 312. In view of the nominal stiffness required of seating section 312 for reacting loads induced by the forward impact event, cross-sectional thickness t1 and t2 may correspond to the combined thickness of the front and rear planar walls 314, 318 of seating section 312. Preferably, both cross-sectional thickness t1 and t2 are sized slightly greater than the combined front and rear wall thickness of seating section 312 to achieve a desired bending stiffness in upper seatback 314 and lower seat 318 for a relatively thin walled seating section, as will now be explained.

Figure 37:
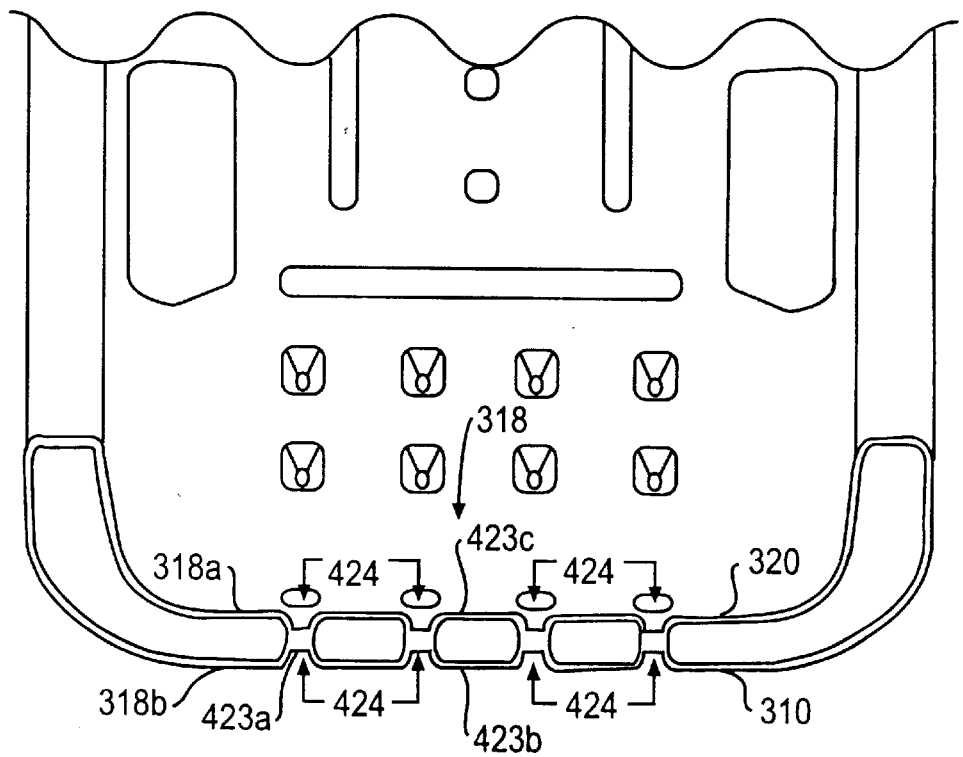
FIG. 37 is a front cross-sectional view of a portion of the shell seat of FIG. 25 taken along section 37—37 in FIG. 29.

As was discussed in the detailed description of schematic seat 100, lower seating section 318 needs to provide adequate strength for supporting downwardly directed inertia loads distributed over lower seating surface 320. Referring to FIGS. 34 and 37, illustrating a top view and cross-sectional view of shell seat 300 taken at section 37—37 in FIG. 29, respectively, lower seat 318 is strengthened by forming a plurality of inwardly directed, square-like tac-offs 422 in front wall 318a which function to connect front wall 318a to rear wall 318b. Tac-offs 422 function as load distribution members for distributing loads between front planar wall 318a and rear planar wall 318b. Thus, by structurally coupling front wall 318a to rear wall 318b with tac-offs 422, the strength of lower seat 318 is increased over a corresponding single wall seating surface.

Referring to FIGS. 35 and 37, inner wall 423a corresponds to the inner wall surface of one of a plurality of rib stiffeners 424 formed integrally with rear planar wall 318b and disposed opposite to tac-offs 422. Rib stiffeners 424 provide additional bending stiffness to rear planar wall 318b, as can be understood by realizing that the cross-sectional moment of inertia of rear planar wall 318b is increased by offseting wall 423a from wall 423b of rear planar wall 318b. Additionally, rib stiffeners 424 increase the bending stiffness of the upper planar wall 318a/lower planar wall 318b section by increasing the distance between the neutral axes of wall 423b and wall 423c of front planar wall 318a and rear planar wall 318b, respectively.

Referring again to FIGS. 34 and 35, tac-offs 452 and a horizontally extending rib stiffener 402 are formed on front planar wall 314a of upper seatback 314 and tac-offs 452 are formed on rear planar wall 314b opposite to horizontally extending rib stiffener 402. Tac-offs 452 and rib stiffener and 402 provide bending stiffness to upper seatback 314 in the same manner as described above for tac-offs 422 and rib stiffeners 424 of lower seat 318. As will described in more detail, below, tac-offs 452 and horizontal rib stiffener 402 are formed on upper seatback 314 to provide additional bending stiffness for reacting vehicle seatbelt loads distributed between triangular sections 336a and 336b. Vertical rib stiffeners 434a and tac-offs 434b, formed on front planar wall 314a, provide additional bending stiffness to upper seatback 314 for reacting loads distributed from upper transverse section 332 to upper seatback 314 through the adjoining front and rear wall sections. Vertical rib stiffeners 434a and tac-offs 434b function in the same manner as tac-offs 422 and rib stiffeners 422 described earlier.

Thus, cross sectional thickness t2 of lower seat 318 is defined by the size of tac-offs and rib stiffeners for providing the desired amount of stiffness for reacting inertia loads applied to lower seatback 318, and cross-sectional thickness t1 of upper seatback 314 is defined by the size of tac-offs and rib stiffeners for providing the desired amount of stiffness for reacting loads transferred to upper seatback 314 from shell frame 330. In the preferred embodiment, cross-sectional thickness t1 and t2 are approximately equal to each other and have a magnitude of approximately 1 inch.

As was discussed earlier for the seating portion 112 of schematic car seat 100, the upper and lower seating surfaces 316, 320 need not extend in approximately parallel relation to the respective upper and lower rear surfaces 308, 310 of seat section 312 to achieve a minimal forward and vertical offset of the seating surfaces from the vehicle seat. Thus, upper front wall 314a may be reclined relative to upper rear wall 314b so as to provide a minimal forward offset in the vicinity of shoulder restraints 374 with the lower portions of upper front wall 314a extending forwardly from the respective lower portions of upper rear wall 314b, and lower front wall 318a may be inclined so as to provide a minimal vertical offset at the buttock area of lower front wall 318a with the upper leg support area of lower front wall 318a being elevated relative to vehicle seat bench 24.

Seatbelt Pathway 390

Figure 38:
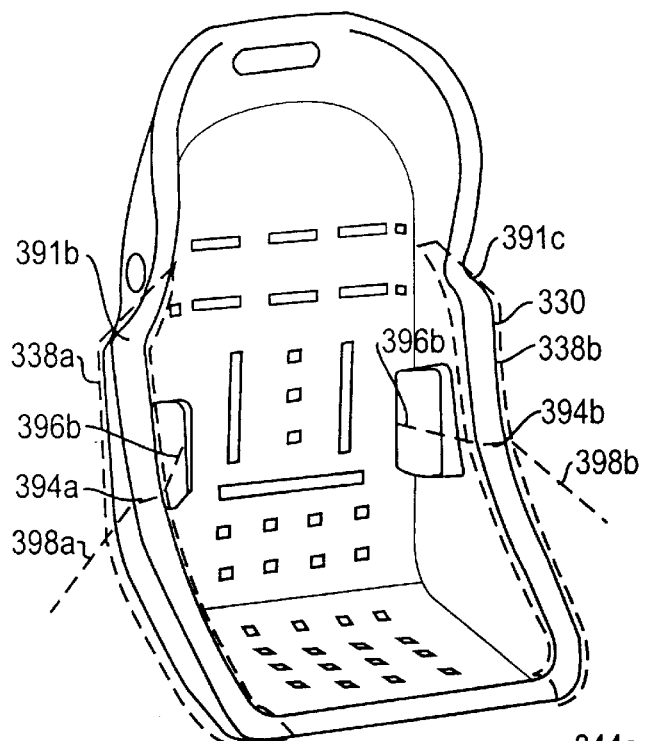
FIG. 38 is a front isometric view of a seatbelt pathway of the car seat of FIG. 25.
Figure 39:
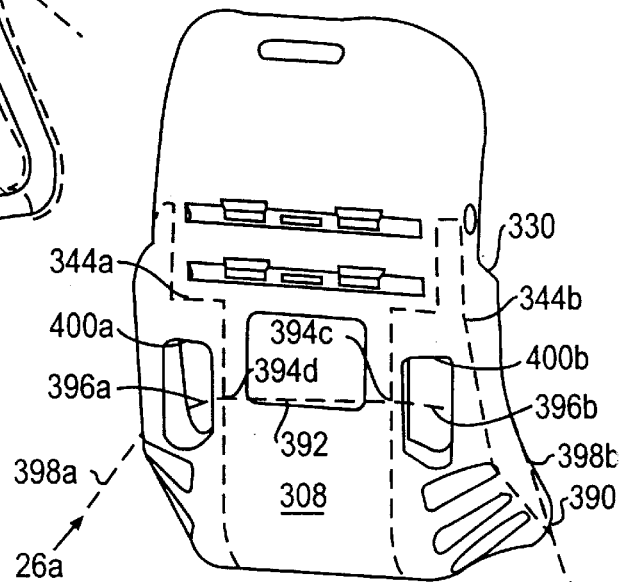
FIG. 39 is a rear isometric view of the seatbelt pathway of FIG. 38.

The routing paths for a vehicle seatbelt restraining shell frame 330 and thus shell seat 300 in vehicle seat 20 are defined by seatbelt pathway 390. Shell seat 300 is capable of being fully secured in vehicle seat 20 by a vehicle lap belt. Thus, no top tether anchorage is required to restrain shell seat 300 during a forward impact event. Referring to FIGS. 38 and 39, the seatbelt paths and restraint points defined by seatbelt pathway 390 are functionally equivalent to the paths and restraint points defined by seatbelt pathway 190. The restraint points defined by seatbelt pathway 390 correspond to the outer surfaces of the respective wall sections of shell frame 330. Thus, seatbelt pathway 390 includes opposed left and right forward seatbelt restraint surfaces 394a and 394b corresponding to the forward wall surface of left and right diagonal sections 338a and 338b, respectively, and left and right rearward seatbelt restraint surfaces 394c and 394d corresponding to the rear wall surface of left and right vertical sections 346a and 346b, respectively. The seatbelt paths defined by seatbelt pathway 390 include seatbelt entry paths 398a, 398b extending upwardly and forwardly from seatbelt anchorage points 26a, 26b to the respective forward restraint surfaces 394a, 394b, a left horizontal seatbelt path 396a extending between left restraint surfaces 394a and 394c and through a left seatbelt guide 400a formed in left L-shaped section 344a, a right horizontal seatbelt path 396b extending between right restraint surfaces 394b and 394d and through a right seatbelt guide 400b formed in right L-shaped section 344b, and central path 392 extending left to right across upper rear surface 308.

Figure 40:
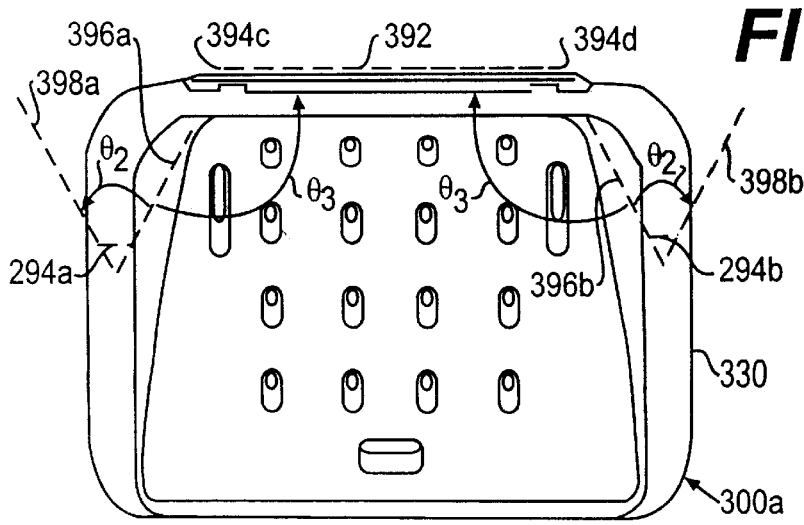
FIG. 40 is a top view of the seatbelt pathway of FIG. 38.

Referring to FIG. 40 (illustrating a top view of shell body 300a), seatbelt path angles θ2 and θ3 for seatbelt pathway 390 define resultant seat belt forces applied to frame 330 orientated so as to create the reduced net transverse load on truss seat 300, as discussed earlier. Thus, by positioning the left and right forward restraint surfaces 394a, 394b outward from the respective left and right rearward restraint surfaces 394c, 394d, the resultant seatbelt forces applied to forward restraint surfaces 394a, 394b are directed more front to rear than left to right, and by routing seatbelt pathway over forward restraint surfaces 394a, 394b and then back and over rearward restraint surfaces 394c, 394d, the resultant inwardly directed transverse force components applied at each of the rearward restraint surfaces 394c, 394d tend to cancel out the corresponding outwardly directed transverse force components applied at forward restraint surfaces 394a, 394b.

Shell seat 300 may also be restrained using a Type II vehicle seat belt assembly (shoulder belt and lap belt). FIG. 38 illustrates the upper portions of shell frame 330 where respective left and right shoulder belt restraints 391b and 391c for a vehicle shoulder belt of a Type II vehicle seatbelt are located when the vehicle seatbelt is routed from left-to-right or right-to-left through shell frame 330, respectively. Shoulder belt restraints 391b and 391c are identical in function to the vehicle shoulder belt pathway function for schematic car seat 100 described earlier. Thus, when a vehicle shoulder belt and lap belt are used to restrain shell seat 300, the restraining force applied at shoulder restraints 391b or 391c are effective in providing increased performance for shell seat 300 during the forward impact event.

Figure 41:
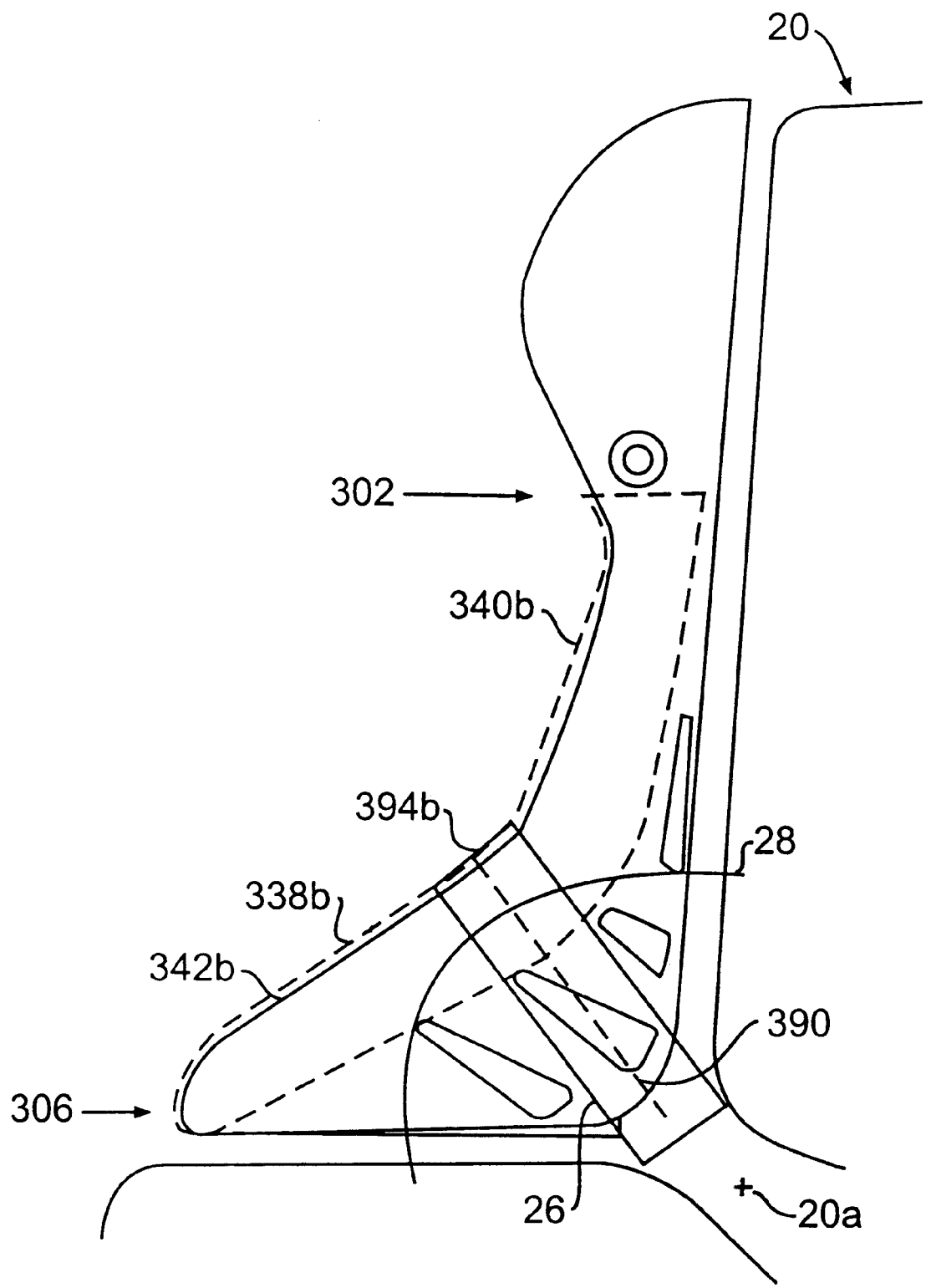
FIG. 41 is a side view of the shell seat of FIG. 25 restrained in a vehicle seat by a vehicle seatbelt routed through the seatbelt pathway.

FIG. 41 shows a right side view of shell body 300a restrained in vehicle seat 20 with vehicle seatbelt 26 routed through seatbelt pathway 390. As was discussed earlier, it is desirable to position the forward restraint (i.e., restraint 194a of seat 100) of the car seat outside of seatbelt radius 28, defining the maximum seatbelt buckle stalk, so as to ensure that the car seat can be effectively secured in vehicle seats with various seatbelt anchor positions and buckle stalk lengths. In shell seat 300, forward restraint 394b (as well as forward restraint 394a) is positioned outside of this radius 28 to achieve the same result but is preferably set back slightly so as to reduce the required travel length of seatbelt 26 (as per SAE J1819, discussed earlier) for routing seatbelt 26 through seatbelt pathway 390. Thus, diagonal section 338b includes a bend defined by the junction of an upper diagonal wall section 340b, extending forwardly and downwardly from upper end 302, and a lower diagonal wall section 342b extending upwardly and rearwardly from forward end 306. The bend of diagonal member 338b is located at approximately the same location as forward restraint surface 394b (as is also the case for left diagonal section 338a). It is preferable, but not necessary, for diagonal section 338b to include this bend since a constant-slope diagonal section 338b which extends from upper end 302 to a location inboard from forward end 306 will provide a forward restraint surface that is positioned at the same forward location as forward restraint surface 394b.

Shell frame 330 may also be used to receive the vehicle seatbelt rearward of forward restraints 394a and 394b without modification to shell frame 330. Referring to FIGS. 34 and 39, vehicle seatbelt 26 may be routed from the left hand side of shell seat 300, for example, by directly inserting vehicle seatbelt 26 through left seatbelt guide 400a from the rear of shell body 330, passing vehicle seatbelt 26 over upper front wall 314a and then passing vehicle seatbelt 26 through right seatbelt guide 400b. In this embodiment, seatbelt 26 is restrainable against shell frame 330 at the right and left wall sections of L-shaped sections 344a and 344b disposed between the respective left seatbelt guide 400a and left side of seat panel 314a and right seatbelt guide 400b and right side of seat panel 314a, respectively. Thus, shell frame 330 is adapted for providing a vehicle seatbelt restraint surface that is either forward of front seating surface 316 or adjacent to upper rear surface 308.

Shell Frame 330

Figure 42:
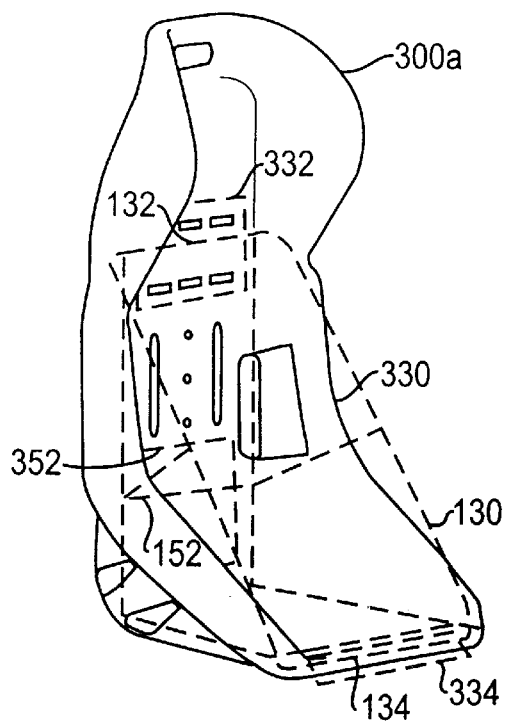
FIG. 42 is a front isometric view of a shell frame of the car seat of FIG. 25 with the schematic frame of FIG. 2 superimposed thereon.
Figure 43:
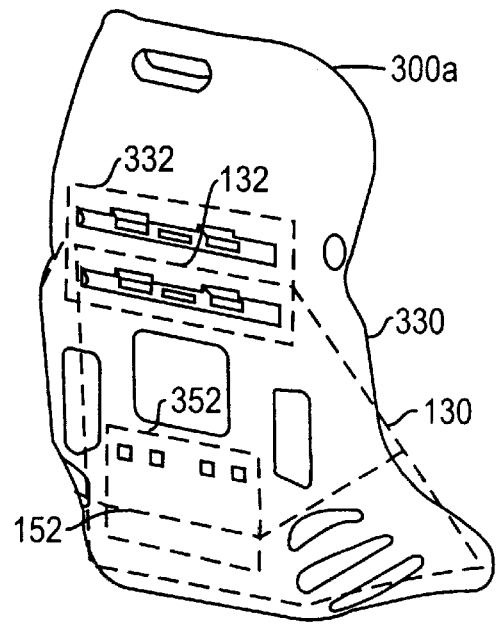
FIG. 43 is a rear isometric view of the shell frame and schematic frame of FIG. 42.
Figure 44:
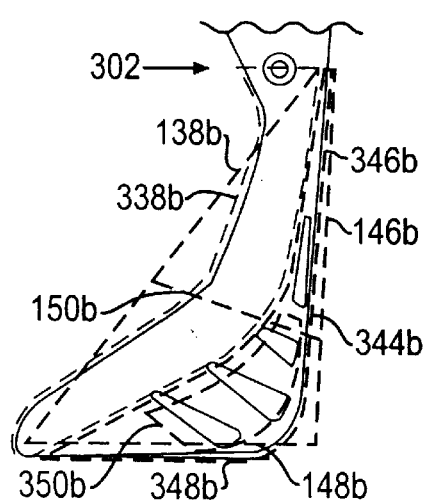
FIG. 44 is a side view of the shell frame and schematic frame of FIG. 42.

FIGS. 42–44 show front isometric, rear isometric and side views of shell frame 330 with frame 130 of schematic seat 100 superimposed thereon. As mentioned earlier, shell frame 330 is a physical embodiment of frame 130 implemented as a closed walled, semi-monocoque shell characterized by load bearing wall sections defining in-plane load paths with stiffeners positioned in areas where the applied loads induce buckling-type loads in wall sections.

The correspondence between the sections 332, 334 and 334a of frame 330 and structures 132, 134 and 134a of frame 130 of schematic car seat 100 are as follows.

Referring again to FIGS. 26, 27 and 28, upper transverse structure 132 of schematic car seat 100 corresponds to the front and rear walls 332a, 332b extending between the upper ends of triangular sections 336a and 336b, bar 333 and bar housings 432 and 433 of upper transverse section 332. Upper transverse section 332 provides stiffness for minimizing forward deflections of shell seat 300 in the vicinity of shoulder strap attachments 374, 375 and distributes the internal loads induced by the applied shoulder straps 372 out to left and right triangular sections 336a and 336b. The stiffness of upper transverse section 332 is defined by the combined stiffness of bar 333, the ends of which extend out to the upper ends of left and right triangular sections 336a and 336b, and the stiffness of front wall 332a and rear wall 332b structurally coupled through bar housings 432 and 433. Thus, when the forwardly directed inertia loads are reacted by shoulder straps 372 and transferred to bar 333, the resulting forwardly directed internal loads in upper transverse section 332 are directed out to left and right triangular sections 336a and 336b by loads in bar 333 distributed along the length of front and rear wall sections of upper transverse structure 332. In the preferred embodiment, bar 333 is a steel tube of ½ outer diameter and 16 gauge wall thickness made from 1010 or 1015 steel.

Referring again to FIGS. 26 and 27, forward transverse structure 134 of schematic car seat 100 corresponds to forward transverse section 334 of shell frame 330 defined by the forward-most portions of front planar wall 318a and rear planar 318b of lower seat 318 at front end 306. The net transverse loads applied to shell seat 300 induce in-plane tensile loads in the wall sections defining front transverse section 334. Thus, the in-plane stiffness of the wall sections forming forward transverse section 334 are used to carry transverse loads between left and right triangular sections 336a and 336b.

Referring again to FIGS. 29 and 30, crotch attachment structure 134a of the schematic car seat 100 corresponds to crotch attachment 334a, as discussed earlier, and the portion of front planar wall 318a and rear planar wall 318b of lower seat 318 in the vicinity of crotch attachment 334a extending out to left and right horizontal portions 348a and 348b of L-shaped horizontal sections 344a and 344b. The stiffness provided by crotch attachment member 334a is defined by the combined stiffness of rod 482 seated in housing 484 and the stiffness provided by upper and lower planar walls 382a, 382b structurally coupled through rod housing 484. Rod 482 is preferably a solid cylindrical rod of ⅜ inch diameter made from 1010 or 1015 steel.

The correspondence between triangular supports 136a, 136b of schematic car seat 100 and triangular sections 336a, 336b of shell seat 300 will now be described.

Left and right triangular sections 336a and 336b are of identical shape and function in the same manner. Referring to FIG. 44, the load paths defined by diagonal structure 138b, vertical structure 146b and horizontal structure 148b of schematic car seat 100 correspond to the in-plane load paths of the wall sections defining diagonal section 338b, vertical portion 346b and horizontal portion 348b of L-shaped section 344b, respectively. The corresponding triangularly shaped shell structure formed by sections 338b, 346b and 348b provides a high degree of bending stiffness to shell seat 300, as will now be explained by reference to the cross-sectional moments of inertia of triangular sections 336a and 336b taken along horizontal cross-sectional slices in the bending planes of shell seat 300. The cross-sectional moments of inertia, as discussed below, characterize the favorable bending stiffness provided by a triangularly shaped shell structure for resisting forward excursions of upper end 302 induced by the applied loads during the forward impact event.

Figure 45:
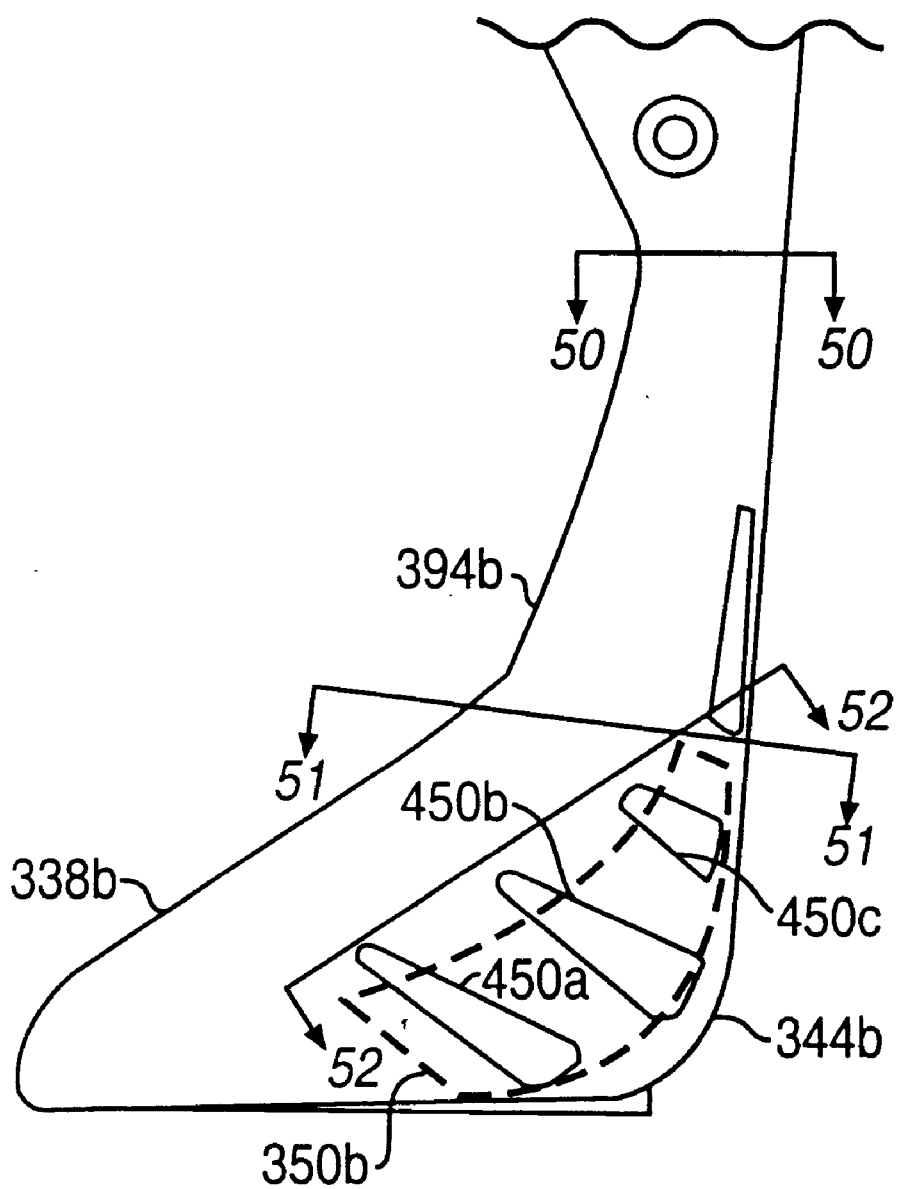
FIG. 45 is a side view of the shell frame of FIG. 42.
Figure 46:
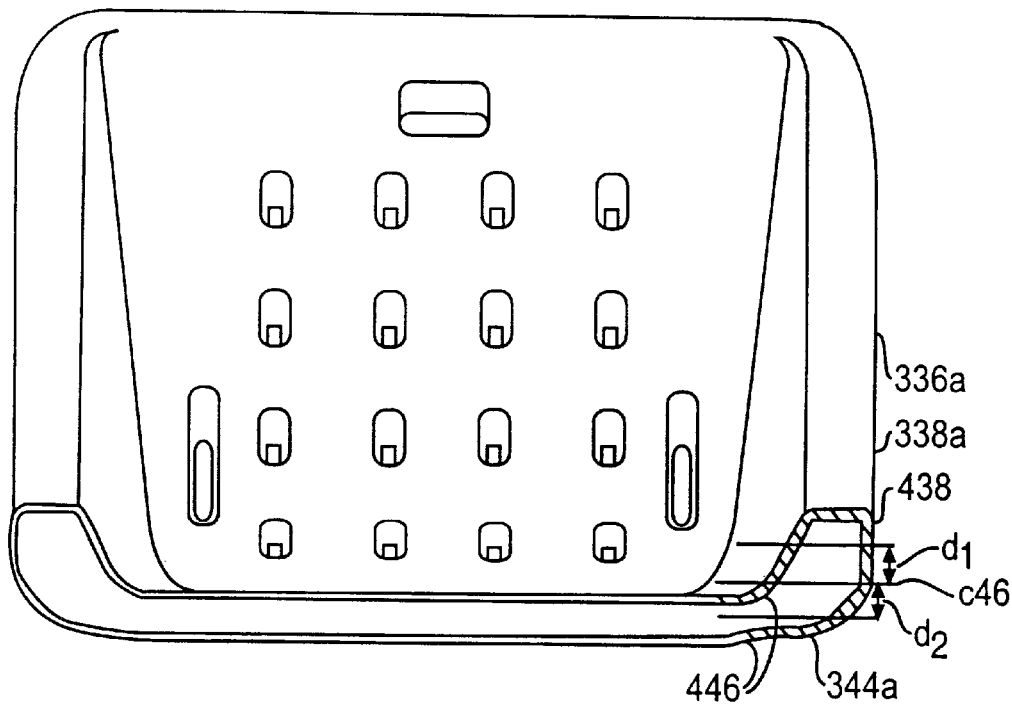
FIG. 46 is a cross-sectional slice of the shell frame of FIG. 42 taken along section 46—46 in FIG. 45.
Figure 47:
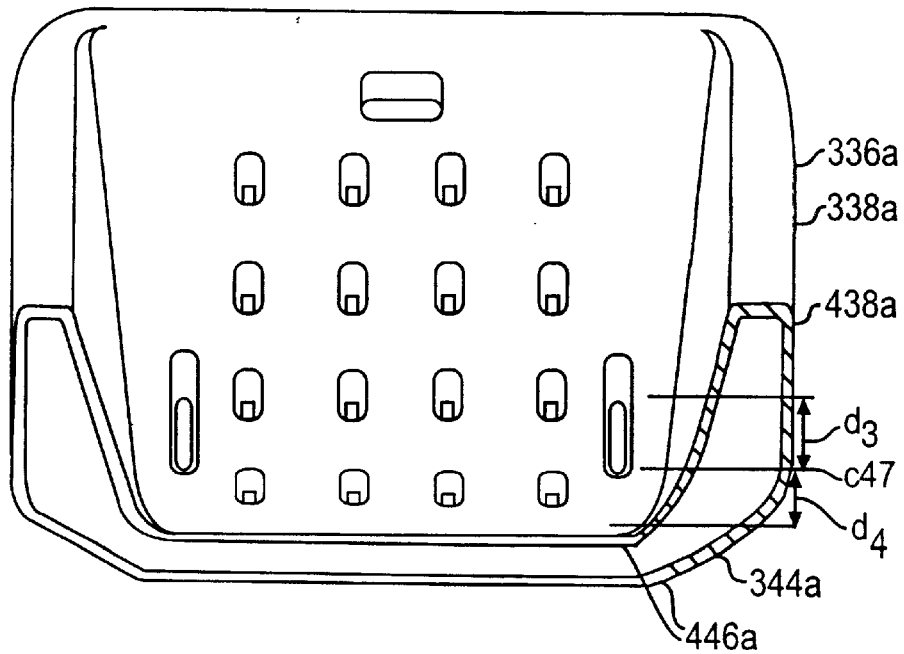
FIG. 47 is a cross-sectional slice of the shell frame of FIG. 42 taken along section 47—47 in FIG. 45.

FIG. 46 illustrates a cross-sectional view of shell body 300a taken at section 46—46 in FIG. 45. Referring to the cross-section of left triangular section 336a in FIG. 46, the bending moment of inertia of left triangular section 336a is equal to the sum of the moments of inertia of the U-shaped wall section 438 of diagonal section 338a and inner and outer walls 446 of L-shaped section 344a taken about the centroidal axis $C_{46}$ of section 46—46. In mathematical terms, the moment of inertia at section 46—46 is expressed as: $I_{46} = (I_1 + A_1 d_1^2) + (I_2 + A_2 d_2^2)$, where $I_1$ and $I_2$ are the local moments of in walls 438 and 446 respectively, $A_1$ and $A_2$ are the cross-sectional areas of walls 438 and 446, respectively, and $d_1$ and $d_2$ are the distances from the centroids of the walls 438 and 446 of diagonal section 338*a* and L-shaped section 344*a*, respectively, to the centroidal axis $C_{46}$ of section 46—46. Thus, by inspection of the expression for $I_{46}$, the magnitude of the moment of inertia is related to the distances $d_1$ and $d_2$ from the centroidal axis $C_{46}$ and magnitudes of the moments of inertia $I_1$ and $I_2$ and cross-sectional areas $A_1$ and $A_2$. Hence, the bending stiffness for triangular section 336 is increased by increasing the cross-section size in the bending plane. FIG. 47 illustrates a cross-sectional view of shell body 300*a* taken at section 47—47 in FIG. 45, corresponding to a location where diagonal section 338*a* is disposed at a greater distance away from L-shaped section 344*a*. The expression for the moment of inertia of triangular section 336*a* at section 47—47 is: $I_{47}=(I_3+A_3d_3^2)+(I_4+A_4d_4^2)$, where $A_3$, $I_3$ and $A_4$, $I_4$ are the cross-sectional areas and moments of inertia for walls 438*a* and 446*a* at section 47—47, respectively, and distances $d_3$ and $d_4$ are the distances between the respective centroidal axes of the walls 438*a* and 446*a* and the centroidal axis $C_{47}$ of section 47—47, respectively. As can be seen by comparing the relative cross-sectional sizes of section 46—46 and 47—47, the moment of inertia is significantly greater as diagonal section 338*a* is extended away from L-shaped section 344*a*. Thus, by extending diagonal section 338*a* away from vertical section 346*a* and thereby forming a triangularly shaped shell structure, a high degree of flexural rigidity is provided to shell seat 300.

Figure 48:
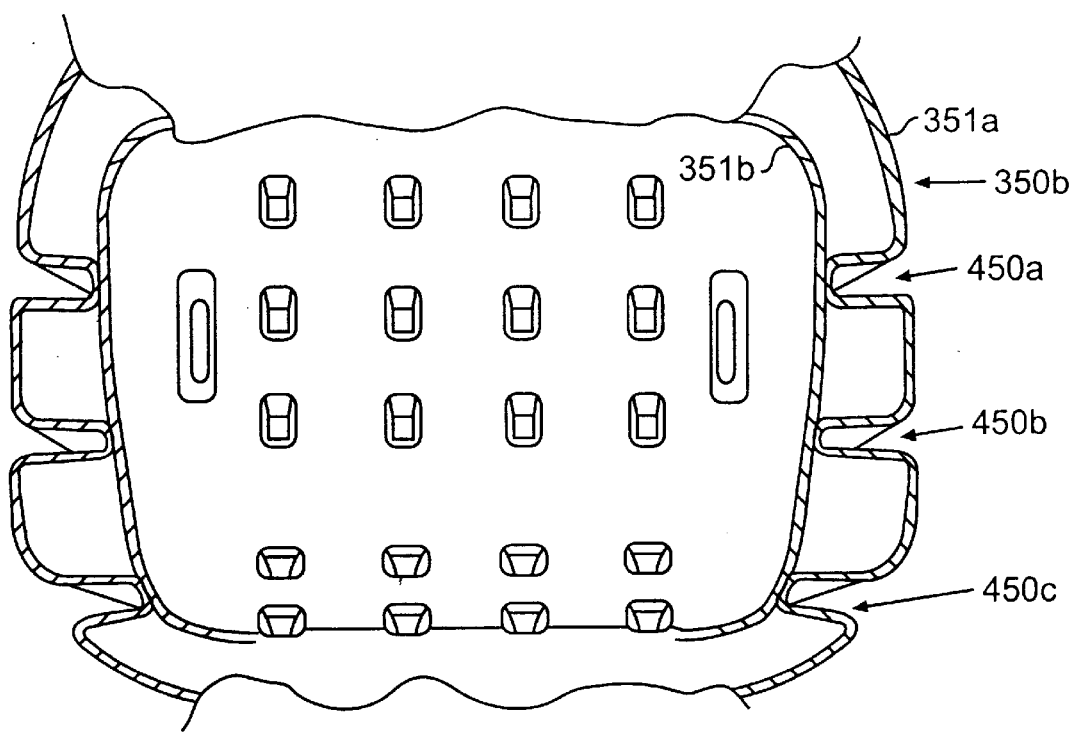
FIG. 48 is a cross-sectional slice of the shell frame of FIG. 42 taken along section 48—48 of FIG. 45.

Support structure 150*b* of schematic car seat 100 corresponds to support section 350*b* of shell frame 330. FIG. 48 illustrates a cross-sectional slice taken along section 48—48 in FIG. 45. Referring to FIGS. 45 and 48, support section 350*b* includes a first, second and third indentation 450*a*, 450*b* and 450*c*, respectively, formed on an outer wall 351*a* portion of support section 350*a*. Indentations 450*a*, 450*b* and 450*c* extend inwardly from outer wall 351*a* so as to be in mating contact with the inner wall surface of inner wall 351*b*. Indentations 450*a*, 450*b* and 450*c* function as integrally formed stiffeners for triangular section 336*a* extending from L-shaped section 344*b* to diagonal section 338*a*. A corresponding trio of indentations is formed on left triangular section 336*a*. Section 48—48 corresponds to a plane normal to the direction of the applied seatbelt force applied at restraint surface 394*b* and thus represents the in-plane stiffness of support section 350*b* opposing the applied seatbelt forces. Referring to FIG. 48, by forming indentations 450*a*, 450*b* and 450*c*, the amount of in-plane stiffness of support section 350*a* opposing the applied seatbelt forces is greatly increased over a corresponding pair of planar wall sections. Additionally, by structurally coupling outer wall 351*a* with inner wall 351*b* through indentations 450*a*, 450*b* and 450*c*, the bending stiffness of the section is greatly increased over a corresponding pair of de-coupled inner and outer vertical wall sections.

Referring again to FIGS. 26, 27 and 42, Lower transverse member 152 of schematic car seat 100 corresponds to front wall section 352*a* and rear wall section 352*b* of lower transverse section 352 of shell frame 330. Lower transverse section 352 also corresponds to the lower portion of front and rear planar walls 314*a* and 314*b*, respectively, of upper seatback 314. Referring again to FIGS. 26 and 27, lower transverse section 352 defines a load path for reacting internal loads carried in left and right support sections 352*a* and 352*b* extending from the left and right ends, respectively, of lower transverse section 352. Lower transverse section 352 carries compression loads (as will be understood by reference to the direction of the applied seatbelt forces at restraints 394*a* and 394*b* and the resulting internal forces carried along support sections 350*a* and 350*b*). Stiffeners are used to increase the bending stiffness of lower transverse section 352. These stiffeners refer to tac-offs 452*a*, a horizontal rib stiffener 402 formed in front wall 352*a*, and tac-offs 452*b* formed on rear wall 352*b* opposite horizontal rib stiffener 402. Tac-offs 452*a* and horizontal rib stiffener 402 with opposed rear wall tac-offs 452*b* function in the same manner as tac-offs 422 and rib stiffener 424 of lower seat 318 described earlier.

What is claimed is:

1. A car seat for restraining a child occupant in a vehicle seat using one of a vehicle lap belt and a combination lap belt and shoulder belt vehicle seatbelt assembly, the vehicle seat having a upper seat back and lower seating surface, said car seat comprising:

a seat portion having left and right sides, an upstanding back portion having a front surface adapted for receiving the back of the occupant and a rear surface positioned against the vehicle upper seat back when said car seat is restrained in the vehicle seat, a lower seat portion having a front seating surface and rear surface, an upper end corresponding to an upper part of said upstanding back portion and a forward end corresponding to a forward part of said lower seat portion;

left and right triangular supports integrally formed with said seat portion at the left and right sides, respectively, of said seat portion, each of said triangular supports including a diagonal member, said diagonal member extending between the upper end and forward end of said seat portion; and a seatbelt pathway integral with said seat portion, said seatbelt pathway including left and right forward seatbelt restraint surfaces formed on said left and right diagonal members and positioned over the left and right diagonal members, respectively, and a central pathway portion disposed between said restraint surfaces and along said rear surface of said upstanding back portion.

2. The car seat of claim 1, wherein each of said diagonal members has a bend formed thereon, said left and right forward seatbelt restraint surfaces positioned over the bends of the diagonal members, and said seatbelt pathway further includes left and right seatbelt guides positioned adjacent to said left and right seatbelt restraint surfaces, respectively, and said central pathway portion extends between said left and right seatbelt guides.

3. The car seat of claim 1, wherein when the child occupant is restrained in said car seat and subjected to a forward impact event, vehicle restraining loads preventing said car seat from tipping forwardly during the forward impact event are applied solely through the vehicle seatbelt with the resulting loads applied to said car seat being applied primarily at said left and right restraint surfaces.

4. The car seat of claim 1, wherein each of said left and right triangular supports further comprise:

an L-shaped member having a vertical and horizontal portion extending approximately with said upper back and lower seat portion, respectively;

a support member extending from said L-shaped member at a lower end thereof and terminating adjacent to said seatbelt restraint surface, wherein said support member is orientated so as to provide structural support to said diagonal member in the vicinity of said seatbelt restraint surface for reacting seatbelt loads applied to said seatbelt restraint surface when the vehicle seatbelt is threaded through said seatbelt pathway.

5. The car seat of claim 4, wherein a lower transverse member extends between the lower ends of said left and right L-shaped members and across said upstanding back portion and wherein said lower transverse member is positioned in operative proximity to said left and right support members for reacting the applied seatbelt loads carried in said left and right support members when the vehicle seatbelt is threaded through said seatbelt pathway.

6. A semi-monocoque shell for a forward facing child car seat, the forward facing child car seat having a child harness including a means for restraining a child occupant in the car seat, the forward facing child car seat being securable in a vehicle seat in a forward facing direction relative to the vehicle using a vehicle lap belt such that during a forward impact event the entirety of the rearward reaction loads transferred from the vehicle to the child car seat are carried through the vehicle lap belt, the vehicle passenger seat having seating and back support surfaces, said semi-monocoque shell comprising:

a closed-walled shell body having a top end defining a restraining means restraint point, a forward end, a seat portion formed between said top and forward ends and left and right frame portions extending forwardly from said seat portion;

said left and right frame portions including left and right lap belt restraint surfaces, wherein when the forward facing child car seat with seated child is secured in the vehicle seat and the vehicle is subjected to a forward impact event, a substantial portion of the forward inertia loads reacted at said restraint point and reacted by said lap belt restraint surfaces are carried by said right and left frame portions; and said seat portion including:
  a vertically disposed pair of front and rear panel portions of a vertical seat portion defining a vertical seating surface and rear surface positionable against the vehicle back support surface, respectively, said front and rear panel portions being structurally coupled to each other by a first portion of said left and right frame portions, said vertical seat portion having an upper end adjacent to said restraint points and a lower end, wherein a portion of said front panel is disposed adjacent to said rear panel so as to position said vertical seating surface in close proximity to the vehicle back support surface at said upper end, and
  a horizontally disposed pair of front and rear panel portions of a horizontal seat portion defining a lower seating surface and rear surface positionable against the vehicle seating surface, respectively, said front and rear panel portions being structurally coupled to each other by a second portion of said left and right frame portions, said horizontal seat portion having a front end adjacent to said shell body forward end and a rearward end adjacent to the lower end of said vertical seat portion, wherein a portion of said front panel is disposed adjacent to said rear panel so as to position said lower seating surface in close proximity to the vehicle seating surface at said rearward end.

7. The semi-monocoque shell of claim 6, wherein said front and rear panels of said horizontal seat portion are structurally coupled to each other by a load transferring member extending between said front and rear panels.

8. The semi-monocoque shell of claim 7, wherein said front panel of said horizontal seat portion has a first inner surface opposite said vertical seating surface and said rear panel of said horizontal seat portion has second inner surface opposite said rear surface, each of said front and rear panels having associated therewith a panel thickness, wherein said load transferring member is a stiffener coupled to each of said front and rear panel portions, said stiffener extending between said first and second inner surfaces so as to be operative for transferring seat occupant loads between said front and rear panel portions, wherein said stiffener has a height corresponding to the distance between said front and rear panel portion inner surfaces;

wherein the thickness of said horizontal seating portion is the sum of said front and rear portions panel thickness and said stiffener height.

9. The semi-monocoque shell of claim 8, wherein said stiffeners are tac-offs.

10. The semi-monocoque shell of claim 6, wherein said rear panel includes an integrally formed rib stiffener.

11. The semi-monocoque shell of claim 6, wherein each of said left and right frame portions comprise:

a loading section having an upper end extending downwardly and forwardly from said top end, a lower end extending upwardly and rearwardly from said forward end, and an intermediate portion joining said upper and lower ends, said intermediate portion having an upper surface coincident with said lap belt restraint surface; and a supporting portion supporting said intermediate portion, said supporting portion having inner and outer walls extending upwardly from said lower end of said seat portion and terminating at said intermediate portion.

12. The semi-monocoque shell of claim 11, wherein said supporting portion includes an integral skin-stiffener formed in said outer wall.

13. The semi-monocoque shell of claim 12, a substantial portion of the internal loads resulting from external forces applied at the left and right lap belt restraint surfaces corresponding to in-plane loads of the inner and outer walls of said supporting portion, wherein said integral skin-stiffener includes longitudinally extending indentations extending upwardly from said lower end of said seat portion, said indentations providing a substantially increased cross-sectional area for distributing the in-plane loads resulting from the external forces applied at the left and right lap belt restraint surfaces.

14. The semi-monocoque shell of claim 13, wherein at least a portion of said indentations of said outer wall are in contact with said inner wall.

15. The semi-monocoque shell of claim 6, wherein at least one of said vertical and horizontally disposed pairs of panel portions defines an integral skin-stiffener panel.

16. The semi-monocoque shell of claim 6, wherein said seat left and right lap belt restraint surfaces are operable for positioning the vehicle lap belt at a height located approximately midway between said upper and lower ends of said vertically disposed front panel.

17. A child car seat including the semi-monocoque shell of claim 6 in combination with a metal rod and child harness, the child harness including a shoulder portion securable to the metal rod, wherein said restraining means restraint point includes a recess in which the metal rod is received, the metal rod extending out to said left and right frame portions so as to distribute inertia loads carried in the shoulder portion during a forward impact event out to said left and right frame portions.

18. The semi-monocoque shell of claim 6, wherein a bending plane for said seat body is defined as being approximately perpendicular to said vertical seating surface, the bending plane describing the bending inertia of said seat body opposing a moment induced on said seat body during the forward impact event, wherein each of said left and right frame portions include a loading section extending downwardly and forwardly from said top end and terminating at said lower end so as to define a substantial portion of the bending inertia in the bending plane of said seat body for opposing a moment induced during the forward impact event.

19. The semi-monocoque shell of claim 18, wherein the bending inertia of said left and right loading-sections is substantially greater than the corresponding bending inertia of said vertical seat portion in the bending plane.

20. A car seat for restraining a child in a vehicle passenger seat, the vehicle passenger seat including a seatbelt for securing said car seat in the vehicle passenger seat, said car seat comprising:
an L-shaped seat portion having a horizontal seat portion with a forward end and a rearward end, an upstanding seatback having an upper end and a lower end, and an apex at which said rearward end of said horizontal seat portion and said lower end of said upstanding seatback meet, said L-shaped seat portion having left and right sides;
a support frame having left and right supports coupled to the left and right sides, respectively, of said L-shaped seat portion, said left and right supports being operable for reacting seatbelt restraint loads and child car seat bending, each of said left and right supports including:
a primary strut extending downwardly from a top end proximal to said upper end of said L-shaped seat portion and terminating at a front end proximal to said forward end of said L-shaped seat portion, said primary strut having a central portion disposed between said top and front ends for receiving a vehicle seatbelt, and
an axial strut coupled to said central portion and to said L-shaped seat portion adjacent said apex, said axial strut supporting said central portion to react loads applied to said central portion imposed by the vehicle seatbelt; and
a child restraint harness anchored to said support frame.

21. The car seat of claim 20, wherein said central portion extends forward of said upstanding seatback and is positioned approximately midway between said upper end and said seatback lower end.

22. The car seat of claim 20, further including a seatbelt pathway defining a seatbelt path length extending over said rearward end of said horizontal seat portion, wherein said left and right support frames extend forwardly and diverge outwardly from said left and right sides of said seat, thereby reducing a net transverse load applied to said support frame when the vehicle seatbelt is routed through said seatbelt pathway.

23. The car seat of claim 20, wherein said L-shaped seat portion and said left and right supports are integral parts of a car seat shell and wherein said axial strut is defined by a wall section including integrally formed stiffeners, said primary strut is defined by a wall section extending diagonally from said upper end to said forward end, and said central portion corresponds to a central portion of said diagonally extending wall section disposed between said upper and lower ends.

24. The car seat of claim 23, wherein said L-shaped seat portion is defined by planar wall panels having integrally formed stiffeners formed thereon.

25. The car seat of claim 23, said diagonally extending wall section having an upper diagonal and lower diagonal portion, each of said left and right support frames further comprising:
an L-shaped wall section having a vertical portion and horizontal portion coupling said upper and lower diagonal portions with the respective said upstanding seat back and horizontal seat portion;
wherein said vertical portion, horizontal portion, and diagonally extending wall sections describe a triangularly shaped shell structure operable for reacting seatbelt restraint loads and car seat bending.

26. The car seat of claim 20, wherein said left and right supports are a network of tubular bars and said L-shaped seat portion is a seat panel secured to said network of tubular bars at the left and right sides, respectively, of said seat panel, wherein said axial strut is an axial bar, said primary strut is a diagonal bar extending diagonally from said upper end to said forward end, and said central portion corresponds to a central portion of said diagonal bar disposed between said upper and lower ends.

27. The car seat of claim 26, said diagonal bar having an upper diagonal and lower diagonal portion, each of said left and right supports further comprising:
an L-shaped bar having a vertical portion and horizontal portion coupling said upper and lower diagonal portions with the respective said vertical and horizontal seat portions of said seat panel;
wherein said vertical portion, horizontal portion, and diagonally extending wall sections describe a triangularly shaped truss frame operable for reacting seatbelt restraint loads and car seat bending.

28. The car seat of claim 20, wherein said left and right triangular supports are integrally formed with said L-shaped seat portion.

29. The car seat of claim 20, wherein said child harness includes a pair of shoulder straps releasably securable to a crotch strap, said shoulder and crotch straps having webbing ends securable to said support frame, said support frame further including:
an upper transverse member extending between said left and right frame supports at the upper end of said L-shaped seat portion,
wherein each of said shoulder strap webbing ends are fixedly secured to said upper transverse member and said crotch strap is fixedly secured to and disposed adjacent to said forward end of said horizontal seat portion.

30. The car seat of claim 20, wherein said child harness includes a shoulder strap releasably securable to a crotch strap, said shoulder and crotch straps having webbing ends securable to said support frame, said support frame further including:
an upper transverse member extending between said left and right frame supports at the upper end of said L-shaped seat portion,
wherein said shoulder strap webbing has two ends, and each of said webbing ends is fixedly secured to said upper transverse member.

31. The car seat of claim 20, wherein a bending plane associated with the flexural rigidity of said car seat is approximately perpendicular to a plane approximating a seating surface of the upstanding seatback, wherein the flexural rigidity in the bending plane corresponds substantially to the sum of a moment of inertia of said left and right frame portions and a moment of inertia of the upstanding seatback as measured in the bending plane and wherein the bending plane is taken at a height location such that the moment of inertia for each of the left and right frame portions is determined, at least in part, by the cross-sectional area associated with said central portion, wherein said L-shaped seat portion and said support frame are portions of a unitary, semi-monocoque shell and the bending inertia of said left and right supports is substantially greater than the bending inertia of said upstanding seatback.

32. The car seat of claim 31, said child harness including a shoulder harness portion anchored to said L-shaped seat portion upper end by a horizontally extending metal bar operable for distributing shoulder harness loads across said upper end of said L-shaped seat portion.

33. The car seat of claim 20, said child harness including a shoulder harness portion anchored to said L-shaped seat portion upper end by a horizontally extending member operable for distributing shoulder harness loads across said upper end of said L-shaped seat portion.

34. The car seat of claim 20, wherein said primary strut further includes upper and lower intermediate sections disposed between said central portion and said top end, and said central portion and said lower end, respectively, said upper and lower intermediate sections defining first and second strut angles relative to said upstanding seatback.

35. The car seat of claim 34, wherein said second strut angle is greater than said first strut angle.

* * * * *